(12) United States Patent
Ohno

(10) Patent No.: US 8,200,077 B2
(45) Date of Patent: Jun. 12, 2012

(54) IMAGE BLUR CORRECTION DEVICE AND IMAGING APPARATUS EQUIPPED THEREWITH

(75) Inventor: Takehide Ohno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/047,955

(22) Filed: Mar. 15, 2011

(65) Prior Publication Data

US 2011/0188841 A1    Aug. 4, 2011

Related U.S. Application Data

(62) Division of application No. 12/377,216, filed as application No. PCT/JP2007/066511 on Aug. 21, 2007, now Pat. No. 7,929,849.

(30) Foreign Application Priority Data

Aug. 23, 2006  (JP) ................................. 2006-226290
Aug. 23, 2006  (JP) ................................. 2006-226291

(51) Int. Cl.
*G03B 17/00* (2006.01)

(52) U.S. Cl. ........................................................ 396/55
(58) Field of Classification Search .................... 396/55
See application file for complete search history.

(56) References Cited

U.S. PATENT DOCUMENTS

| 5,865,519 A | 2/1999 | Maass |
| 6,005,723 A | 12/1999 | Kosaka et al. |
| 6,112,028 A | 8/2000 | Okada |
| 6,985,176 B2 | 1/2006 | Noguchi |
| 7,929,849 B2* | 4/2011 | Ohno ............................... 396/55 |
| 2002/0112543 A1 | 8/2002 | Noguchi |
| 2003/0117583 A1 | 6/2003 | Werhahn-Wunderlich |
| 2003/0184878 A1 | 10/2003 | Tsuzuki |
| 2006/0115251 A1 | 6/2006 | Nomura |
| 2007/0133967 A1 | 6/2007 | Takahashi et al. |
| 2007/0154195 A1 | 7/2007 | Irisawa et al. |
| 2007/0292119 A1 | 12/2007 | Lee |
| 2011/0188841 A1* | 8/2011 | Ohno ............................... 396/55 |

FOREIGN PATENT DOCUMENTS

| DE | 102005057514 | 6/2006 |
| GB | 002420874 | 6/2006 |
| JP | 4-170739 | 6/1992 |
| JP | 7-191361 | 7/1995 |
| JP | 7-294975 A | 11/1995 |
| JP | 11-183953 A | 7/1999 |
| JP | 11-305277 | 11/1999 |
| JP | 2000-187260 | 7/2000 |

(Continued)

*Primary Examiner* — William B. Perkey
(74) *Attorney, Agent, or Firm* — Dickstein Shapiro LLP

(57) ABSTRACT

An image blur correction device includes: a movable frame which is equipped with a lens or an imaging element and has a guide part; a fixed frame having a guide supporting part which movably supports the movable frame by coming into contact with the guide part; and a drive mechanism which drives the movable frame for correcting image blur by moving the movable frame relative to the fixed frame. The fixed frame has magnetic bodies, and the movable frame has urging magnets at positions corresponding to the magnetic bodies. Specifically, the urging magnets use attractive force between the magnets and the magnetic bodies, so as to urge the movable frame in a direction in which the guide part and the guide supporting part come into contact with each other.

5 Claims, 38 Drawing Sheets

FOREIGN PATENT DOCUMENTS

| | | |
|---|---|---|
| JP | 2001-100074 | 4/2001 |
| JP | 2002-196382 | 7/2002 |
| JP | 2004-274242 | 9/2004 |
| JP | 3728094 | 10/2005 |
| JP | 2006-178154 | 7/2006 |
| JP | 2007-114486 | 5/2007 |
| JP | 2007-212876 | 8/2007 |

* cited by examiner

FIG.2
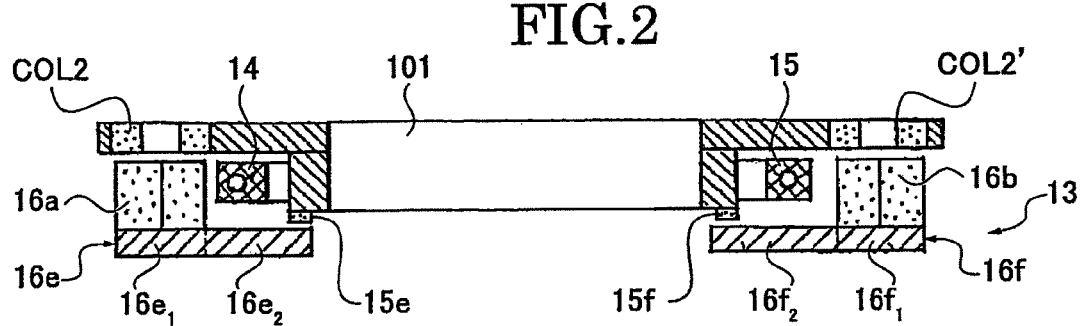
FIG.3
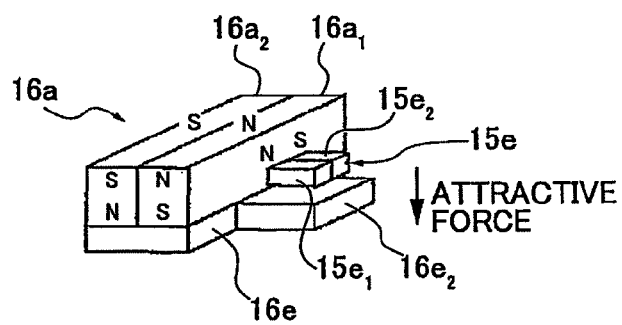
FIG.4
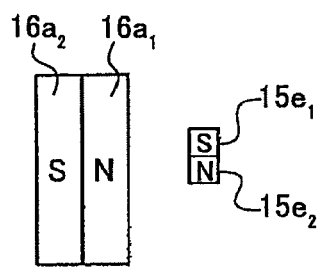
FIG.5A                FIG.5B
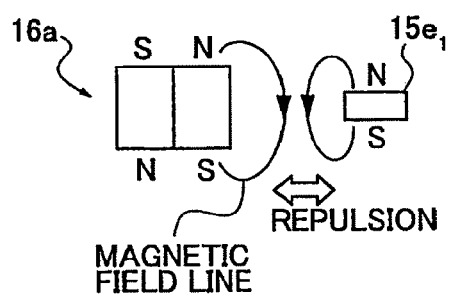    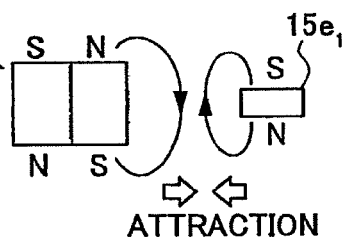

| FIG. 16A | FIG. 16B |
| FIG. 16C | FIG. 16D |

FIG.33
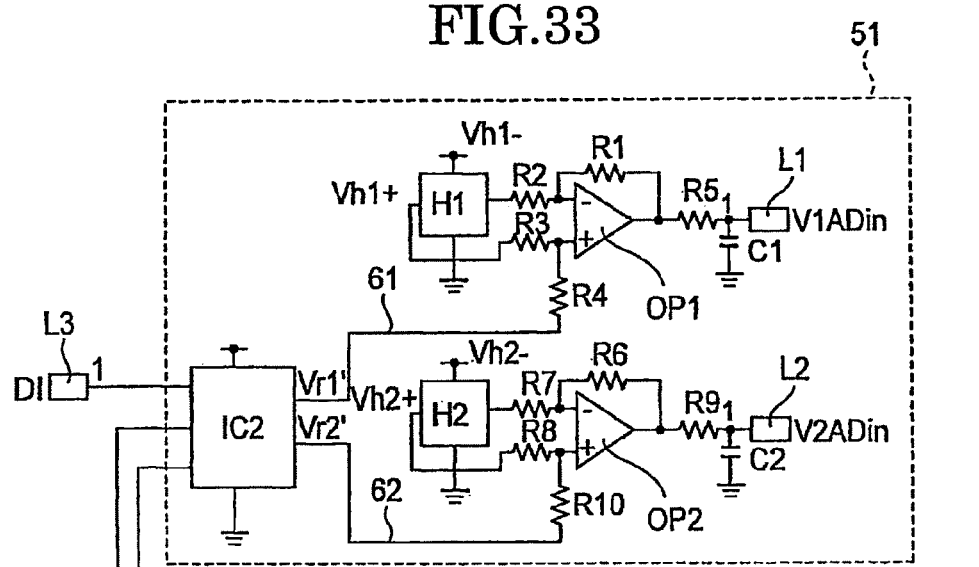
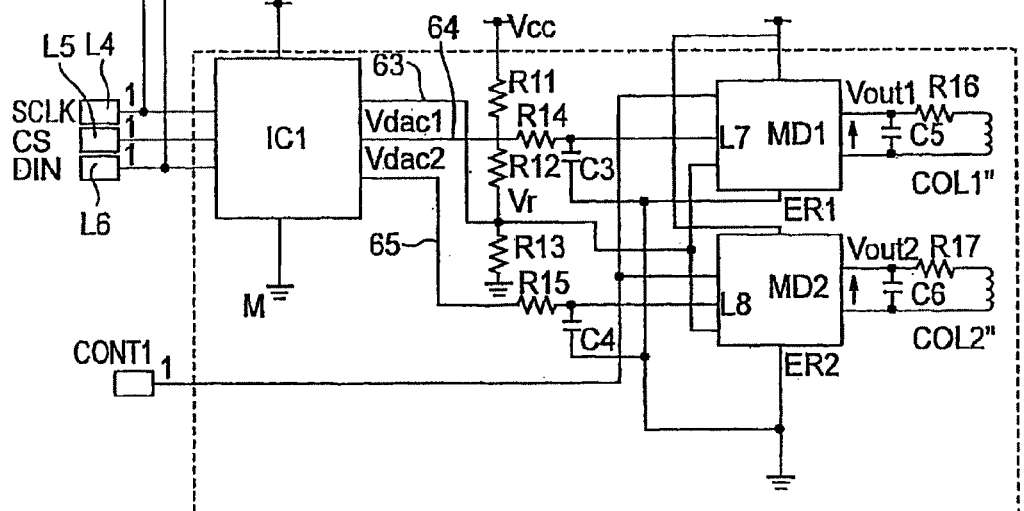
FIG.34
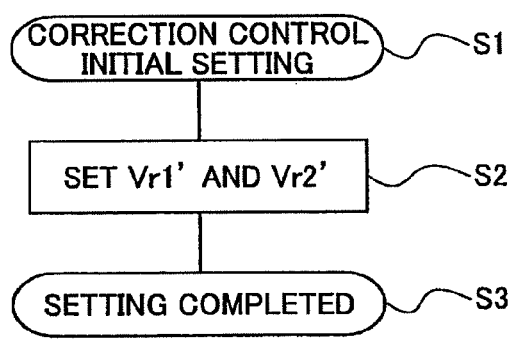

IMAGE BLUR CORRECTION DEVICE AND IMAGING APPARATUS EQUIPPED THEREWITH

PRIORITY CLAIM

This application is a divisional of application Ser. No. 12/377,216, filed on Feb. 11, 2009, now U.S. Pat. No. 7,929,849 which is the national stage of PCT/JP2007/066511, filed on Aug. 21, 2007, and is based on and claims priority benefit from each of Japanese Patent Application Nos. 2006-226290, filed on Aug. 23, 2006 and 2006-226291, filed on Aug. 23, 2006, the disclosures of which are incorporated herein by reference in their entireties.

TECHNICAL FIELD

The present invention relates to an image blur correction device which corrects image blur when a subject image is photographed by aloowing the subject image to image on an imaging element which generates image data to form the subject image, and also relates to an imaging apparatus. More particularly, the present invention relates to an image blur correction device having an image blur correction function which enables the photographing of a subject image whose blur is corrected by allowing an imaging element to follow movement of the subject image due to camera shake, and also relates to an imaging apparatus equipped with the image blur correction device.

BACKGROUND ART

There has conventionally been known, as an imaging apparatus, digital imaging apparatus including a camera shake correction mechanism. In an imaging apparatus described in Japanese Patent Application Laid-open Publication No. 2004-274242, an example of a camera shake correction mechanism is disclosed. In this imaging apparatus, a CCD as an imaging element is mounted on a Y movable frame. This Y movable frame is provided at one end of a fixation tube which houses a lens barrel on a photographing optical axis. The fixation tube is attached to a main body case. The Y movable frame is movably held by a guide stage along an X-Y plane perpendicular to the photographing optical axis as a Z axial direction. The guide stage is fixed to the photographing optical axis inside the main body case. The Y movable frame is set to be a structure (drive mechanism) which is operated by magnetic force formed by permanent magnets and coils facing the magnets on the guide stage. In this conventional imaging apparatus, a processor is provided in the main body case. This processor detects inclinations in X and Y directions caused in the main body case. Moreover, the processor controls the CCD to follow the movement of the subject image due to camera shake by changing a current distributed to the coils on the basis of detection outputs of the inclinations.

DISCLOSURE OF THE INVENTION

Meanwhile, in the imaging apparatus described above, if there is loose-fitting in guides of a movable mechanism such as a lens and the imaging element, in other words, if loose-fitting occurs between the guide stage and the Y movable frame due to a given amount of space in a spot where the guide stage holds the Y movable frame for smooth movement of the Y movable frame along the X-Y plane, the Y movable frame cannot be smoothly moved. Thus, there is a problem that image blur correction performance including the camera shake correction described above is adversely affected. Moreover, the imaging apparatus has a problem that the lens or the imaging element is inclined by the loose-fitting to cause an increase in aberration or a focal shift and thus imaging performance is also deteriorated. Consequently, Japanese Patent No. 3728094 discloses a mechanism having camera shake correction performance enhanced by providing a magnetic body at a position facing a permanent magnet in a drive mechanism and using attractive force between the magnetic body and the permanent magnet to remove loose-fitting. However, as in the mechanism disclosed in Japanese Patent No. 3728094, if the magnetic body is disposed in a magnetic field of the drive mechanism, there is an influence on a magnetic field distribution to coils for driving. As a result, there is a risk of causing lowering of driving force, an increase in a variation of the driving force within a moving range, generation of driving force in an unnecessary direction and the like in the drive mechanism. Moreover, in the mechanism disclosed in Japanese Patent No. 3728094, force urging a supporting part that movably supports a movable frame is likely to get off balance. Thus, removal of loose-fitting may not be surely performed.

The present invention is made in the light of the foregoing problems and an object of the present invention is to provide an image blur correction device which can smoothly move an imaging element or a lens by surely removing loose-fitting of a guide part, prevent deterioration of an image due to inclination and eliminate an influence on a magnetic field of a drive mechanism, and also to provide an imaging apparatus using the image blur correction device.

In order to accomplish the above object, an image blur correction device of the present invention includes: a movable frame which is equipped with a lens or an imaging element and has a guide part; a fixed frame having a guide supporting part which movably supports the movable frame by coming into contact with the guide part; and a drive mechanism which drives the movable frame for correcting image blur by moving the movable frame relative to the fixed frame. The fixed frame has magnetic bodies, and the movable frame has urging magnets at positions corresponding to the magnetic bodies. Specifically, the urging magnets use attractive force between the magnets and the magnetic bodies, so as to urge the movable frame in a direction in which the guide part and the guide supporting part come into contact with each other.

Here, it is preferable that combinations of the urging magnets and the magnetic bodies be disposed on both sides of the lens or the imaging element.

Moreover, it is preferable that the drive mechanism be a voice coil motor consisting of yokes made of a soft magnetic material, permanent magnets fixed to the yokes and coils, and that the magnetic bodies be formed by extending the yokes.

Moreover, it is preferable that the drive mechanism be a voice coil motor consisting of yokes made of a soft magnetic material, permanent magnets fixed to the yokes and coils, and that the urging magnets be a plurality of permanent magnets which have different magnetization directions and are arranged in parallel with the permanent magnets in the drive mechanism.

Moreover, in order to accomplish the above object, an image blur correction device of the present invention includes: a first movable frame which is equipped with a lens or an imaging element and has a first-direction guide part; a second movable frame having a second-direction guide part and a first-direction guide supporting part which movably supports the first movable frame by coming into contact with the first-direction guide part; a fixed frame having a second-direction guide supporting part which movably supports the second movable frame by coming into contact with the second-direction guide part; and a drive mechanism which drives the first and second movable frames for correcting image blur by moving at least one of the first and second movable frames relative to the fixed frame. The fixed frame has magnetic bodies, and the first movable frame has urging magnets at positions corresponding to the magnetic bodies. Specifically, the urging magnets use attractive force between the magnets and the magnetic bodies, so as to urge the first movable frame in a direction in which the first-direction guide part and the first-direction guide supporting part come into contact with each other, and so as to urge the second movable frame in a direction in which the second-direction guide part and the second-direction guide supporting part come into contact with each other.

Furthermore, in order to accomplish the above object, an imaging apparatus of the present invention includes the image blur correction device.

In order to accomplish the above object, an image blur correction device of the present invention includes: a movable frame which is equipped with a lens or an imaging element and has guides; a fixed frame having guide shafts which movably support the movable frame by coming into contact with the guides; and a drive mechanism which drives the movable frame for correcting image blur by moving the movable frame relative to the fixed frame. The guide shafts are made of a magnetic material, and permanent magnets are provided in portions on the guide shafts in the movable frame. Specifically, the permanent magnets use attractive force between the magnets and the guide shafts, so as to urge the movable frame in a direction in which the guides and the guide shafts come into contact with each other.

Moreover, in the image blur correction device of the present invention, the fixed frame has, as the guide shafts, two guide shafts disposed in parallel, and the movable frame has, as the guides, first and second guides coming into contact with one of the two guide shafts and a third guide coming into contact with the other guide shaft. The three guides include the permanent magnets, respectively.

Furthermore, in the image blur correction device of the present invention, the fixed frame has, as the guide shafts, two guide shafts disposed in parallel, and the movable frame has, as the guides, first and second guides coming into contact with one of the two guide shafts and a third guide coming into contact with the other guide shaft. The fixed frame includes the permanent magnets on an intermediate portion between the first and second guides and on the third guide.

Moreover, in order to accomplish the above object, an image blur correction device of the present invention includes: a movable frame which is equipped with a lens or an imaging element and has guide shafts; a fixed frame having guides which movably support the movable frame by coming into contact with the guide shafts; and a drive mechanism which drives the movable frame for correcting image blur by moving the movable frame relative to the fixed frame. The guide shafts are made of a magnetic material, and permanent magnets are provided in portions on the guide shafts in the fixed frame. Specifically, the permanent magnets use attractive force between the magnets and the guide shafts, so as to urge the movable frame in a direction in which the guides and the guide shafts come into contact with each other.

In order to accomplish the above object, an image blur correction device of the present invention includes: a first movable frame which is equipped with a lens or an imaging element and has first-direction guides; a second movable frame having second-direction guides and first-direction guide shafts which movably support the first movable frame by coming into contact with the first-direction guides; a fixed frame having second-direction guide shafts which movably support the second movable frame by coming into contact with the second-direction guides; and a drive mechanism which drives the first and second movable frames for correcting image blur by moving at least one of the first and second movable frames relative to the fixed frame. The first-direction guide shafts are made of a magnetic material, and the first movable frame has permanent magnets at positions on the first-direction guide shafts in the first movable frame. Specifically, the permanent magnets use attractive force between the magnets and the first-direction guide shafts, so as to urge the first movable frame in a direction in which the first-direction guides and the first-direction guide shafts come into contact with each other.

Moreover, in the image blur correction device of the present invention, the second-direction guide shafts are made of a magnetic material, and the second movable frame has permanent magnets at positions on the second-direction guide shafts in the second movable frame. Specifically, the permanent magnets use attractive force between the magnets and the second-direction guide shafts, so as to urge the second movable frame in a direction in which the second-direction guides and the second-direction guide shafts come into contact with each other.

Furthermore, in order to accomplish the above object, an imaging apparatus of the present invention includes the image blur correction device described above.

Effects of the Invention

According to the present invention, the urging magnets (permanent magnets) are provided in the movable frame in addition to the drive mechanism which drives the movable frame, and loose-fitting between the guide part and the guide supporting part in movement of the movable frame is removed by use of the attractive force between the magnets and the magnetic bodies in the fixed frame. Thus, there is no influence on a magnetic field distribution to coils for driving, and there is no risk of causing lowering of driving force, an increase in a variation of the driving force within a moving range, generation of driving force in an unnecessary direction and the like.

Moreover, according to one aspect of the present invention, the combinations of the urging magnets and the magnetic bodies are provided on both sides of the lens or the imaging element. Thus, since no bias occurs in the urging force to the movable frame, the loose-fitting between the guide part and the guide supporting part in movement of the movable frame can be surely removed.

Moreover, according to one aspect of the present invention, the magnetic bodies are formed by extending the yokes in the voice coil motor as the drive mechanism. Thus, it is possible to impart a function of removing the loose-fitting between the guide part and the guide supporting part in movement of the movable frame without newly adding magnetic parts.

Moreover, according to one aspect of the present invention, as the urging magnets, a plurality of permanent magnets having different magnetization directions are arranged in parallel with the permanent magnets in the drive mechanism. Thus, magnetic force acting between the permanent magnets as driving magnets and the urging magnets can be eliminated. As a result, it is possible to prevent deterioration of correction control performance or an increase in consumption current of the coils due to addition of attractive or repulsive force to the force required for correction generated by driving coils. Specifically, the attractive or repulsive force is made to act on the permanent magnets as the driving magnets by the urging magnets.

According to the present invention, the urging magnets (permanent magnets) are provided in the first movable frame in addition to the drive mechanism which drives the first movable frame, and loose-fitting between the first guide part and the first guide supporting part in movement of the first movable frame is removed by use of the attractive force between the magnets and the magnetic bodies in the fixed frame. Thus, there is no influence on a magnetic field distribution to coils for driving, and there is no risk of causing lowering of driving force, an increase in a variation of the driving force within a moving range, generation of driving force in an unnecessary direction and the like. Moreover, since the configuration in which the first movable frame is urged toward the fixed frame is adopted, loose-fitting between the second guide part and the second guide supporting part in movement of the second movable frame can also be removed without adding new parts to the second movable frame.

According to the present invention, the imaging apparatus includes the image blur correction device which can perform normal driving while removing the loose-fitting in movement of the movable frames (the first and second movable frames). Thus, an image whose blur is properly corrected can be obtained.

The image blur correction device according to the present invention includes: a movable frame which is equipped with a lens or an imaging element and has guides; and a fixed frame having guide shafts which movably support the movable frame by coming into contact with the guides. The guide shafts are made of a magnetic material, and permanent magnets are provided in portions on the guide shafts in the Movable frame. Specifically, the permanent magnets use attractive force between the magnets and the guide shafts, so as to urge the movable frame in a direction in which the guides and the guide shafts come into contact with each other. Thus, the lens or the imaging element can be smoothly moved, and deterioration of the image due to inclination can be prevented. Furthermore, not only the loose-fitting is removed but also an influence on a magnetic field between coils as driving means and the permanent magnets can be eliminated.

Moreover, as one aspect of the present invention, three permanent magnets as the urging magnets can be provided at positions corresponding to the guide shafts on the first to third guides. In this case, a distance between the urging magnets and the guide shafts can be accurately set in positioning thereof. Thus, stable removal of loose-fitting can be performed without much variation in the urging force.

Furthermore, as another aspect of the present invention, two permanent magnets as the urging magnets can be provided on an intermediate position between the first and second guides and on the third guide. In this case, the loose-fitting between the guides and the guide shafts can be surely eliminated even if the number of urging magnets is reduced.

BRIEF DESCRIPTION OF THE DRAWINGS

FIG. 2 is a cross-sectional view showing a configuration of the image blur correction device according to the first embodiment of the present invention.

FIG. 3 is an enlarged perspective view showing arrangement of a permanent magnet, a yoke and an urging magnet.

FIG. 4 is a view showing arrangement of the permanent magnet and the urging magnet when viewed from an optical axis direction.

FIG. 5A is a schematic view showing force working between a permanent magnet piece as a part of a drive mechanism and one of permanent magnets of the urging magnet.

FIG. 5B is a schematic view showing force working between the permanent magnet piece as a part of the drive mechanism and the other permanent magnet of the urging magnet.

FIG. 33 is a circuit block diagram of a camera shake correction control circuit according to the embodiment of the present invention.

FIG. 34 is a flowchart showing an example of variation correction setting processing according to the embodiment of the present invention.

DESCRIPTION OF NUMERALS

Figure 1:
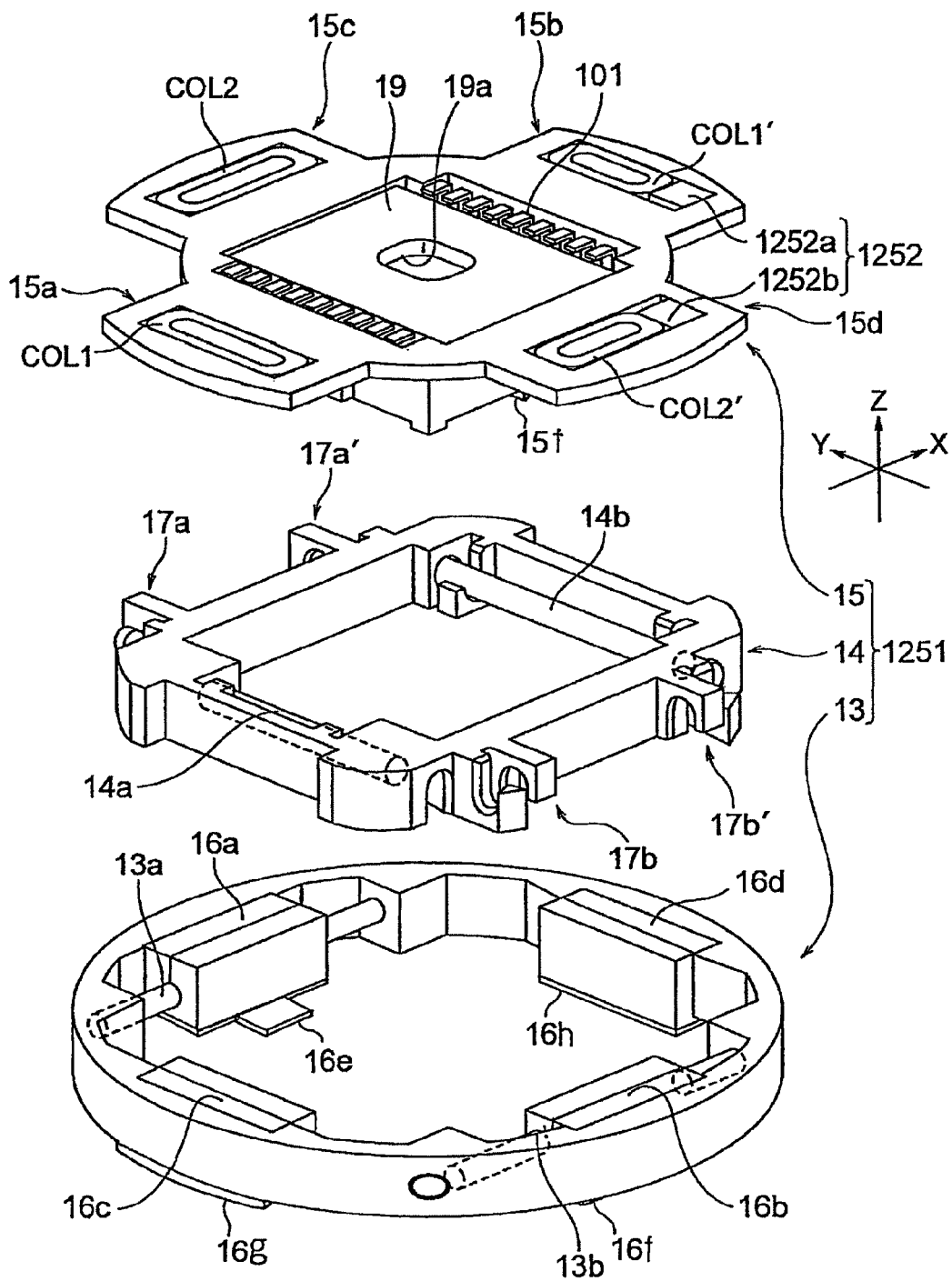
FIG. 1 is an exploded perspective view of a CCD stage as a first embodiment of an image blur correction device according to the present invention.

101 CCD (as imaging element)
1241 camera shake detection sensor
1251 CCD stage
1252 position detection element
1252*a* X position sensor
1252*b* Y position sensor
1263 origin position forced retention mechanism 13 X direction stage (as fixed frame)
13a, 13b guide shaft (X direction)
14 Y direction stage (as X movable frame)
14a, 14b guide shaft (Y direction)
15 mounting stage (as Y movable frame)
15a, 15b, 15c, 15d coil attachment plate part
15g, 15g', 15h guide (Y direction)
15e, 15f urging magnet
15mg, 15mg', 15mh urging magnet (in Y direction movement)
15i urging magnet holding part
16a, 16b, 16b', 16c, 16d, 16i, 16j permanent magnet (for driving)
16a1, 16a2 permanent magnet piece
16e, 16f, 16g, 16h, 16m, 16n yoke
16e1, 16f1, 16f1' yoke portion
16e2, 16f2, 16f2' extended portion
17a, 17a', 17b, 17b', 17b'' guide (X direction)
17c urging magnet holding part
17ma, 17ma', 17mb'', 17mc guide (X direction)
19 protection plate
19a recess
COL1, COL1', COL2, COL2' coiled body (for driving)

BEST MODE FOR CARRYING OUT THE INVENTION

With reference to the drawings, embodiments of an image blur correction device and an imaging apparatus equipped therewith according to the present invention will be described. However, the present invention is not limited to the following embodiments.

A first embodiment of an image blur correction device according to the present invention will be described below.

The first embodiment of the image blur correction device according to the present invention is an image blur correction device including: a movable frame which is equipped with a lens or an imaging element and has a guide part; a fixed frame having a guide supporting part which movably supports the movable frame by coming into contact with the guide part; and a drive mechanism which drives the movable frame for correcting image blur by moving the movable frame relative to the fixed frame. The fixed frame has a magnetic body, and the movable frame has an urging magnet at a position corresponding to the magnetic body. Specifically, the urging magnet uses attractive force between the magnet and the magnetic body, so as to urge the movable frame in a direction in which the guide part and the guide supporting part come into contact with each other. More particularly, the first embodiment of the image blur correction device according to the present invention is an image blur correction device including: a first movable frame which is equipped with a lens or an imaging element and has a first-direction guide part; a second movable frame having a second-direction guide part and a first-direction guide supporting part which movably supports the first movable frame by coming into contact with the first-direction guide part; a fixed frame having a second-direction guide supporting part which movably supports the second movable frame by coming into contact with the second-direction guide part; and a drive mechanism which drives the first and second movable frames for correcting image blur by moving at least one of the first and second movable frames relative to the fixed frame. The fixed frame has a magnetic body, and the first movable frame has an urging magnet at a position corresponding to the magnetic body. Specifically, the urging magnet uses attractive force between the magnet and the magnetic body, so as to urge the first movable frame in a direction in which the first-direction guide part and the first-direction guide supporting part come into contact with each other, and so as to urge the second movable frame in a direction in which the second-direction guide part and the second-direction guide supporting part come into contact with each other.

FIG. 1 shows a configuration example of a CCD stage 1251 as the first embodiment of the image blur correction device according to the present invention. Here, FIG. 1 is an exploded perspective view showing an image blur correction device equipped with a CCD (Charge-Coupled Device) that is an imaging element. In FIG. 1, an optical axis direction in an imaging apparatus (camera) to be described later is set to be a Z direction, and two directions perpendicular to each other on a plane having a Z axis as a normal line are set to be an X direction and a Y direction, respectively.

The CCD stage 1251 as the first embodiment of the image blur correction device according to the present invention includes a mounting stage 15, a Y direction stage 14 and an X direction stage 13. The mounting stage 15 is a Y movable frame (a first movable frame) which has a CCD 101 mounted thereon and is moved in the Y direction. The Y direction stage 14 is an X movable frame (a second movable frame), which is moved in the X direction, and is the stage for moving the mounting stage 15 in the Y direction. The X direction stage 13 is a fixed frame, which is fixed to a lens barrel main body in the imaging apparatus, and is the stage for moving the Y direction stage 14 in the X direction.

The X direction stage 13 is a ring-shaped frame having a hole passing through its center area in the Z direction, and is fixed to a base member 11 of the camera to be described later. In the X direction stage 13, as second-direction (X axis direction) guide supporting parts, a pair of guide shafts 13a and 13b extended in the X direction are provided with a space therebetween in the Y direction. In the X direction stage 13, four rectangular parallelepiped permanent magnets 16a to 16d are provided as driving magnets. The four permanent magnets 16a to 16d are disposed in pairs. The permanent magnets 16a and 16b as one of the pairs are disposed parallel to each other with a space therebetween in the Y direction within an X-Y plane. In the first embodiment, adopted is the configuration in which the pair of guide shafts 13a and 13b penetrate through the pair of permanent magnets 16a and 16b. However, the present invention is not limited thereto. The pair of permanent magnets 16a and 16b may be provided parallel to the pair of guide shafts 13a and 13b. Moreover, the permanent magnets 16c and 16d as the other pair are disposed with a space therebetween in the X direction within the X-Y plane.

Moreover, at a bottom of the X direction stage 13, plate-like yokes 16e to 16h made of soft magnetic metal members are provided so as to correspond to the permanent magnets 16a to 16d, respectively. The yokes 16e to 16h may be disposed at predetermined positions on the permanent magnets 16a to 16d, respectively. Moreover, the yokes 16e to 16h may be directly fixed to the permanent magnets 16a to 16d, respectively, or may be fixed to, for example, the base member 11 aside from the permanent magnets 16a to 16d.

Moreover, the yokes 16g and 16h are made of rectangular plates having the same size and shape as those of bottom faces of the permanent magnets 16c and 16d. Meanwhile, the yokes 16e and 16f are made of plates consisting of yoke portions (see reference numerals 16e1 and 16f1 in FIG. 2) and extended portions (see reference numerals 16e2 and 16f2 in FIG. 2). The yoke portions (see reference numerals 16e1 and 16f1 in FIG. 2) are formed to have the same size and shape as those of bottom faces of the permanent magnets 16a and 16b. The extended portions (see reference numerals 16e2 and 16f2 in FIG. 2) are extended from the yoke portions and formed so as to protrude to the center area of the X direction stage 13 from the bottom faces of the permanent magnets 16a and 16b, respectively. Moreover, the extended portions of the yokes 16e and 16f are disposed at positions on both sides of the CCD 101.

The Y direction stage 14 is a rectangular frame having a hole passing through its center area in the Z direction. In the Y direction stage 14, as first-direction (Y axis direction) guide supporting parts, a pair of guide shafts 14a and 14b extended in the Y direction are provided with a space therebetween in the X direction. In the Y direction stage 14, guides 17a, 17a', 17b and 17b' are provided as second-direction (X axis direction) guide parts. The guides 17a, 17a', 17b and 17b' are formed to have a bearing shape and are disposed in pairs ((17a and 17a') and (17b and 17b')), each pair having the guides facing each other with a space therebetween in the X direction. Both the pairs of guides (17a and 17a') and (17b and 17b') are provided with a space therebetween in the Y direction. The respective pairs of guides (17a and 17a') and (17b and 17b') are movably supported by the pair of guide shafts 13a and 13b in the X direction stage 13 in a state of coming into contact therewith. Thus, the Y direction stage 14 can be moved in the X direction.

The mounting stage 15 has a pair of coil attachment plate parts 15a and 15b protruding in the X direction and a pair of coil attachment plate parts 15c and 15d protruding in the Y direction. The CCD 101 is fixed in the center of the mounting stage 15. In the mounting stage 15, guides (not shown) are provided as first-direction (Y axis direction) guide parts on the same side as an imaging Surface of the CCD 101. The unillustrated guides are formed to have a bearing shape and are disposed in pairs, each pair having the guides facing each other with a space therebetween in the Y direction. Moreover, the pairs of guides are provided with a space therebetween in the X direction. The respective pairs of guides are movably supported by the pair of guide shafts 14a and 14b in the Y direction stage 14 in a state of coming into contact therewith. Thus, the mounting stage 15 can be moved in the X and Y directions as a whole. Accordingly, the X direction stage 13 and the Y direction stage 14 act as guide stages which hold the mounting stage 15 so as to be movable along the X-Y plane. Moreover, since the X direction stage 13 is provided in the base member 11 in a fixed cylinder 10, the stage is fixed with respect to a photographing optical axis in a main body case. Note that, in the first embodiment, the first direction is set as the Y axis direction, and the second direction is set as the X axis direction. However, the first and second directions are not limited to those in the first embodiment but may be any two directions tilted within the plane perpendicular to the optical axis direction.

Moreover, at the frame bottom of the mounting stage 15, urging magnets 15e and 15f are provided. The urging magnets 15e and 15f are provided at positions facing the extended portions of the yokes 16e and 16f in the Z direction, in other words, at positions immediately above the extended portions. Specifically, a combination of the urging magnet 15e and the extended portion of the yoke 16e and a combination of the urging magnet 15f and the extended portion of the yoke 16f form a pair with the CCD 101 interposed therebetween along the Y axis direction. Moreover, the combination of the urging magnet 15e and the extended portion of the yoke 16e and the combination of the urging magnet 15f and the extended portion of the yoke 16f are provided so as to be symmetrical with respect to an X-Z plane including a center line connecting respective coiled bodies COL1 and COL1' and with respect to a Y-Z plane including a center line connecting respective coiled bodies COL2 and COL2'.

Moreover, a protection plate 19 is attached to a surface of the CCD 101, which is opposite to the imaging surface. The protection plate 19 has a tapered recess 19a formed in its center. Functions of the recess 19a will be described later.

The flat and spiral coiled bodies COL1 and COL1' are attached to the pair of coil attachment plate parts 15a and 15b, respectively. The coiled bodies COL1 and COL1' are series-connected. The flat and spiral coiled bodies COL2 and COL2' are attached to the pair of coil attachment plate parts 15c and 15d, respectively. The coiled bodies COL2 and COL2' are also series-connected in the same manner as the coiled bodies COL1 and COL1'.

The coiled body COL1 faces the permanent magnet 16c and the coiled body COL1' faces the permanent magnet 16d. Moreover, the coiled body COL2 faces the permanent magnet 16a and the coiled body COL2' faces the permanent magnet 16b. The pair of coiled bodies COL1 and COL1' are used to move the CCD 101 (the mounting stage 15) in the X direction. Moreover, the pair of coiled bodies COL2 and COL2' are used to move the CCD 101 (the mounting stage 15) in the Y direction. Thus, in this embodiment, the pair of coiled bodies COL1 and COL1' function as a first coil, and each of the permanent magnets 16a and 16b functions as a first permanent magnet. Moreover, the pair of coiled bodies COL2 and COL2' function as a second coil, and each of the permanent magnets 16a and 16b functions as a second permanent magnet.

Specifically, a combination of the yoke portion (16e1) of the yoke 16e, the permanent magnet 16a and the coiled body COL2 and a combination of the yoke portion (16f2) of the yoke 16f, the permanent magnet 16b and the coiled body COL2' serve as means for driving the mounting stage 15 in the Y direction, in other words, function as a drive mechanism in the Y direction. Moreover, a combination of the yoke 16g, the permanent magnet 16c and the coiled body COL1 and a combination of the yoke 16h, the permanent magnet 16d and the coiled body COL1' serve as means for driving the mounting stage 15 in the X direction, in other words, function as a drive mechanism in the X direction. Accordingly, the drive mechanisms (drive means) for moving the mounting stage 15 in the X and Y directions are motors consisting of the coils and the permanent magnets (voice coil motors using electric energy to cause translatory movement).

Moreover, in the coil attachment plate part 15b as one of the pair of coil attachment plate parts 15a and 15b, a position detection element 1252a is provided. Similarly, in the coil attachment plate part 15d as one of the pair of coil attachment plate parts 15c and 15d, a position detection element 1252b is provided. The position detection element 1252a is an X position sensor for detecting a position of the mounting stage 15 (the CCD 101) in the X direction. The position detection element 1252b is a Y position sensor for detecting a position of the mounting stage 15 (the CCD 101) in the Y direction. As the position detection elements 1252a and 1252b, hall elements are used in the first embodiment.

Here, in the image blur correction device according to the first embodiment of the present invention, unillustrated blur detection means is provided on the side of the camera mounted. In the image blur correction device, the position of the mounting stage 15 in the X direction is detected by the hall element 1252a and the position of the mounting stage 15 in the Y direction is detected by the hall element 1252b. Moreover, the position of the CCD 101 is controlled to be moved to a predetermined position by an unillustrated control circuit so that image blur on the CCD 101 due to camera shake is eliminated.

FIG. 2 is a cross-sectional view showing a configuration of the image blur correction device according to the first embodiment of the present invention. FIG. 2 shows a cross-section of the image blur correction device shown in FIG. 1, which is cut along the Y direction at the center position in the X direction. In order to clarify positional relationships between the CCD 101, the coiled bodies COL2 and COL2', the urging magnets 15e and 15f, the permanent magnets 16a and 16b and the yokes 16e and 16f, the other components of the image blur correction device are omitted.

FIG. 2 shows a state where the X direction stage 13, the Y direction stage 14 and the mounting stage 15 are properly disposed sequentially from the bottom. Here, the yokes 16e and 16f are fixed to surfaces of the permanent magnets 16a and 16b, respectively, the surfaces being opposite to those facing the coiled bodies COL2 and COL2'. Moreover, the yokes 16e and 16f consist of the yoke portions 16e1 and 16f1 and the extended portions 16e2 and 16f2, respectively. The yoke portions 16e1 and 16f1 are set to have the same size and shape as those of the bottom faces of the permanent magnets 16a and 16b. The extended portions 16e2 and 16f2 are extended from the yoke portions 16e1 and 16f1 and formed so as to protrude to the center area of the X direction stage 13 from the bottom faces of the permanent magnets 16a and 16b, respectively. Moreover, at the frame bottom of the mounting stage 15, the urging magnets 15e and 15f are provided. The urging magnets 15e and 15f may have a size that can impart urging force enabling removal of backlash between the guides (not shown) in the mounting stage 15 and the guide shafts 14a and 14b and between the guides 17a, 17a', 17b and 17b' and the guide shafts 13a and 13b. Here, the removal of backlash means the following. Specifically, for smooth movement of the mounting stage 15 in the Y direction with respect to the Y direction stage 14, a given amount of space (clearance) is provided between the guides (not shown) in the mounting stage 15 and the guide shafts 14a and 14b in the Y direction stage 14. When the mounting stage 15 is moved in the Y axis direction with respect to the Y direction stage 14, displacement in the Z axis direction, so-called loose-fitting may be caused by the given amount of space. Moreover, for smooth movement of the Y direction stage 14 in the X direction with respect to the X direction stage 13, a given amount of space (clearance) is provided also between the guides 17a, 17a', 17b and 17b' in the Y direction stage 14 and the guide shafts 13a and 13b in the X direction stage 13. Accordingly, loose-fitting may be caused by the given amount of space also between the Y direction stage 14 and the X direction stage 13. To deal with this loose-fitting, the mounting stage 15 is urged toward the X direction stage 13. This urging allows the guide shafts 14a and 14b to come into contact with upper surfaces (surfaces holding the guide shafts 14a and 14b from above) of the guides (not shown) in the mounting stage 15. Moreover, the above urging also allows the guide shafts 13a and 13b to come into contact with upper surfaces (surfaces holding the guide shafts 14a and 14b from above) of the guides 17a, 17a', 17b and 17b' in the Y direction stage 14. By allowing the guide shafts and the surfaces of the guides to come into contact with each other as described above, occurrence of the displacement in the Z axis direction, so-called loose-fitting due to the given amount of space (clearance) is prevented between the mounting stage 15 and the Y direction stage 14 and between the Y direction stage 14 and the X direction stage 13 without inhibiting the smooth movement thereof. Such prevention of occurrence of loose-fitting is called the removal of backlash. Moreover, it is preferable that each of the extended portions 16e2 and 16f2 at least have an area covering a range in which each of the urging magnets 15e and 15f is moved along with movement of the mounting stage 15.

As described above, in the CCD stage 1251, the extended portions 16e2 and 16f2 of the yokes 16e and 16f are extended to the positions facing the urging magnets 15e and 15f in the Z direction, respectively. Thus, attractive force acting between the urging magnets 15e and 15f and the extended portions 16e2 and 16f2 works so as to urge the mounting stage 15 downward in FIG. 2. Consequently, in the CCD stage 1251, removal of backlash between the guides in the mounting stage 15 and the guide shafts 14a and 14b in movement of the mounting stage 15 and removal of backlash between the guides 17a, 17a', 17b and 17b' and the guide shafts 13a and 13b in movement of the Y direction stage 14 can be performed.

Moreover, in the CCD stage 1251, the urging magnets 15e and 15f and the extended portions 16e2 and 16f2 are provided on both sides of the CCD 101 when viewed from the Y direction so as to sandwich the CCD 101. Accordingly, in the CCD stage 1251, there is no bias in the urging force between the guides in the mounting stage 15 and the guide shafts 14a and 14b and between the guides 17a, 17a', 17b and 17b' and the guide shafts 13a and 13b. Thus, the removal of backlash can be surely performed.

Furthermore, in the CCD stage 1251, the combination of the urging magnet 15e and the extended portion 16e2 of the yoke 16e and the combination of the urging magnet 15f and the extended portion 16f2 of the yoke 16f are set to be symmetrical with respect to the X-Z plane including the center line connecting the respective coiled bodies COL1 and COL1' and with respect to the Y-Z plane including the center line connecting the respective coiled bodies COL2 and COL2'. Therefore, in the CCD stage 1251, there is no bias in the downward urging force applied to the mounting stage 15. Thus, the removal of backlash can be surely performed.

Meanwhile, in the CCD stage 1251, as to each of the combination of the urging magnet 15e and the extended portion 16e2 of the yoke 16e and the combination of the urging magnet 15f and the extended portion 16f2 of the yoke 16f, the magnet and the extended portion are disposed close to each other without having another member, particularly, a magnetic substance interposed therebetween. Thus, in the CCD stage 1251, the removal of backlash can be surely performed with weak magnetic force. Consequently, in the CCD stage 1251, unnecessary magnetic force can be prevented from acting on the drive mechanisms for moving the mounting stage 15 (the CCD 101) in the X and Y directions, which are motors consisting of the coils and the permanent magnets. Moreover, in the CCD stage 1251, it is possible to suppress inhibition of control over movement of the mounting stage 15 in the X and Y directions by the drive mechanisms.

In the CCD stage 1251, the combination of the urging magnet 15e and the extended portion 16e2 of the yoke 16e is provided at a position that does not cross between the permanent magnet 16a and the coiled body COL2, between the permanent magnet 16b and the coiled body COL2', between the permanent magnet 16c and the coiled body COL1 and between the permanent magnet 16d and the coiled body COL1', all of which are set facing each other as the drive mechanisms. Moreover, in the CCD stage 1251, the combination of the urging magnet 15f and the extended portion 16f2 of the yoke 16f is also provided at a position that does not cross between the permanent magnet 16a and the coiled body COL2, between the permanent magnet 16b and the coiled body COL2', between the permanent magnet 16c and the coiled body COL1 and between the permanent magnet 16d and the coiled body COL1', all of which are set facing each other as the drive mechanisms. Consequently, in the CCD stage 1251, unnecessary magnetic force can be prevented from acting on the drive mechanisms for moving the mounting stage 15 in the X and Y directions. Moreover, in the CCD stage 1251, it is possible to suppress inhibition of control over the movement of the mounting stage 15 in the X and Y directions by the drive mechanisms.

Although the urging magnets 15e and 15f and the extended portions 16e2 and 16f2 are provided on both the sides of the CCD 101 when viewed from the Y direction in this embodiment, the magnets and the extended portions may be provided on both sides of the CCD 101 when viewed from the X direction.

FIG. 3 is an enlarged perspective view showing the permanent magnet 16a, the yoke 16e and the urging magnet 15e. Moreover, FIG. 4 is a view showing an arrangement relationship between the permanent magnet 16a and the urging magnet 15e when viewed from the optical axis direction. The urging magnet 15e consists of two permanent magnets 15e1 and 15e2. The two permanent magnets 15e1 and 15e2 are arranged parallel to each other in a horizontal direction toward the permanent magnet 16a, in other words, are arranged in parallel in an extending direction of the permanent magnet 16a (the X axis direction). The two permanent magnets 15e1 and 15e2 are adjacently disposed while having magnetization directions set opposite to each other. Here, the permanent magnet 15e1 has its S pole facing the extended portion 16e2 of the yoke 16e and has its N pole opposite thereto. Moreover, on the contrary, the permanent magnet 15e2 has its N pole facing the extended portion 16e2 and has its S pole opposite thereto. Note that the permanent magnet 16a includes permanent magnet pieces 16a1 and 16a2 arranged in the Y axis direction. Specifically, the permanent magnet piece 16a1 has its S pole facing the yoke 16e and has its N pole opposite thereto, and the permanent magnet piece 16a2 has its N pole facing the yoke 16e and has its S pole opposite thereto. The permanent magnet piece 16a1 is disposed on the urging magnet 15e side.

FIGS. 5A and 5B show forces working (acting) between the permanent magnet piece 16a1 and the permanent magnets 15e1 and 15e2. As shown in FIG. 5A, a magnetization direction of the permanent magnet piece 16a1 closer to the urging magnet 15e in the permanent magnet 16a is the same as the magnetization direction of the permanent magnet 15e1. Therefore, repulsive force works between the permanent magnet piece 16a1 and the permanent magnet 15e1. Meanwhile, as shown in FIG. 5B, the magnetization direction of the permanent magnet piece 16a1 is opposite to the magnetization direction of the permanent magnet 15e2. Therefore, attractive force works between the permanent magnet piece 16a1 and the permanent magnet 15e2. Here, when only one of the permanent magnets 15e1 and 15e2 is provided, only one of attractive force and repulsive force with respect to the permanent magnet 16a works on the mounting stage 15 having the CCD 101 mounted thereon. Thus, the attractive or repulsive force described above is unnecessarily added to force required for image blur correction, which is generated by the permanent magnet 16a and the coiled body COL2 disposed opposite thereto. Accordingly, correction control performance is deteriorated or power consumption of the coils is increased. In the first embodiment, the urging magnet 15e is formed of the two adjacent permanent magnets 15e1 and 15e2 having the magnetization directions opposite to each other. Thus, the repulsive force and the attractive force of the two permanent magnets 15e1 and 15e2 acting on the permanent magnet 16a are canceled. Consequently, generation of the above unnecessary force by the urging magnet 15e can be prevented. Moreover, it is preferable that the permanent magnets 15e1 and 15e2 have the same size if the same material is used.

Figure 6:
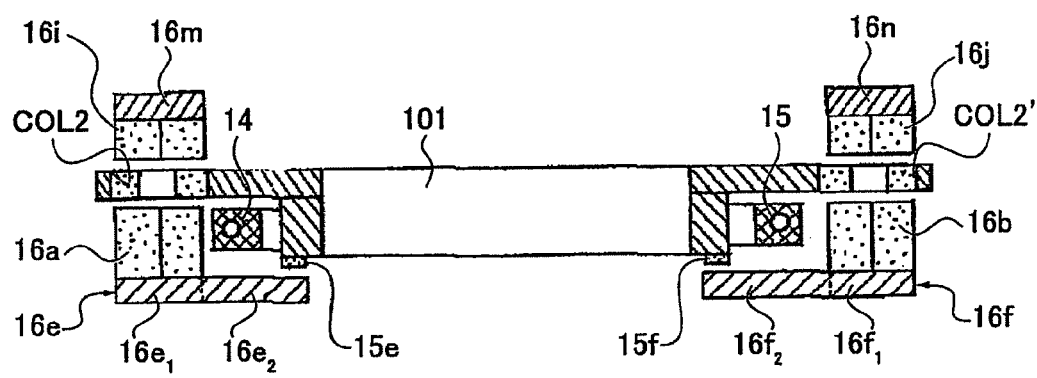
FIG. 6 is a cross-sectional view showing a configuration of a first modified example of the first embodiment of the image blur correction device according to the present invention.
Figure 7:
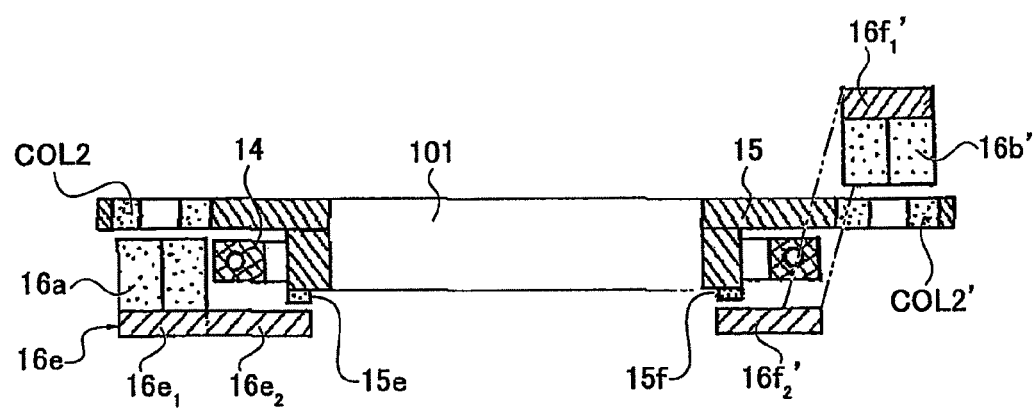
FIG. 7 is a cross-sectional view showing a configuration of a second modified example of the first embodiment of the image blur correction device according to the present invention.

Although one configuration example of the image blur correction device according to the present invention has been described above, permanent magnets as driving magnets and yokes may be added or the arrangement positions may be changed. FIGS. 6 and 7 show configuration examples of the image blur correction device according to first and second modified examples of the first embodiment of the present invention.

FIG. 6 shows the first modified example in which permanent magnets as driving magnets and yokes are added to the configuration of the image blur correction device shown in FIG. 2. Here, permanent magnets 16i and 16j and yokes 16m and 16n are disposed so as to face the coiled bodies COL2 and COL2' on a side opposite to the side where the permanent magnets 16a and 16b paired up with the coiled bodies COL2 and COL2' are disposed. The permanent magnets 16i and 16j and the yokes 16m and 16n may be arbitrarily provided in the base member 11 (see FIG. 19) to be described later or the like. When magnetic force per unit volume is set equal by arranging the permanent magnets so as to sandwich the coiled bodies COL2 and COL2' as described above, volumes of the permanent magnets 16a, 16b, 16i and 16j can be reduced as compared with those in the configuration shown in FIG. 2. As a result, thicknesses thereof can be reduced.

FIG. 7 shows the second modified example in which the arrangement positions of the permanent magnet as the driving magnet and the yoke are changed in the configuration of the image blur correction device shown in FIG. 2. Here, the arrangement positions of the permanent magnet 16b and the yoke portion 16f1 of the yoke 16f in FIG. 2 are changed. Specifically, a permanent magnet 16b' and a yoke portion 16f1' of the yoke 16f are arranged so as to face the coiled body COL2' on the opposite side of the coiled body COL2' (above the coiled body COL2' in FIG. 7). In this case, the yoke portion 16f1' and an extended portion 16f1 may be connected to each other by a connection part which is extended around the coil attachment plate part 15d having the coiled body COL2' provided therein and is indicated by double dashed lines. Thus, a degree of freedom of design for the image blur correction device can be increased.

With reference to FIGS. 8 to 12, an image blur correction device according to a second embodiment of the present invention will be described below. Here, description will be given of an example where a movable frame has a CCD 101 mounted thereon.

The image blur correction device according to the second embodiment of the present invention is an image blur: correction device including: a movable frame which is equipped with a lens or an imaging element and has guides; a fixed frame having guide shafts which movably support the movable frame by, coming into contact with the guides; and a drive mechanism which drives the movable frame for correcting image blur by moving the movable frame relative to the fixed frame. In the image blur correction device, the guide shafts are made of magnetic materials and permanent magnets are provided above the guide shafts in the movable frame. Specifically, the permanent magnets use attractive force between the magnets and the guide shafts, so as to urge the movable frame in a direction in which the guides and the guide shafts come into contact with each other.

Figure 8:
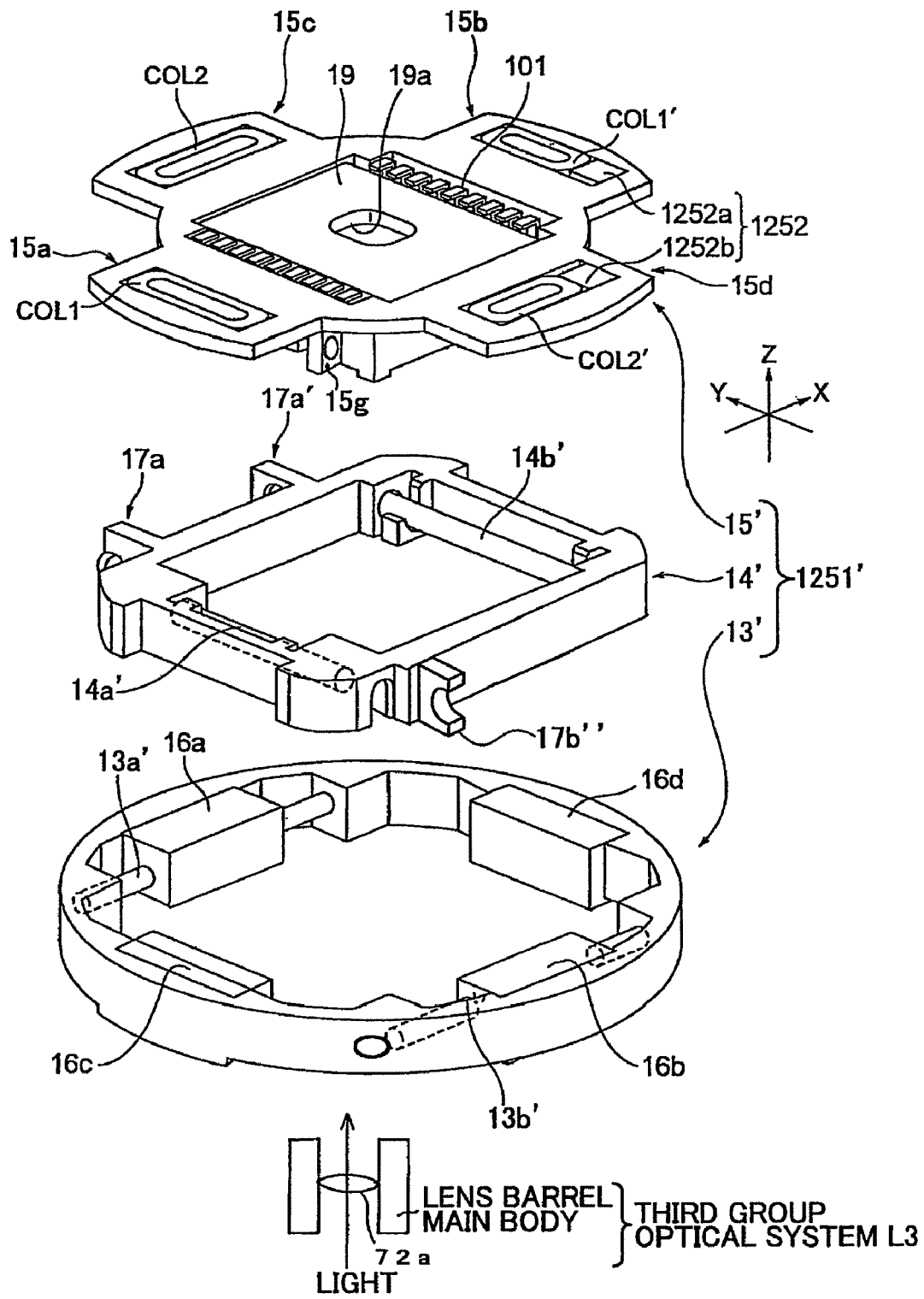
FIG. 8 is an exploded perspective view of a CCD stage as a second embodiment of the image blur correction device according to the present invention.

FIG. 8 is an exploded perspective view showing a CCD stage 1251' as the second embodiment of the image blur correction device according to the present invention. The CCD stage 1251' has the same basic configuration as that of the CCD stage 1251 in the first embodiment. Thus, the same functional parts are denoted by the same reference numerals as those in the first embodiment, and detailed description thereof will be omitted.

As in the case of the CCD stage 1251 in the first embodiment, the CCD stage 1251' as the second embodiment of the image blur correction device according to the present invention includes: a mounting stage 15' that is a first movable frame and also a Y movable frame, which has a CCD 101 mounted thereon; a Y direction stage 14' that is a second movable frame and also an X movable frame; and an X direction stage 13' that is a fixed frame.

In the Y direction stage 14', first and second guide shafts 14a' and 14b' are fixed parallel to each other, which are first-direction (Y axis direction) guide shafts and are made of magnetic materials. Unlike the mounting stage 15 in the first embodiment, no urging magnets 15e and 15f are provided in the mounting stage 15'. In the mounting stage 15', provided are: first and second guides 15g and 15g' (see FIG. 9) which have holes into which the first guide shaft 14a' is inserted; and a third guide 15h (see FIG. 9) which has a U-shaped groove into which the second guide shaft 14b' is inserted. Thus, the first guide 15g, the second guide 15g' and the third guide 15h function as first-direction (Y axis direction) guides. The respective guides 15g, 15g' and 15h movably hold the mounting stage 15' at three spots while coming into contact with the respective guide shafts 14a' and 14b' in the Y direction stage 14'. Thus, the mounting stage 15' can be moved, while maintaining its posture, in an extending direction of the guide shafts 14a' and 14b', in other words, in a Y direction that is a guide direction of the first-direction guides.

Moreover, unlike the X direction stage 13 in the first embodiment, no yokes 16e to 16h are provided in the X direction stage 13'. In the X direction stage 13', first and second guide shafts 13a' and 13b' are fixed parallel to each other, which are second-direction (X axis direction) guide shafts and are made of magnetic materials. In the Y direction stage 14', provided are: first and second guides 17a and 17a' having holes into which the first guide shaft 13a' is inserted; and a third guide 17b" having a U-shaped groove into which the second guide shaft 13b' is inserted. Thus, the first guide 17a, the second guide 17a' and the third guide 17b" function as second-direction (X axis direction) guides. The respective guides 17a, 17a' and 17b" movably hold the Y direction stage 14' at three spots while coming into contact with both the guide shafts 13a' and 13b' in the X direction stage 13'. Thus, the Y direction stage 14' can be moved, while maintaining its posture, in an extending direction of both the guide shafts 13a' and 13b', in other words, in an X direction that is a guide direction of the second-direction guides. Thus, the CCD 101 mounted on the mounting stage 15' can be moved in an arbitrary direction on an X-Y plane.

Figure 9:
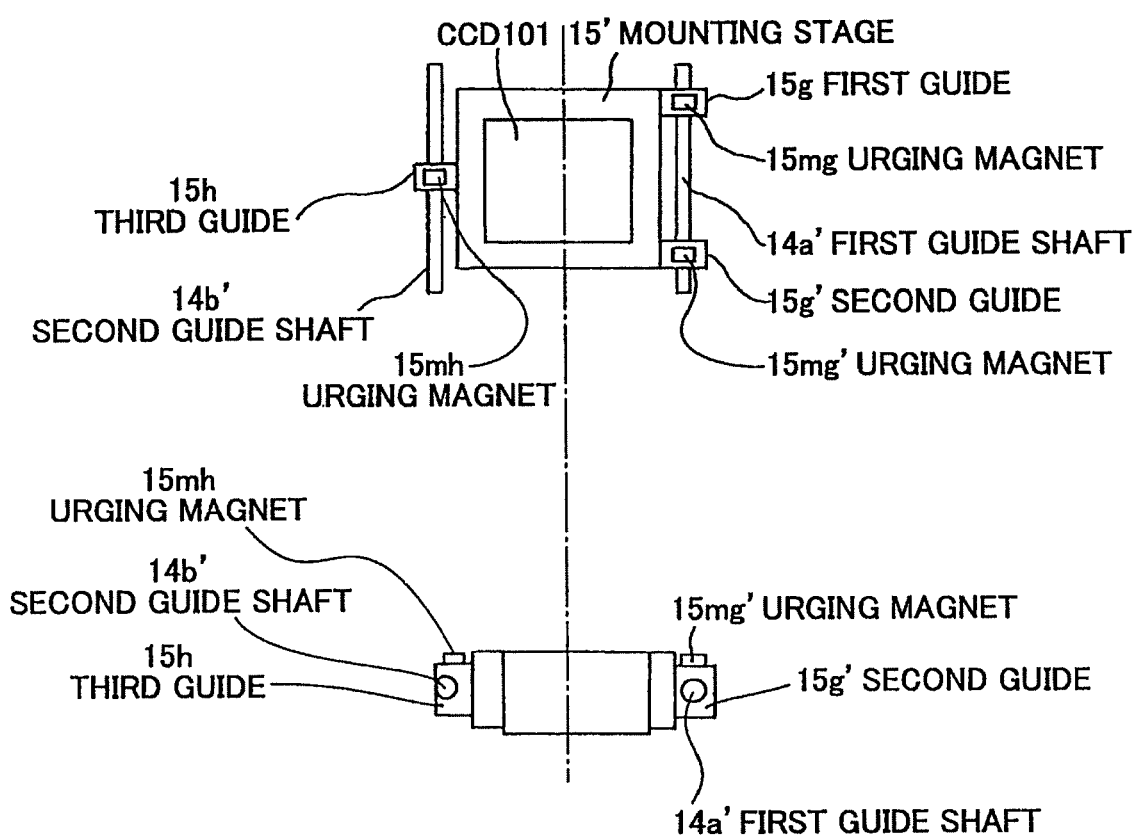
FIG. 9 is an explanatory view of the CCD stage as the second embodiment of the image blur correction device according to the present invention, showing, in its lower part, a schematic side view of a mounting stage in the CCD stage when viewed from an X direction and also showing, in its upper part, a relationship among respective guides in the mounting stage, respective urging magnets provided thereon and both guide shafts in a Y direction stage.

FIG. 9 shows, in its lower part, a schematic side view of the mounting stage 15' in the CCD stage 1251' of the second embodiment when viewed from the X direction. Moreover, FIG. 9 also shows, in its upper part, a relationship among the respective guides 15g, 15g' and 15h in the mounting stage 15', respective urging magnets 15mg, 15mg' and 15mh provided thereon, and both the guide shafts 14a' and 14b' in the Y direction stage 14'.

Here, the urging magnet 15mg made of a permanent magnet is provided on the first guide 15g. The urging magnet 15mg' made of a permanent magnet is provided on the second guide 15g'. The urging magnet 15mh made of a permanent magnet is provided on the third guide 15h. The respective urging magnets 15mg, 15mg' and 15mh are provided so as to face both the guide shafts 14a' and 14b' in a Z axis direction.

The respective urging magnets 15mg, 15mg' and 15mh urge the first and second guide shafts 14a' and 14b' facing therewith so as to attract both the guide shafts 14a' and 14b' toward one side in each of the guides 15g, 15g' and 15h by attracting the guide shafts. Thus, removal of backlash is performed in the above manner.

As described above, in the CCD stage 1251', the urging magnets 15mg, 15mg' and 15mh are attached to the guides 15g, 15g' and 15h. Thus, in the CCD stage 1251', good distance accuracy is realized between the urging magnets 15mg, 15mg' and 15mh and the guide shafts 14a' and 14b' as magnetic bodies in positioning thereof. Moreover, there is also hardly a variation in urging force. Thus, stable removal of backlash can be performed.

Moreover, in the CCD stage 1251'; combinations of the urging magnets 15mg, 15mg' and 15mh and both the guide shafts 14a' and 14b' are arranged on both sides of the CCD 101 so as to sandwich the CCD 101. Accordingly, in the CCD stage 1251', there is no bias in the urging force acting on the mounting stage 15' when both the guide shafts 14a' and 14b' are attracted toward one side in each of the guides 15g, 15g' and 15h. Thus, the removal of backlash can be surely performed.

Furthermore, in the CCD stage 1251', the urging magnets 15mg, 15mg' and 15mh are attached to the guides 15g, 15g' and 15h. Thus, in the CCD stage 1251', the urging magnets 15mg, 15mg' and 15mh and the first and second guide shafts 14a' and 14b', which are urged so as to be attracted by attractive force of the magnets, can be disposed close to each other. Thus, in the CCD stage 1251', the removal of backlash can be surely performed with weak magnetic force. Consequently, in the CCD stage 1251', unnecessary magnetic force can be prevented from acting on drive mechanisms for moving the mounting stage 15' in the X and Y directions, which are motors consisting of coils and permanent magnets. Moreover, it is possible to suppress inhibition of control over movement of the mounting stage 15' in the X and Y directions by the drive mechanisms.

In the CCD stage 1251', the combinations of the urging magnets 15mg, 15mg' and 15mh and both the guide shafts 14a' and 14b' are provided at positions that do not cross between a permanent magnet 16a and a coiled body COL2, between a permanent magnet 16b and a coiled body COL2', between a permanent magnet 16c and a coiled body COL1 and between a permanent magnet 16d and a coiled body COL1', all of which are set facing each other so as to function as the drive mechanisms for moving the mounting stage 15' in the X and Y directions. Consequently, in the CCD stage 1251', unnecessary magnetic force can be prevented from acting on the drive mechanisms for moving the mounting stage 15' in the X and Y directions. Moreover, it is possible to suppress inhibition of control over the movement of the mounting stage 15' in the X and Y directions by the drive mechanisms.

Figure 10:
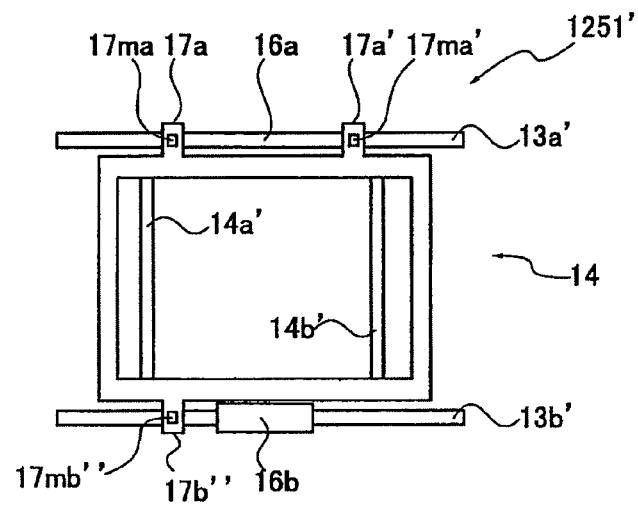
FIG. 10 is an explanatory view of the CCD stage as the second embodiment of the image blur correction device according to the present invention, showing a relationship among respective guides in the Y direction stage, respective urging magnets provided thereon and both guide shafts in an X direction stage.

Moreover, FIG. 10 shows a relationship among the respective guides 17a, 17a' and 17b" in the Y direction stage 14', urging magnets 17ma, 17ma' and 17mb" and both the guide shafts 13a' and 13b' in the X direction stage 13' in the CCD stage 1251'.

In the Y direction stage 14', the urging magnet 17ma made of a permanent magnet is provided on the first guide 17a. Moreover, the urging magnet 17ma' made of a permanent magnet is provided on the second guide 17a'. Furthermore, the urging magnet 17mb" made of a permanent magnet is provided on the third guide 17b". The urging magnets 17ma, 17ma' and 17mb" are provided so as to face both the guide shafts 13a' and 13b' in the Z direction. The respective urging magnets 17ma, 17ma' and 17mb" urge the first and second guide shafts 13a' and 13b' in the X direction stage 13' facing therewith so as to attract both the guide shafts 13a' and 13b' toward one side in each of the guides 17a, 17a' and 17b" by attracting the guide shafts. Thus, removal of backlash is performed in the above manner.

As mentioned above, in the CCD stage 1251', the urging magnets 17ma, 17ma' and 17mb" are attached to the respective guides 17a, 17a' and 17b" in the Y direction stage 14'. Thus, in the CCD stage 1251', good distance accuracy is realized between the urging magnets 17ma, 17ma' and 17mb" and the guide shafts 13a' and 13b' as magnetic bodies in positioning thereof. Moreover, there is also hardly a variation in urging force. Thus, stable removal of backlash can be performed.

Moreover, in the CCD stage 1251', combinations of the urging magnets 17ma, 17ma' and 17mb" and both the guide shafts 13a' and 13b' are arranged on both sides of the CCD 101 so as to sandwich the CCD 101. Accordingly, in the CCD stage 1251', by attracting both the guide shafts 13a' and 13b' toward one side in each of the guides 17a, 17a' and 17b", no bias occurs in the urging force acting on the Y direction stage 14'. Thus, the removal of backlash can be surely performed.

Furthermore, in the CCD stage 1251', the urging magnets 17ma, 17ma' and 17mb" are attached to the guides 17a, 17a' and 17b". Thus, in the CCD stage 1251', the urging magnets 17ma, 17ma' and 17mb" and the first and second guide shafts 13a' and 13b', which are urged so as to be attracted by attractive force of the magnets, can be disposed close to each other. Thus, in the CCD stage 1251', the removal of backlash can be surely performed with weak magnetic force. Consequently, unnecessary magnetic force can be prevented from acting on the drive mechanisms for moving the mounting stage 15' in the X and Y directions, which are the motors consisting of the coils and the permanent magnets. Moreover, it is possible to suppress inhibition of control over movement of the mounting stage 15' in the X and Y directions by the drive mechanisms.

In the CCD stage 1251', the combinations of the urging magnets 17ma, 17ma' and 17mb" and both the guide shafts 13a' and 13b' are provided at positions that do not cross between the permanent magnet 16a and the coiled body COL2, between the permanent magnet 16b and the coiled body COL2', between the permanent magnet 16c and the coiled body COL1 and between the permanent magnet 16d and the coiled body COL1', all of which are set facing each other so as to function as the drive mechanisms for moving the mounting stage 15' in the X and Y directions. Consequently, in the CCD stage 1251', unnecessary magnetic force can be prevented from acting on the drive mechanisms for moving the mounting stage 15' in the X and Y directions. Moreover, it is possible to suppress inhibition of control over the movement of the mounting stage 15' in the X and Y directions by the drive mechanisms.

In the second embodiment, the same effects can be achieved even if the positions of the guides are switched with those of the guide shafts in, the configuration shown in FIG. 8. Specifically, in the Y direction stage 14', provided are: a first guide (15g) and a second guide (15g'), both of which have holes into which a first guide shaft (14a') is inserted; and a third guide (15h) having a U-shaped groove into which a second guide shaft (14b') is inserted. Moreover, in the mounting stage 15', the first guide shaft (14a') and the second guide shaft (14b') are fixed parallel to each other. By supporting the mounting stage 15' having the CCD 101 mounted thereon at three spots as described above, the mounting stage 15' is movably supported, while maintaining its posture, in an extending direction of the guide shafts (14a' and 14b'). Three urging magnets (15mg, 15mg' and 15mh), which are permanent magnets, are provided at positions facing the guide shafts in the Z axis direction on the three guides (15g, 15g' and 15h), respectively. The three urging magnets (15mg, 15mg' and 15mh) can surely eliminate backlash between the guides (15g, 15g' and 15h) and the guide shafts (14a' and 14b') in movement of the mounting stage 15' by use of attractive force between the magnets and the guide shafts (14a' and 14b'). Specifically, since the urging magnets are attached to the guides, good distance accuracy is realized between the urging magnets (15mg, 15mg' and 15mh) and the guide shafts (14a' and 14b') as magnetic bodies in positioning thereof. Moreover, there is also hardly a variation in urging force. Thus, stable removal of backlash can be performed.

Moreover, in the second embodiment, adopted is the configuration in which the guide 17b" on which the urging magnet 17mb" is provided holds one end of the guide shaft 13b' in the Y direction stage 14'. However, the present invention is not limited to the above example. For example, it is possible to adopt a configuration in which the permanent magnet 16b is provided so as to be divided on both ends of the guide shaft 13b' while the guide shaft 13b' is held therebetween. In this case, when removal of backlash is performed by use of attractive force acting between the three urging magnets and both the guide shafts, the Y direction stage 14' and the X direction stage 13' can be stably attracted to each other. Thus, the removal of backlash can be more surely performed.

Figure 11:
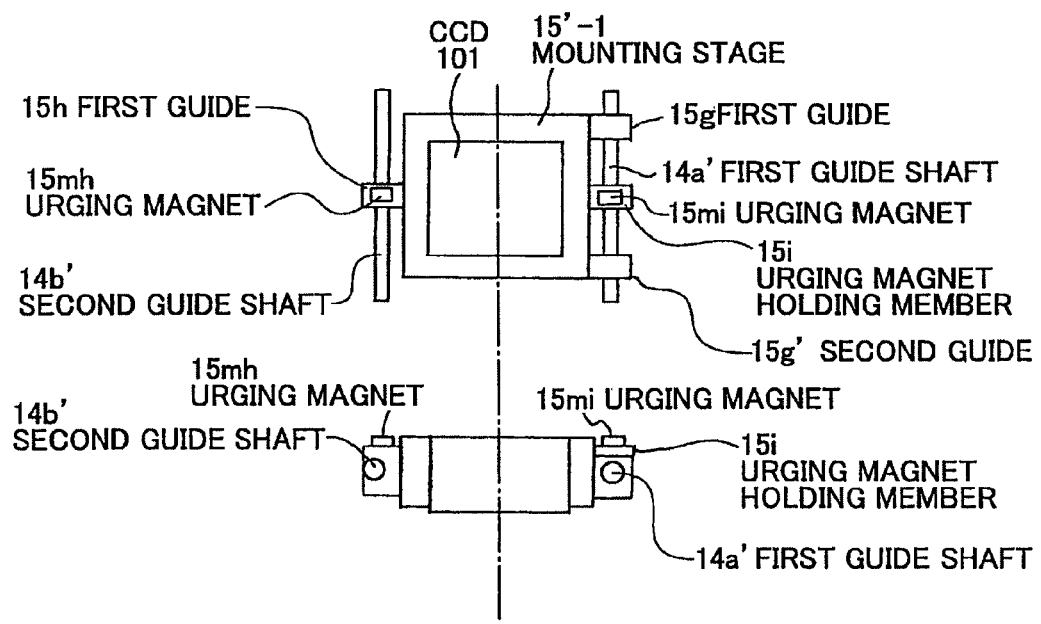
FIG. 11 is an explanatory view of a CCD stage as a first modified example of the second embodiment of the image blur correction device according to the present invention, showing, in its lower part, a schematic side view of a mounting stage in the CCD stage when viewed from the X direction and also showing, in its upper part, a relationship among respective guides in the mounting stage, respective urging magnets provided thereon and both guide shafts in a Y direction stage.

With reference to FIG. 11, description will be given of a modified example of the second embodiment of the image blur correction device according to the present invention.

FIG. 11 is a cross-sectional view in the X direction, showing a mounting stage 15'-1 in a CCD stage 1251'-1 as the image blur correction device according to the modified example of the second embodiment of the present invention.

In the mounting stage 15'-1, an urging magnet holding member 15i is provided in an intermediate portion between a first guide 15g and a second guide 15g'. In the mounting stage 15'-1, an urging magnet 15mi is provided on the urging magnet holding member 15i instead of the urging magnet 15mg on the first guide 15g and the urging magnet 15mg' on the second guide 15g'.

In the CCD stage 1251'-1, the urging magnet 15mi provided on the urging magnet holding member 15i faces a first guide shaft 14a' in the Z axis direction between the mounting stage 15'-1 and a Y direction stage 14'. Moreover, in the CCD stage 1251'-1, an urging magnet 15mh provided on a third guide 15h faces a second guide shaft 14b' in the Z axis direction. Thus, in the CCD stage 1251'-1, backlash between both the guide shafts 14a' and 14b' and the respective guides 15g, 15g' and 15h can be surely eliminated by attractive force between the two urging magnets 15mh and 15mi and both the guide shafts 14a' and 14b'. Moreover, the number of urging magnets can be reduced. Note that the configuration of the image blur correction device according to the modified example of the second embodiment is the same as that of the second embodiment except for the urging magnet holding member 15i described above and the urging magnet 15mi provided thereon and except that the urging magnets 15mg and 15mg' are not provided.

Figure 12:
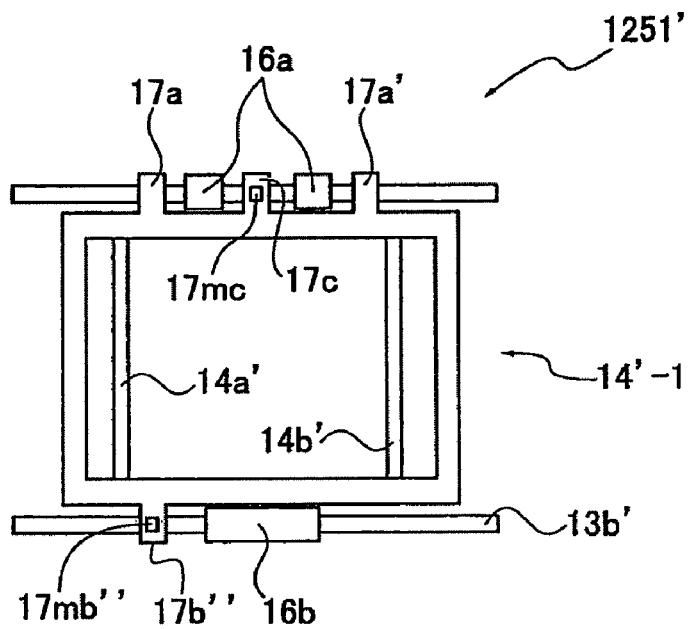
FIG. 12 is an explanatory view of the CCD stage as the first modified example of the second embodiment of the image blur correction device according to the present invention, showing a relationship among respective guides in the Y direction stage, respective urging magnets provided thereon and both guide shafts in an X direction stage.

Moreover, in a support relationship between a Y direction stage 14'-1 and an X direction stage 13'-1 in the CCD stage 1251'-1 according to the modified example of the second embodiment, the configuration shown in FIG. 11 may be adopted. Specifically, as shown in FIG. 12, in the Y direction stage 14'-1, an urging magnet holding member 17c is provided in an intermediate portion between a first guide 17a and a second guide 17a'. In the Y direction stage 14'-1, an urging magnet 17*mc* is provided on the urging magnet holding member 17*c* instead of the urging magnet 17*ma* on the first guide 17*a* and the urging magnet 17*ma'* on the second guide 17*a'*.

In the CCD stage 1251'-1, the urging magnet 17*ci* provided on the urging magnet holding member 17*c* faces a first guide shaft 13*a'* in the Z axis direction between the Y direction stage 14'-1 and the X direction stage 13'-1. Moreover, in the CCD stage 1251'-1, an urging magnet 17*mb"* provided on a third guide 17*b"* faces a second guide shaft 13*b'* in the Z axis direction. Thus, in the CCD stage 1251'-1, backlash between both the guide shafts 13*a'* and 13*b'* and the respective guides 17*a*, 17*a'* and 17*b"* can be surely eliminated by attractive force between the two urging magnets 17*mb"* and 17*mc* and both the guide shafts 13*a'* and 13*b'*. Moreover, the number of urging magnets can be reduced. Note that the configuration of the image blur correction device according to the modified example of the second embodiment is the same as that of the second embodiment except for the urging magnet holding member 17*c* described above and the urging magnet 17*mc* provided thereon and except that the urging magnets 17*ma* and 17*ma'* are not provided.

Next, description will be given of a camera as an embodiment of an imaging apparatus according to the present invention. The imaging apparatus of this embodiment includes the image blur correction device according to the first or second embodiment described above (any of those shown in FIGS. 1 to 12). Moreover, image blur correction in the present invention means camera shake correction, subject movement correction and the like. Here, description will be given of the camera shake correction.

(General Configuration of Digital Camera)

Figure 13:
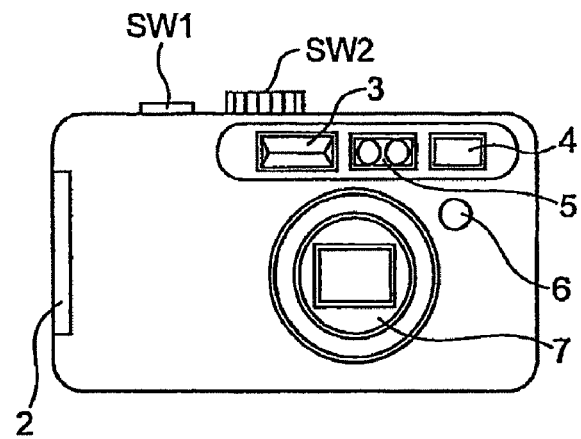
FIG. 13 is a front view of a digital camera as an imaging apparatus according to an embodiment of the present invention.
Figure 14:
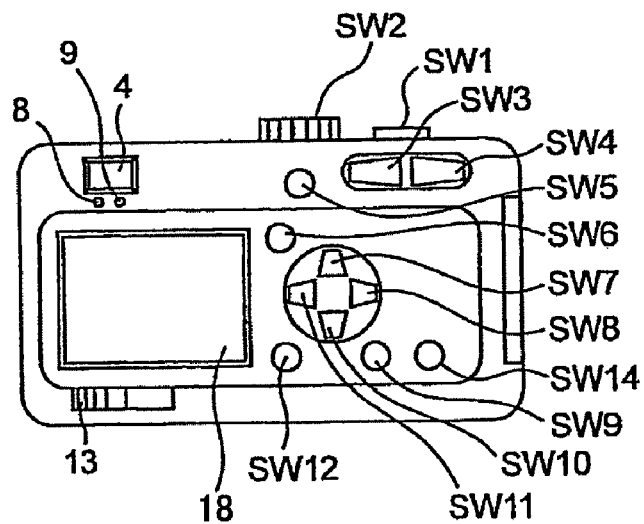
FIG. 14 is a back view of the digital camera as the imaging apparatus according to the embodiment of the present invention.
Figure 15:
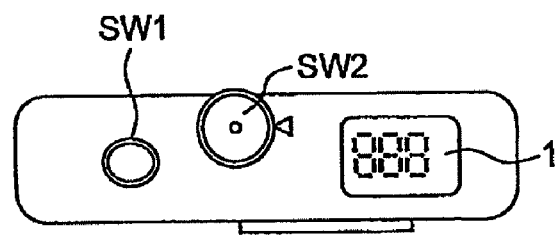
FIG. 15 is a top view of the digital camera as the imaging apparatus according to the embodiment of the present invention.
Figures 16, 16A:
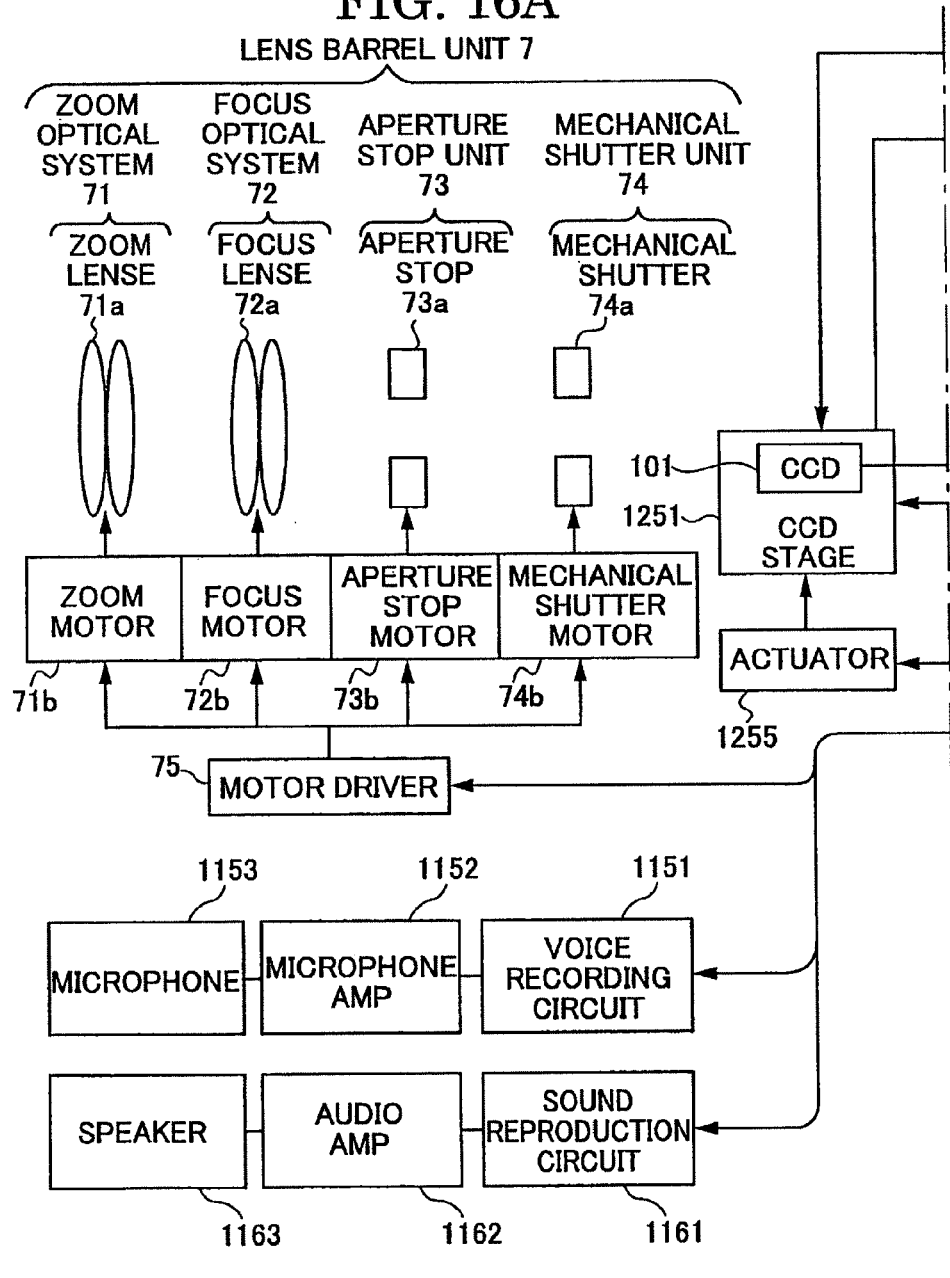
FIG. 16 is a circuit block diagram schematically showing a configuration of an inner system of the digital camera as the imaging apparatus according to the embodiment of the present invention.
Figure 16B:
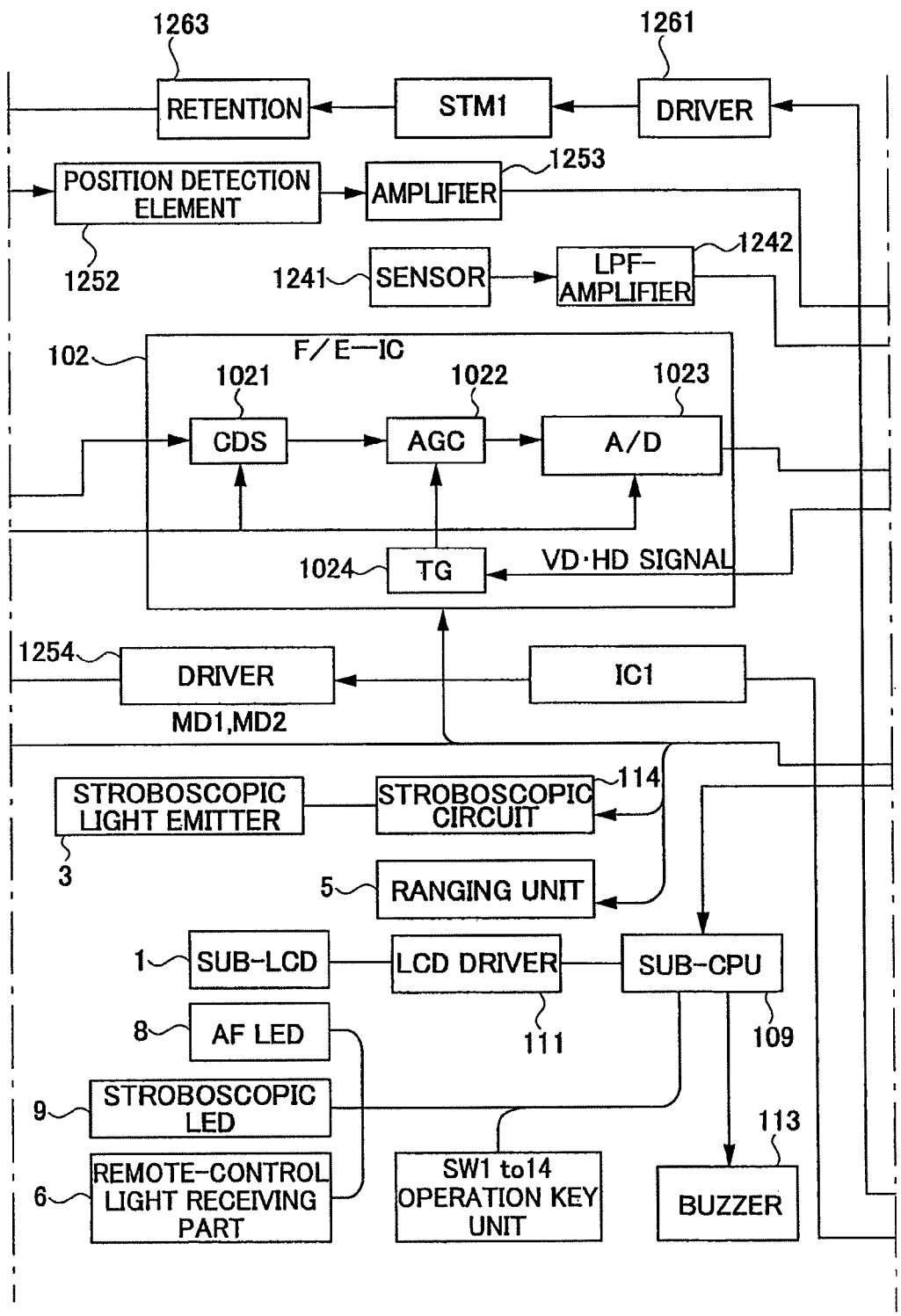
Figure 16C:
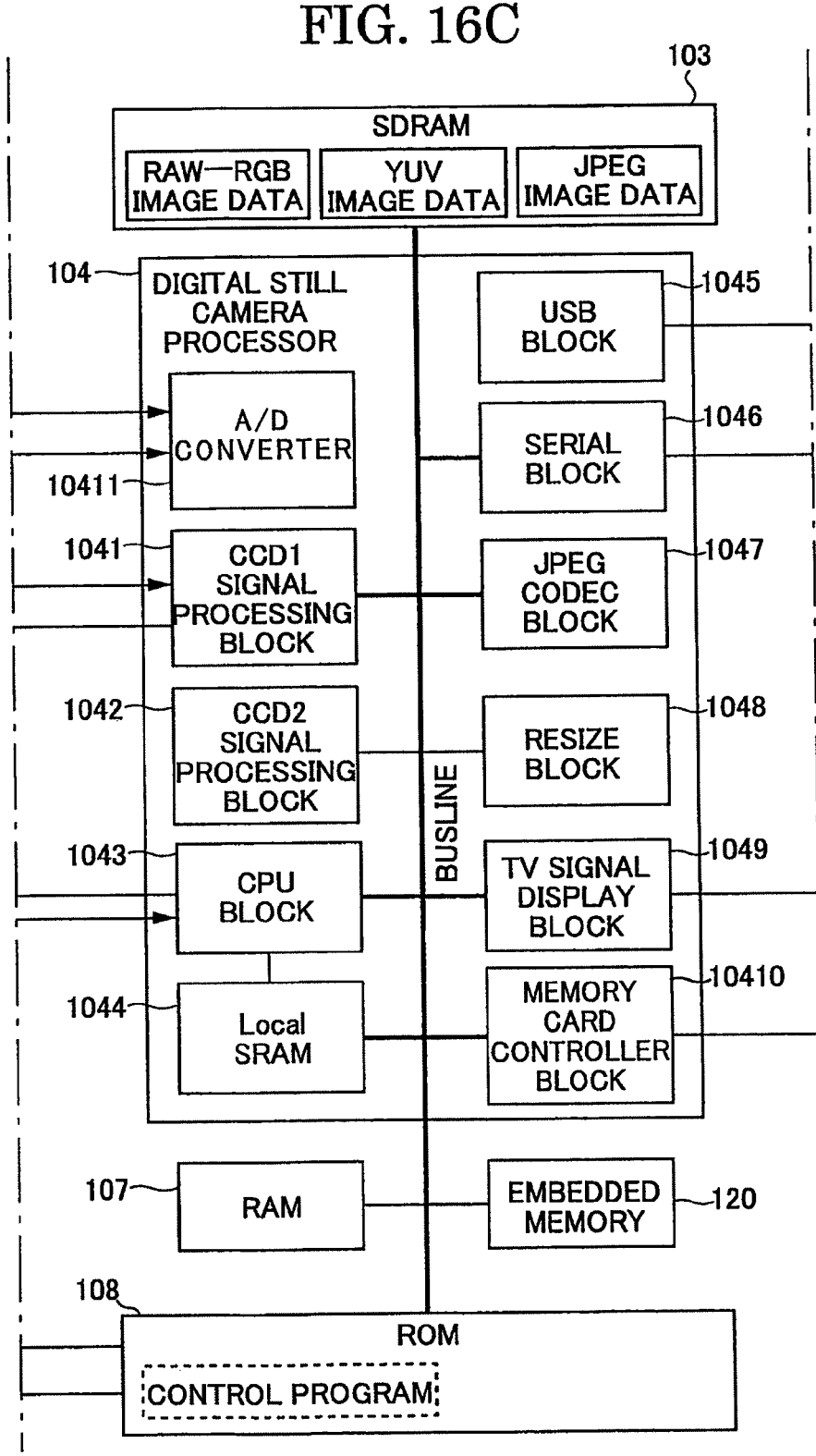
Figure 16D:
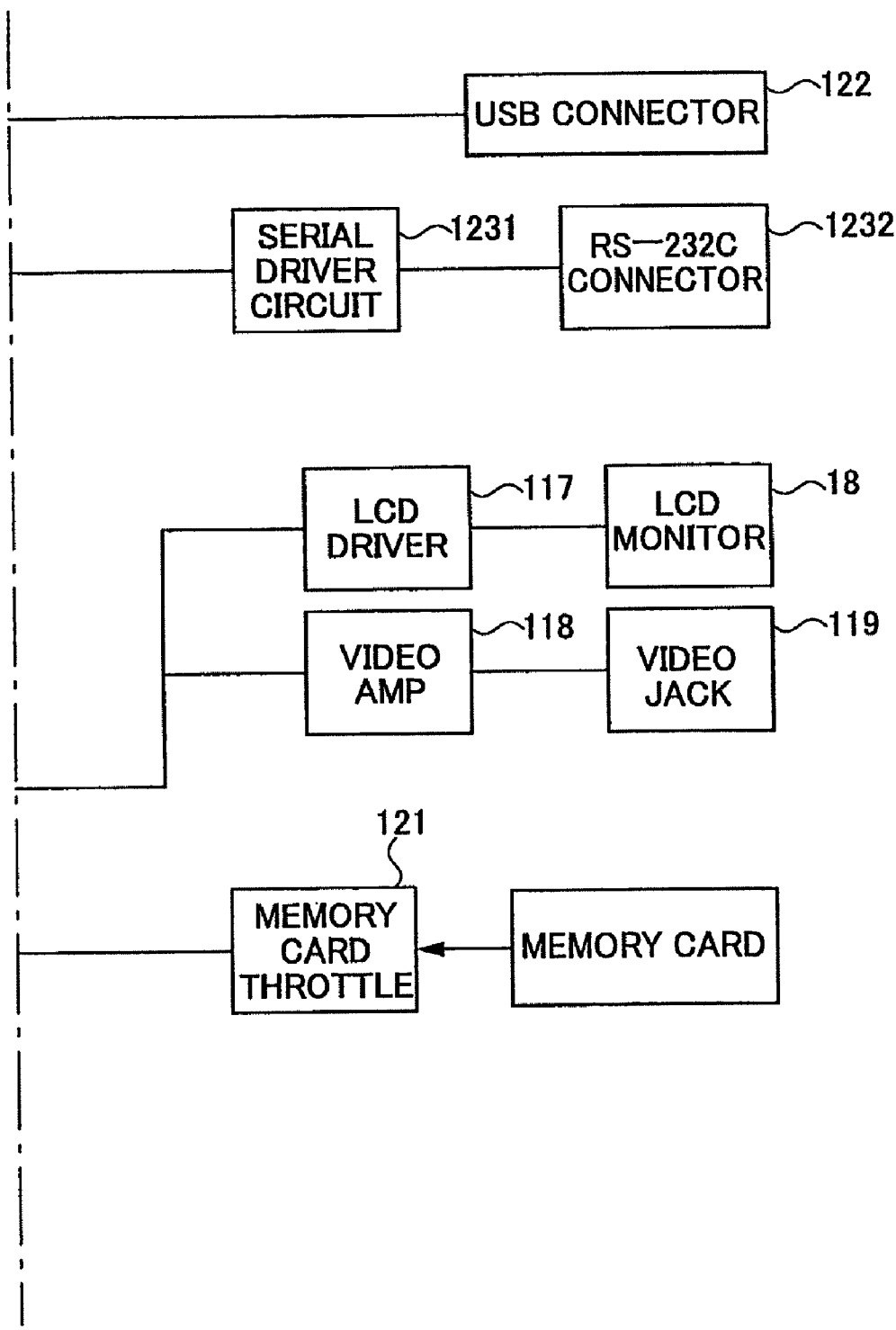

FIG. 13 is a front view showing an example of a digital still camera (hereinafter also referred to as a camera) as the imaging apparatus according to the present invention. FIG. 14 is a back view of the camera. FIG. 15 is a top view of the camera. FIG. 16 is a circuit block diagram schematically showing a configuration of an inner system of the digital still camera.

In FIG. 13, on an upper surface of a camera main body (main body case), a release switch (release shutter) SW1, a mode dial SW2 and a sub liquid crystal display (also called a sub-LCD) 1 shown in FIG. 15 are provided.

On a front surface of the camera main body, a lens barrel unit 7 including a photographing lens, an optical finder 4, a stroboscopic light emitting part 3, a ranging unit 5 and a remote-control light receiving part 6 are provided.

On a back surface of the camera, as shown in FIG. 14, a power switch SW13, an LCD monitor 18, an AF LED 8, a stroboscopic LED 9, the optical finder 4, a wide-angle zoom switch SW3, a telescopic zoom switch SW4, a self-timer set/reset switch SW5, a menu switch SW6, an upward movement/stroboscopic setting switch SW7, a rightward movement switch SW8, a display switch SW9, a downward movement/macro switch SW10, a leftward movement/image confirmation switch SW11, an OK switch SW12 and a camera shake correction switch SW14 are provided. On a side face of the camera main body, a cover 2 for a memory card/battery loading slot is provided.

Since functions and operations of the respective members described above have heretofore been known, description thereof is omitted. Next, the configuration of the inner system of the camera will be described.

In FIG. 16, reference numeral 104 denotes a digital still camera processor (hereinafter also referred to as a processor). The processor 104 has an A/D converter 10411, a CCD1 signal processing block 1041, a CCD2 signal processing block 1042, a CPU block 1043, a local SRAM 1044, a USB block 1045, a serial block 1046, a JPEG CODEC block 1047 (which performs JPEG compression and decompression), a RESIZE block 1048 (which increases and reduces a size of image data through interpolation), a TV signal display block 1049 (which converts the image data into a video signal so as to display the image data on an external display device such as a liquid crystal monitor and a TV), and a memory card controller block 10410 (which performs control of a memory card storing photographed image data). The respective blocks described above are connected to each other by a bus line.

Outside of the processor 104, a SDRAM 103 is provided. This SDRAM 103 is connected to the processor 104 via a memory controller (not shown) and a bus line. The SDRAM 103 stores RAW-RGB image data (image data subjected to white balance setting and γ setting), YUV image data (image data subjected to luminance data and color difference data conversion), and JPEG image data (image data subjected to JPEG compression).

On the outside of the processor 104, further provided are a RAM 107, an embedded memory 120 (a memory for storing photographed image data even if no memory card is loaded in a memory card throttle), and a ROM 108 storing a control program, parameters and the like, all of which are also connected to the processor 104 via a bus line.

The control program is loaded into a main memory (not shown) of the processor 104 when the power switch SW13 of the camera is turned on. The processor 104 controls operations of respective parts according to the control program and also temporarily stores control data, parameters and the like in the RAM 107 or the like.

The lens barrel unit 7 comprises a lens barrel including a zoom optical system 71 having a zoom lens 71*a*, a focus optical system 72 having a focus lens 72*a*, an aperture stop unit 73 having an aperture stop 73*a* and a mechanical shutter unit 74 having a mechanical shutter 74*a*.

The zoom optical system 71 is driven by a zoom motor 71*b* and the focus optical system 72 is driven by a focus motor 72*b*. Moreover, the aperture stop unit 73 is driven by an aperture stop motor 73*b* and the mechanical shutter unit 74 is driven by a mechanical shutter motor 74*b*.

The respective motors are driven by a motor driver 75, which is controlled by the CPU block 1043 of the processor 104.

A subject image is formed on the CCD 101 by each lens system of the lens barrel unit 7. The CCD 101 converts the subject image into an image signal and outputs the image signal to an F/E-IC 102. The F/E-IC 102 includes a CDS 1021 which performs correlated double sampling to eliminate image noise, an AGC 1022 for gain adjustment and an A/D converter 1023 which performs analog-digital conversion. Specifically, the F/E-IC 102 performs predetermined processing to the image signal to convert an analog image signal to a digital signal, and outputs the digital signal to the CCD1 signal processing block 1041 of the processor 104.

These signal control processes are performed via a TG 1024 according to a vertical synchronization signal VD and a horizontal synchronization signal HD outputted from the CCD1 signal processing block 1041 of the processor 104. The TG 1024 generates a driving timing signal on the basis of the vertical synchronization signal VD and the horizontal synchronization signal HD.

The CPU block 1043 of the processor 104 is configured to control a voice recording operation by a voice recording circuit 1151. A voice is converted into a voice recording signal by a microphone 1153 and the signal is amplified by a microphone amplifier 1152. The voice recording circuit 1151 records the amplified signal according to a command. The CPU block 1043 also controls an operation of a sound reproduction circuit 1161. The sound reproduction circuit 1161 reproduces a sound signal appropriately stored in a memory by a command and outputs the sound signal to an audio amplifier 1162 so as to output the sound from a speaker 1163.

Furthermore, the CPU block 1043 controls a stroboscopic circuit 114 so as to emit illumination light from the stroboscopic light emitting part 3. In addition, the CPU block 1043 also controls the ranging unit 5.

The CPU block 1043 is connected to a sub-CPU 109 of the processor 104 and the sub-CPU 109 controls display on the sub-LCD 1 via an LCD driver 111. The sub-CPU 109 is further connected to the AF LED 8, the stroboscopic LED 9, the remote-control light receiving part 6, an operation key unit having the operation switches SW1 to SW14, and a buzzer 113.

The USB block 1045 is connected to a USB connector 122, and the serial block 1046 is connected to an RS-232C connector 1232 through a serial driver circuit 1231. The TV signal display block 1049 is connected to the LCD monitor 18 via an LCD driver 117 and also connected to a video jack 119 (for connecting the camera to an external display device such as a TV) via a video amplifier 118. The video amplifier 118 is an amplifier for matching an output impedance of the video jack 119 with an input impedance of a connection terminal connected thereto. In this embodiment, the video amplifier 118 sets the output impedance of the video jack 119 to 75Q so as to conform to an input impedance standard set in the connection terminal. The memory card controller block 10410 is connected to a contact point provided in a memory card slot 121 to be an electrical connection point to a card contact point of a memory card (not shown) inserted into the memory card slot 121.

The LCD driver 117 drives the LCD monitor 18 and also converts the video signal outputted from the TV signal display block 1049 into a signal to be displayed on the LCD monitor 18. The LCD monitor 18 is used to monitor a state of the subject before photographing, confirm a photographed image and display image data recorded in the memory card or the embedded memory 120.

In the main body of the camera, a fixation tube (to be described later) which constitutes a part of the lens barrel unit 7. In the fixation tube, a CCD stage 1251 is provided so as to be movable in X and Y directions. The CCD 101 is mounted on the COD stage 1251 which constitutes a part of a camera shake correction mechanism. A detailed mechanical structure of the CCD stage 1251 is as already described above.

The CCD stage 1251 is driven by an actuator 1255. The actuator 1255 is controlled by a driver 1254. The driver 1254 includes coil drives MD1 and MD2. The driver 1254 is connected to an analog-digital converter IC1. The analog-digital converter IC1 is connected to the ROM 108 and receives the control data from the ROM 108.

In the fixation tube, an origin position forced retention mechanism 1263 is provided. The origin position forced retention mechanism 1263 retains the CCD stage 1251 at a center position when the camera shake correction switch SW14 is off or the power switch SW13 is off. The origin position forced retention mechanism 1263 is controlled by a stepping motor STM1 as an actuator. The stepping motor STM1 is driven by a driver 1261 to which the control data is inputted from the ROM 108.

A position detection element 1252 is attached to the CCD stage 1251. A detection output of the position detection element 1252 is inputted to an amplifier 1253. The amplifier 1253 amplifies the received detection output of the position detection element 1252 and outputs the amplified output to the A/D converter 10411. A gyro sensor 1241 is provided in the main body of the camera to detect rotations in the X and Y directions (rotations around X and Y axes). A detection output of the gyro sensor 1241 is outputted to the A/D converter 10411 via an amplifier 1242 which also serves as a low-pass filter.

Next, general operations of the camera according to this embodiment will be schematically described.

If the mode dial SW2 is set to a photographing mode, the camera is started in the photographing mode. Meanwhile, if the mode dial SW2 is set to a replay mode, the camera is started in the replay mode. The processor 104 determines whether a switch condition of the mode dial SW2 is in the photographing mode or the replay mode (S.1 in FIG. 17).

Moreover, the processor 104 controls the motor driver 75 to move the lens barrel of the lens barrel unit 7 to a photographable position. Furthermore, the processor 104 powers on the respective circuits such as the CCD 101, the F/E-IC 102 and the LCD monitor 18 to start the operation. When the respective circuits are powered on, an operation in a finder mode is started.

In the finder mode, light made incident on an imaging element (the CCD 101) through each of the lens systems is photo-electrically converted into analog signals of R, G and B to be sent to the CDS circuit 1021 and the A/D converter 1023. The A/D converter 1023 converts the analog signals into digital signals. Thereafter, the digital signals are converted into YUV data by a YUV converter disposed in a digital signal processor IC (the SDRAM 103) and written into a frame memory by a memory controller (not shown).

The YUV signal is read by the memory controller and sent to a TV (not shown) or the LCD monitor 18 through the TV signal display block 1049. Thus, the photographed image is displayed on the TV (not shown) or the LCD monitor 18. This processing is performed at intervals of 1/30 seconds. Thus, the display on the TV (not shown) or the LCD monitor 18 in the finder mode is renewed at every 1/30 seconds. More specifically, monitoring processing is carried out (S.2 in FIG. 17). Next, the processor 104 determines whether or not the setting of the mode dial SW2 has been changed (S.3 in FIG. 17). If the setting of the mode dial SW2 remains in the photographing mode, photographing processing is carried out by operating the release switch SW1 (S.4 in FIG. 17).

Figure 17:
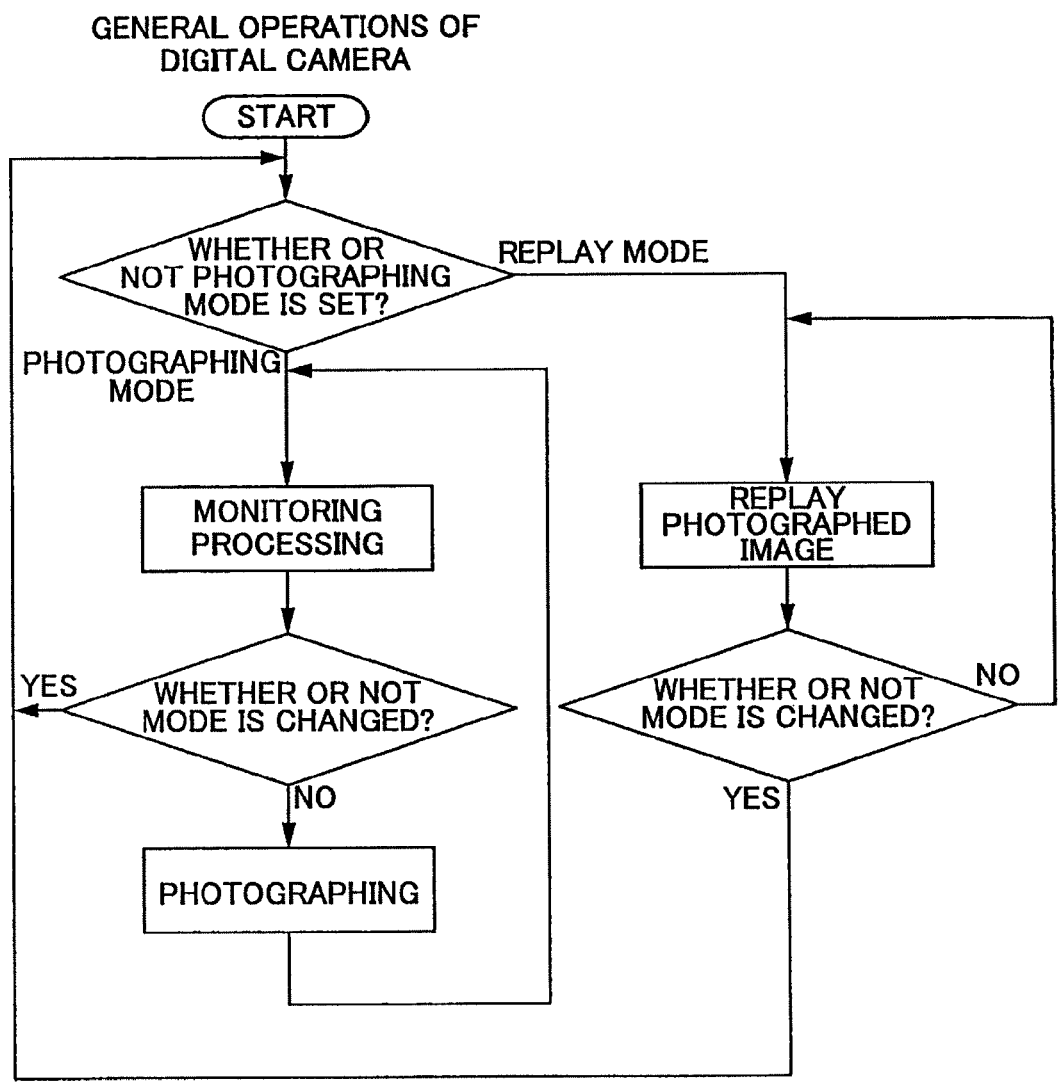
FIG. 17 is a flowchart for explaining general operations of the digital camera as the imaging apparatus according to the embodiment of the present invention.

In the replay mode, the processor 104 displays the photographed image on the LCD monitor 18 (S.5 in FIG. 17). Next, the processor 104 determines whether or not the setting of the mode dial SW2 has been changed (S.6 in FIG. 17). If the setting of the mode dial SW2 has been changed, the process moves to S.1. If the setting of the mode dial SW2 has not been changed, the process of S.5 is repeated.

(Principles of Camera Shake Correction)

Figure 18A:
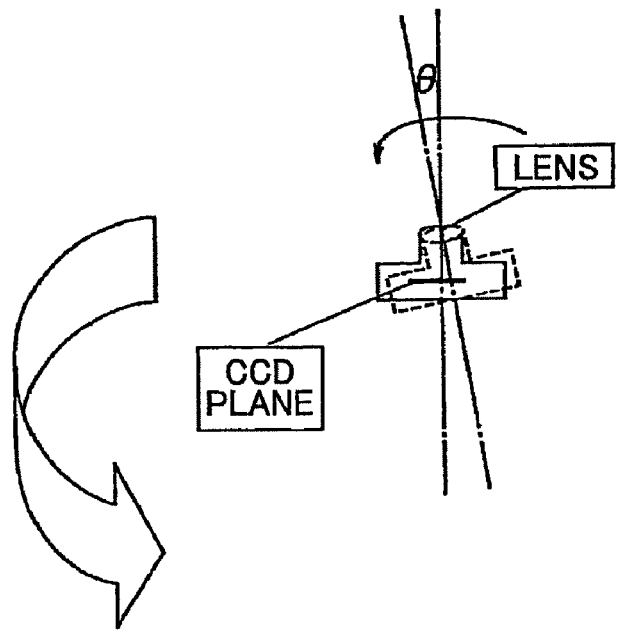
FIG. 18A is a view for explaining principles of camera shake correction for the digital camera as the imaging apparatus according to the embodiment of the present invention, showing inclination of the digital camera.
Figure 18B:
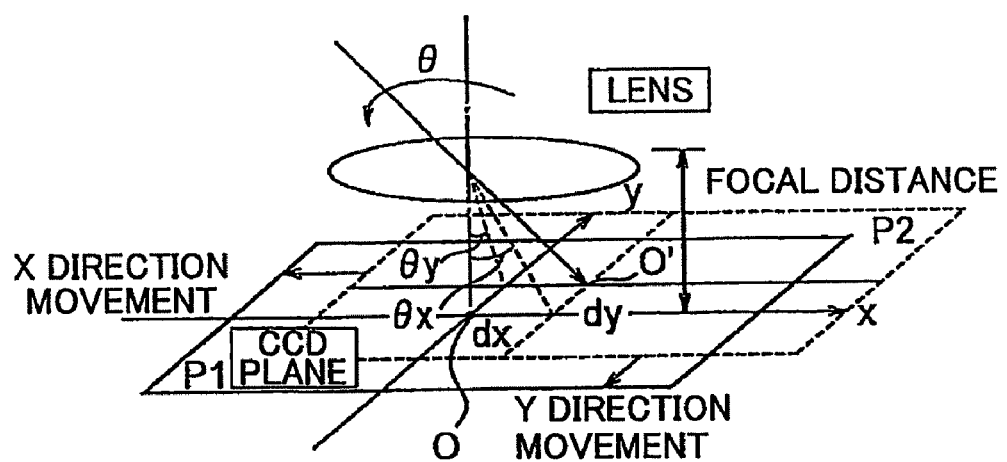
FIG. 18B is a view for explaining the principles of camera shake correction for the digital camera as the imaging apparatus according to the embodiment of the present invention and is also a partially enlarged view showing a relationship between a photographing lens of the digital camera and an imaging surface of a CCD.

FIG. 18A is a view for explaining principles of camera shake correction. FIG. 18A shows a state of the digital camera without camera shake as indicated by a solid line and an inclined state thereof indicated by a dotted line. Moreover, FIG. 18B is a view for explaining the principles of camera shake correction and is also a partially enlarged view showing a relationship between the photographing lens of the camera main body and the imaging surface of the CCD 101.

When there is no camera shake and the imaging surface of the CCD 101 is at a position P1, in other words, at a center position in a range of movement thereof, a subject image is assumed to be projected on an origin O. Here, if the camera is inclined in a θ (θx, θy) direction by the camera shake, the imaging surface is moved to a position P2 and the subject image is moved to O'. In this case, the imaging surface is moved in parallel by dx in the X direction and dy in the Y direction such that the position of the imaging surface is set to P1. Thus, the subject image is returned to the origin position O.

(Mechanical Configuration of Image Blur Correction Mechanism)

Figure 19:
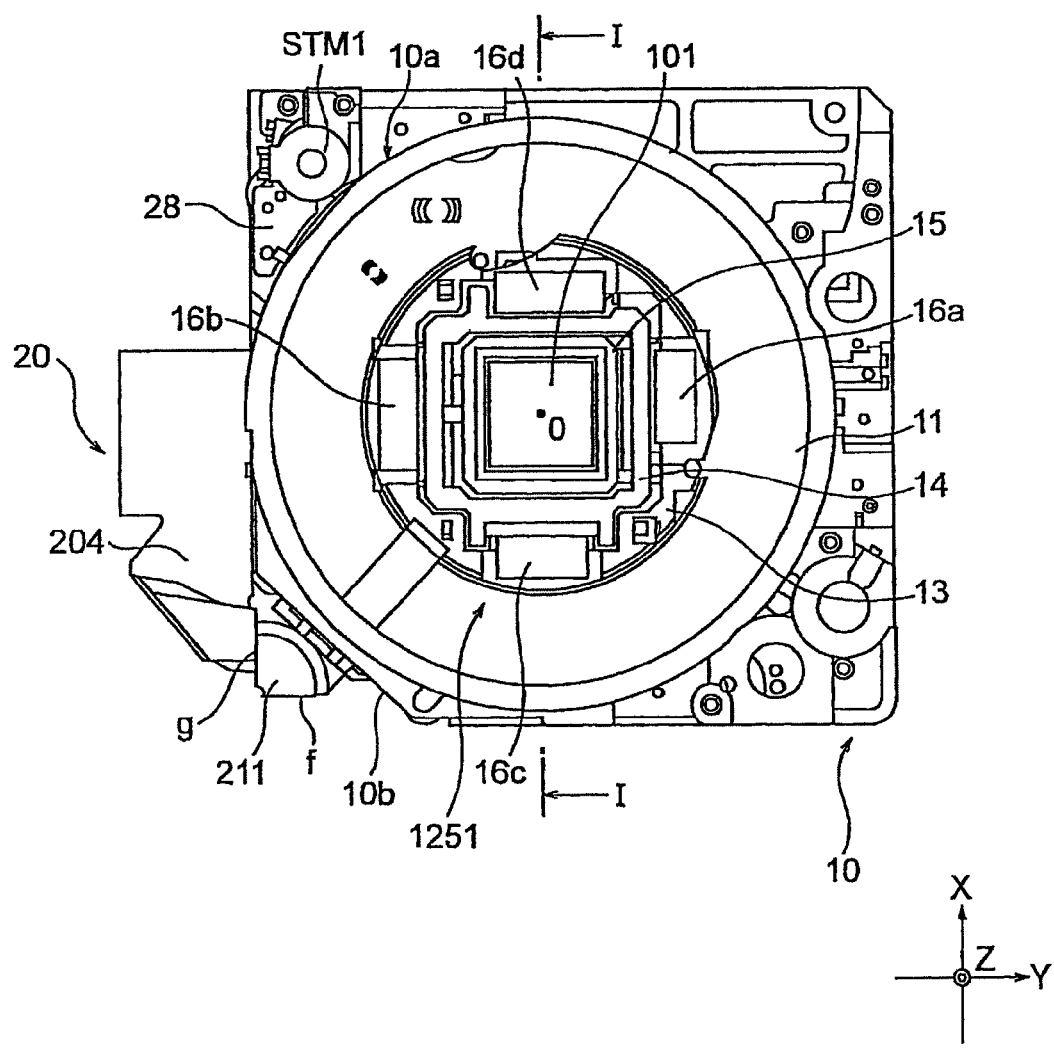
FIG. 19 is a front view showing a fixation tube of a lens barrel of the digital camera according to the embodiment of the present invention.
Figure 20:
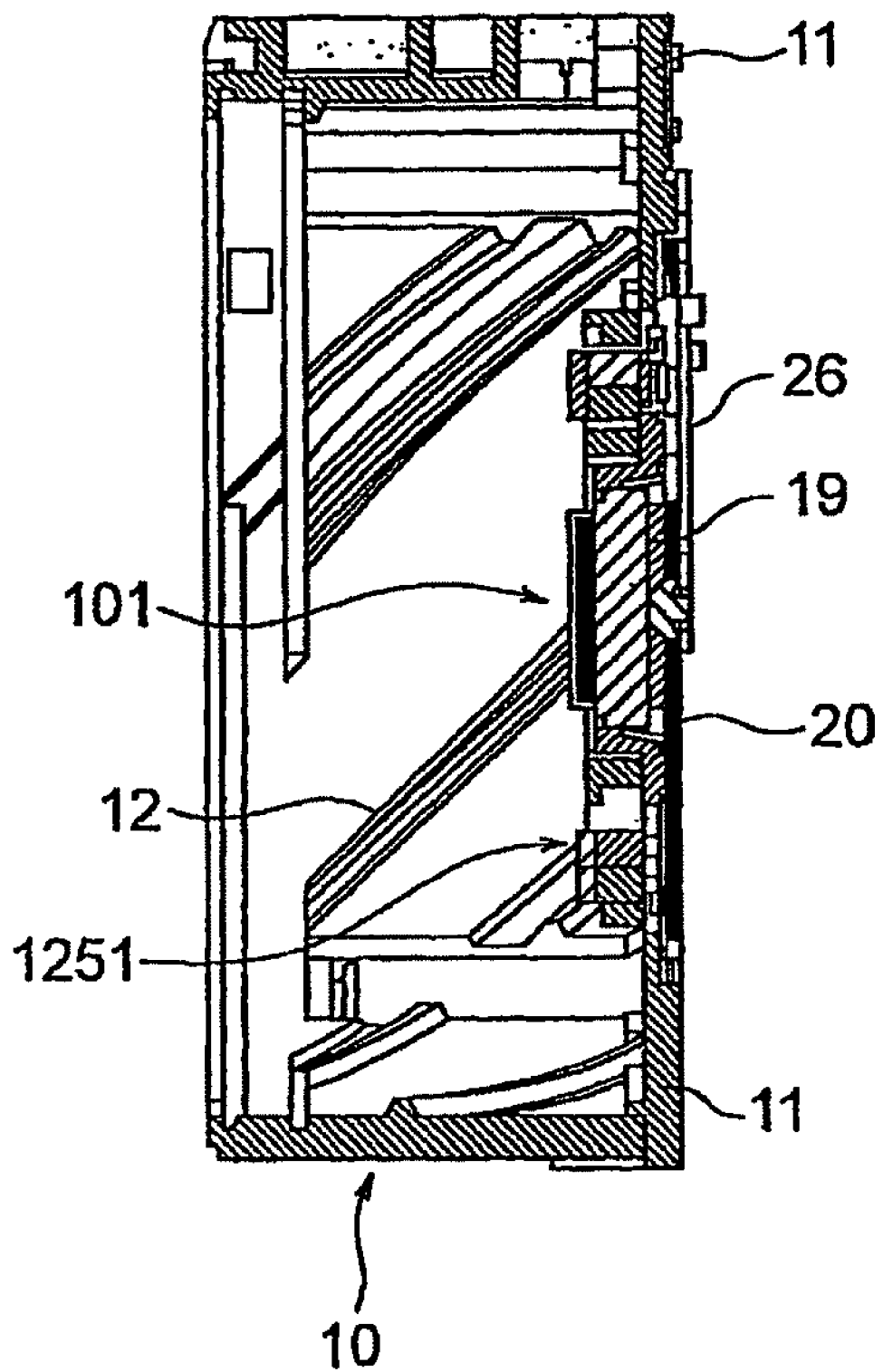
FIG. 20 is a vertical cross-sectional view of the fixation tube along the line I-I in FIG. 19.

FIG. 19 is a front view of the fixation tube. FIG. 20 is a vertical cross-sectional view of the fixation tube. FIG. 21 is a back view of the fixation tube. In FIGS. 19 to 21, reference numeral 10 denotes the fixation tube. The fixation tube 10 has a boxy shape and inside thereof is used as a storage space for holding the lens barrel. The fixation tube 10 is disposed in a main body case (the camera main body) at a defined position in relation to a photographing optical axis. A plate-like base member 11 having an approximately rectangular shape in whole is attached to a rear surface of the fixation tube 10. A helicoid 12 is formed at an inner peripheral wall of the fixation tube 10 for extending or collapsing the lens barrel. The fixation tube 10 has at least two notched corner portions. One of the corner portions 10a is used as an installation portion of a stepping motor STM to be described later, and the other corner portion 10b is used as a bending portion of a flexible printed board 20 to be described later.

The CCD stage 1251 is provided in the base member 11. The CCD stage 1251 is the image blur correction device according to the embodiment of the present invention, and any of those shown in FIGS. 1 to 12 can be adopted, for example. Hereinafter, description will be given of the case where the CCD stage 1251 shown in FIGS. 1 to 5 is adopted.

Figure 22:
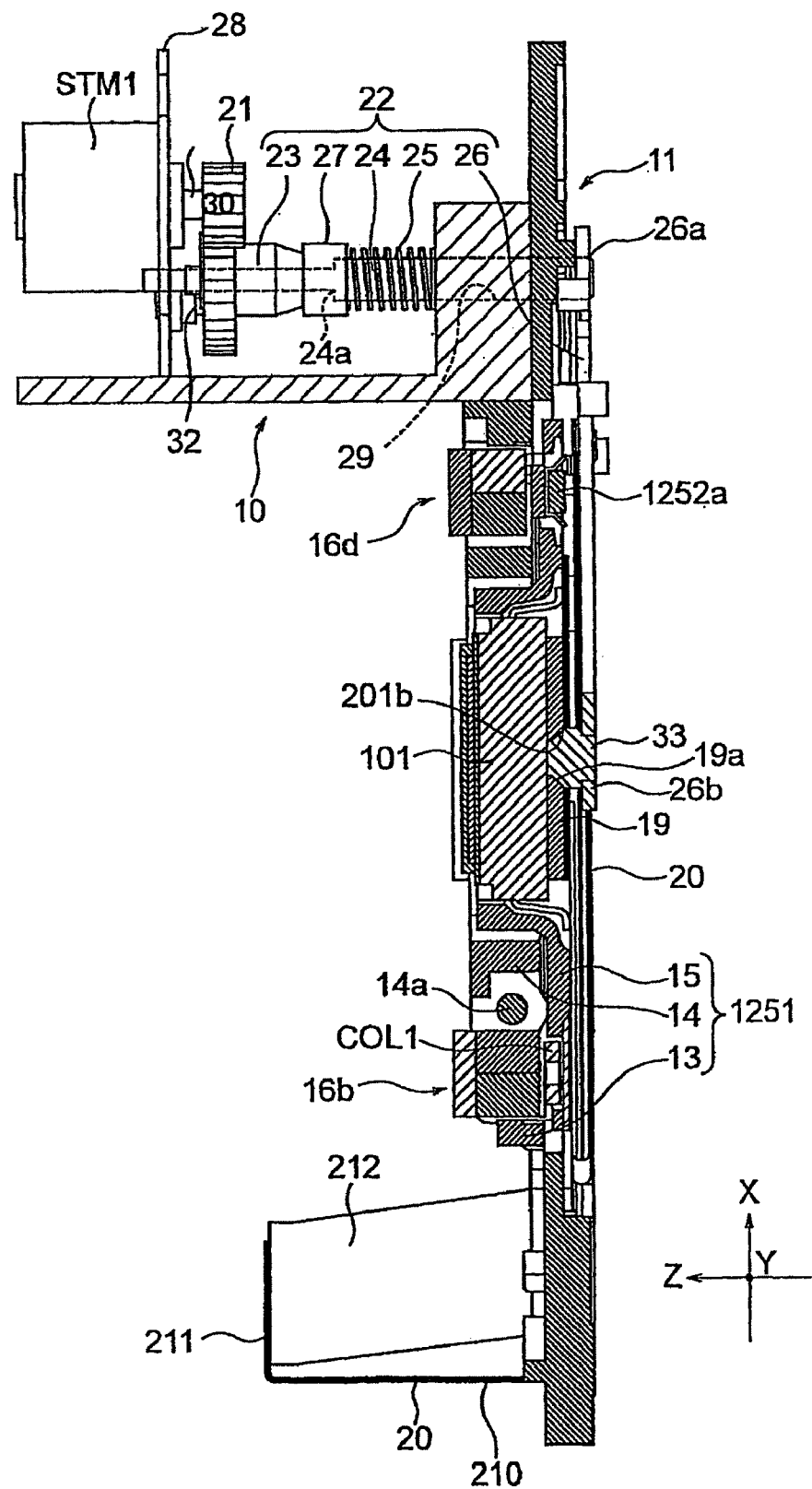
FIG. 22 is a partially enlarged cross-sectional view taken along the line II-II in FIG. 21B.

The CCD 101 on the CCD stage 1251 is electrically connected to the F/E IC 102 via the flexible printed board 20 (see FIG. 22). The hall elements 1252a and 1252b provided in the CCD stage 1251 are electrically connected to the operational amplifier 1253 via the flexible printed board 20. Furthermore, the respective coiled bodies COL1, COL1', COL 2 and COL2' provided in the CCD stage 1251 are electrically connected to the coil driver 1254 via the flexible printed board 20.

(Mechanical Configuration of Origin Position Forced Retention Mechanism)

Figure 23A:
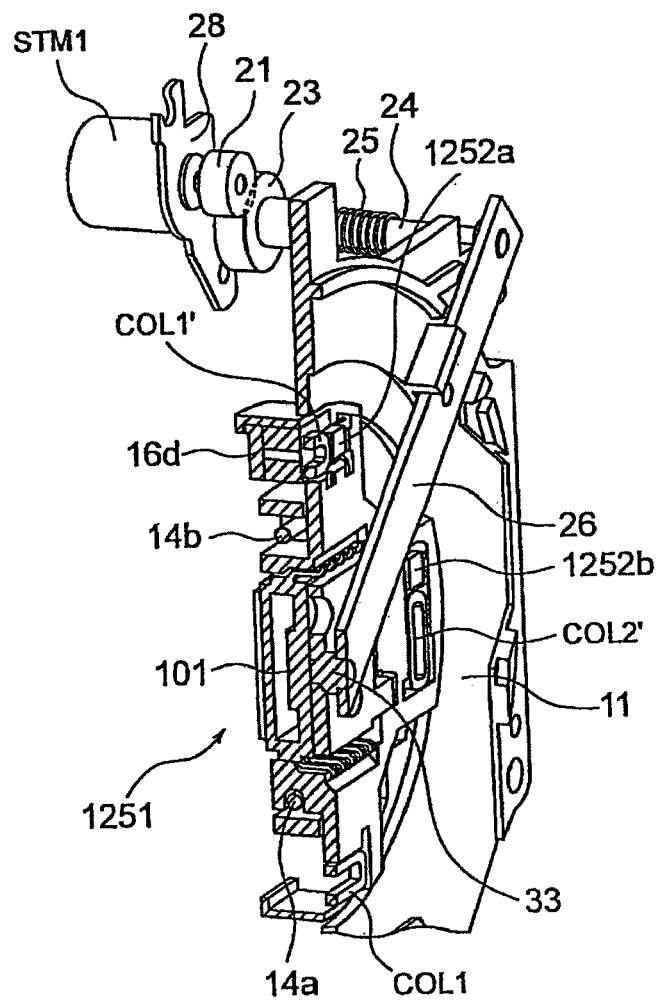
FIG. 23A is an explanatory view showing a main part of an origin position forced retention mechanism according to the present invention and is also a perspective view showing a connection relationship among a CCD stage, a stepping motor and a conversion mechanism.
Figure 23B:
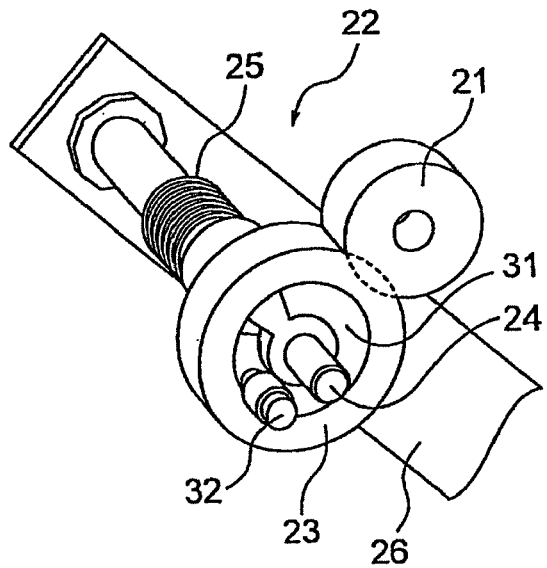
FIG. 23B is an explanatory view showing the main part of the origin position forced retention mechanism according to the present invention and is also a partially enlarged perspective view of the conversion mechanism.

As shown in enlarged views of FIGS. 22 and 23, the origin position forced retention mechanism 1263 has the stepping motor STM1. A mechanical configuration of the origin position forced retention mechanism 1263 will be first described in detail, and driving and controlling of the stepping motor STM1 will be described below.

As shown in FIGS. 19 and 22, the stepping motor STM1 is disposed at the corner portion 10a of the fixation tube 10. An output gear 21 is provided on an output shaft 30 of the stepping motor STM1. A conversion mechanism 22 which converts rotational movement into linear movement is provided at the corner portion 10a of the fixation tube 10.

The conversion mechanism 22 roughly consists of a rotation transferring gear 23, a reciprocating shaft 24, a coil biasing spring 25, a forced retainer plate 26 and a spring bearing member 27. At the corner portion 10a of the fixation tube 10, a pair of supporting portions 28 and 29 are formed with a space therebetween in the Z axis direction. The supporting portion 28 is formed of a motor attachment plate. The reciprocating shaft 24 is supported by crossing the motor attachment plate 28 and the supporting portion 29. The rotation transferring gear 23 is positioned between the pair of supporting portions 28 and 29 to be rotatably supported by the reciprocating shaft 24 and engaged with the output gear 21.

One end portion of the reciprocating shaft 24 penetrates the supporting portion 29 and faces a back surface of the base member 11. The coil biasing spring 25 is provided between the spring bearing member 27 and the supporting portion 29. The reciprocating shaft 24 is biased toward the supporting portion 28 by the coil biasing spring 25. The reciprocating shaft 24 includes a step portion 24a to be engaged with an end face of a shaft hole of the rotation transferring gear 23.

As shown in FIGS. 24A to 24E, a cam groove 31 is formed at one end portion of the rotation transferring gear 23. The cam groove 31 is extended in a circumferential direction of the rotation transferring gear 23 and includes a flat valley floor portion 31a, a flat peak portion 31b, and an inclined surface portion 31c inclined continuously from the flat valley floor portion 31a toward the flat peak portion 31b. Between the flat valley floor portion 31a and the flat peak portion 31b, a steep cliff 31d is formed as a contact wall with which a cam pin to be described later comes into contact from the rotation direction.

A cam pin 32 is fixed to the supporting portion 28, and a top end of the cam pin 32 slidably comes into contact with the cam groove 31. A length in the rotation direction of the flat valley floor portion 31a, in other words, a length in the rotation direction from the steep cliff 31d to an inclination start position 31e of the inclined surface portion 31c is equivalent to 2 pulses of a rotation control signal of the stepping motor STM1.

A length in the rotation direction of the inclined surface portion 31c, in other words, a length in the rotation direction from the inclination start position 31e to an inclination end position 31f leading to the flat peak portion 31b is equivalent to 30 pulses of the rotation control signal of the stepping motor STM1.

A length in the rotation direction of the flat peak portion 31b, in other words, a length in the rotation direction from the inclination end position 31f to the steep cliff 31d is equivalent to 3 pulses of the rotation control signal of the stepping motor STM1. Then, 35 pulses of the stepping motor STM1 correspond to one rotation of the rotation transferring gear 23. The reciprocating shaft 24 completes one time-reciprocation in the Z axial direction by one rotation of the rotation transferring gear 23.

Figure 21A:
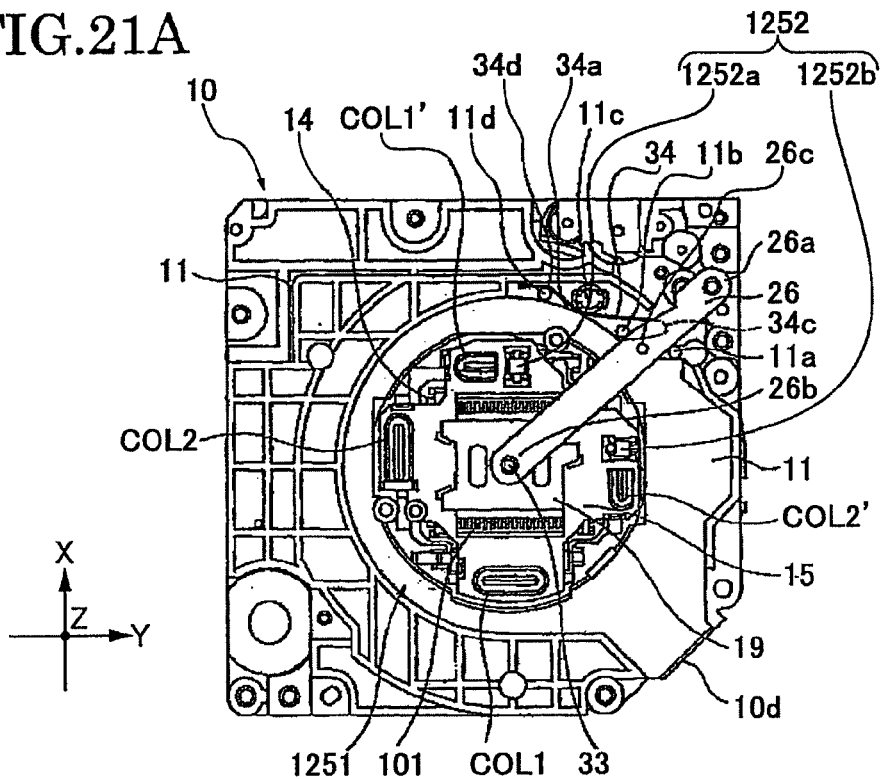
FIG. 21A is a back view of the fixation tube shown in FIG. 19, showing a state where a flexible printed board is not attached.
Figure 21B:
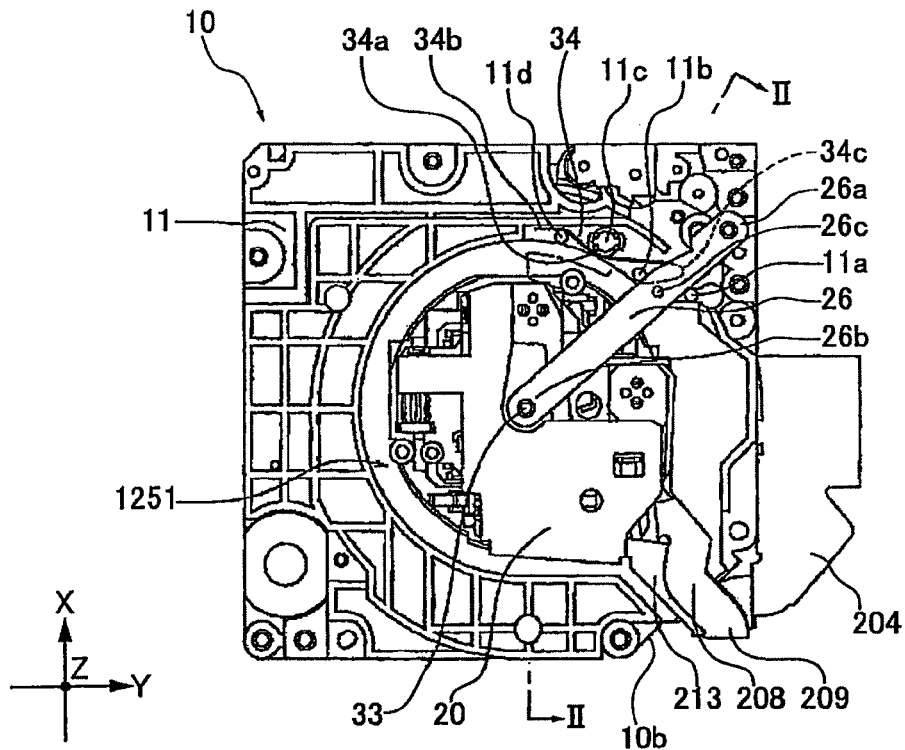
FIG. 21B is a back view of the fixation tube shown in FIG. 19, showing a state where the flexible printed board is attached.

The forced retainer plate 26 is provided on the back surface of the base member 11. The forced retainer plate 26 is extended toward the center of the CCD 101 as shown in FIGS. 21A and 21B. The forced retainer plate 26 has a base end portion 26a fixed to one end of the reciprocating shaft 24 and also has a free end portion 26b to which a tapered retention pin 33 is fixed. Moreover, a guide shaft 26c is formed so as to project in the middle of the extending direction of the forced retainer plate 26.

In the base member 11, positioning projections 11a and 11b, a coil attachment projection 11c and an engagement projection 11d are provided. The coil attachment projection 11c has a wound portion 34a of a torsion coil spring 34 attached thereto. The torsion coil spring 34 has one end portion 34b engaged with the engagement projection 11d and the other end portion 34c engaged with the guide shaft 26c. In the base member 11, a guide hole (not shown) is formed, which guides the guide shaft 26c.

While coming into contact with the positioning projection 11a by the torsion coil spring 34, the forced retainer plate 26 is reciprocated in a direction (Z axis direction) separating from or approaching the base member 11 along the reciprocation of the reciprocating shaft 24. The guide shaft 26c functions to stabilize the reciprocation of the forced retainer plate 26.

Figure 25A:
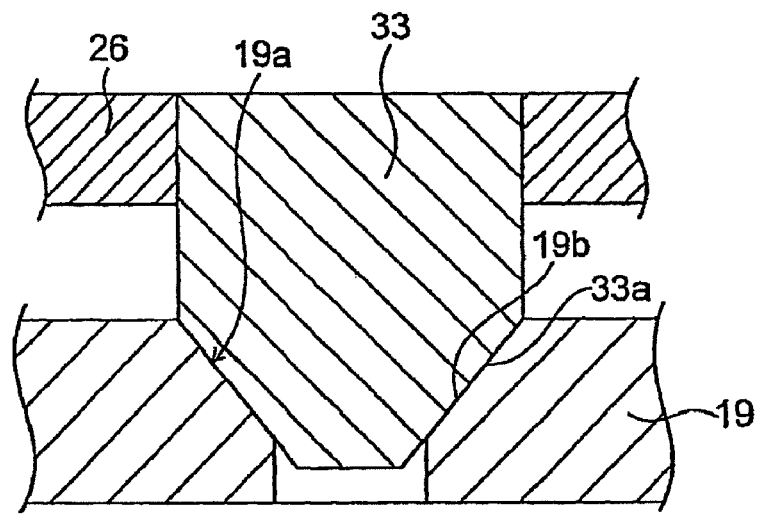
FIG. 25A is an explanatory view showing a fitting state between a retention pin shown in FIG. 23A and a recess, and is also a partially enlarged cross-sectional view showing a close-contact state between the retention pin and a recess peripheral wall.
Figure 25B:
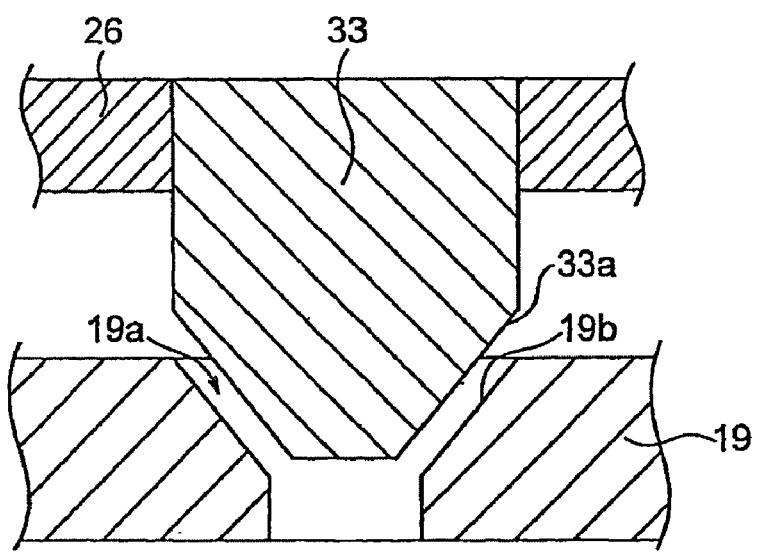
FIG. 25B is an explanatory view showing a fitting state between the retention pin shown in FIG. 23A and the recess, and is also a partially enlarged cross-sectional view showing a separation state between the retention pin and the recess peripheral wall.

The retention pin (fitting projection) 33 is configured to fit into the recess (fitting hole) 19a so as to fulfill its function for mechanically retaining the mounting stage 15 on the origin position O. As shown in an enlarged view of FIG. 25A, a state where a peripheral wall 33a of the retention pin 33 is closely fitted to a recess peripheral wall 19b of the protection plate 19 corresponds to a hold standby position of the cam pin 32. As shown in an enlarged view of FIG. 25B, a state where the peripheral wall 33a of the retention pin 33 is separated from the recess peripheral wall 19b of the protection plate 19 at the maximum interval corresponds to a release standby position of the cam pin 32. The hold standby position of the cam pin 32 is also a forced origin position of the mounting stage 15.

(How to Fold Printed Board)

Figure 26:
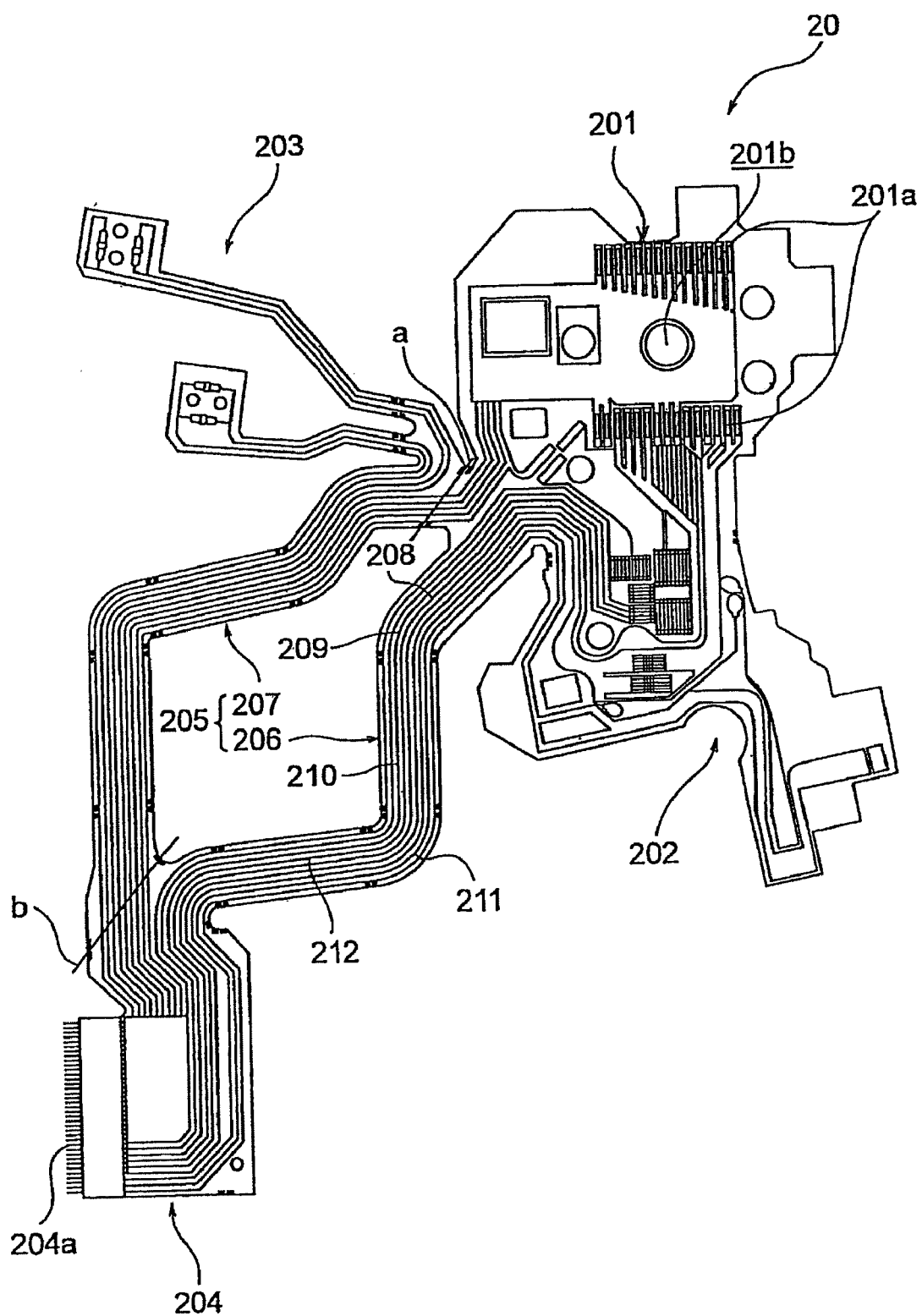
FIG. 26 is a view showing the flexible printed board before being folded when viewed from a front side.
Figure 27:
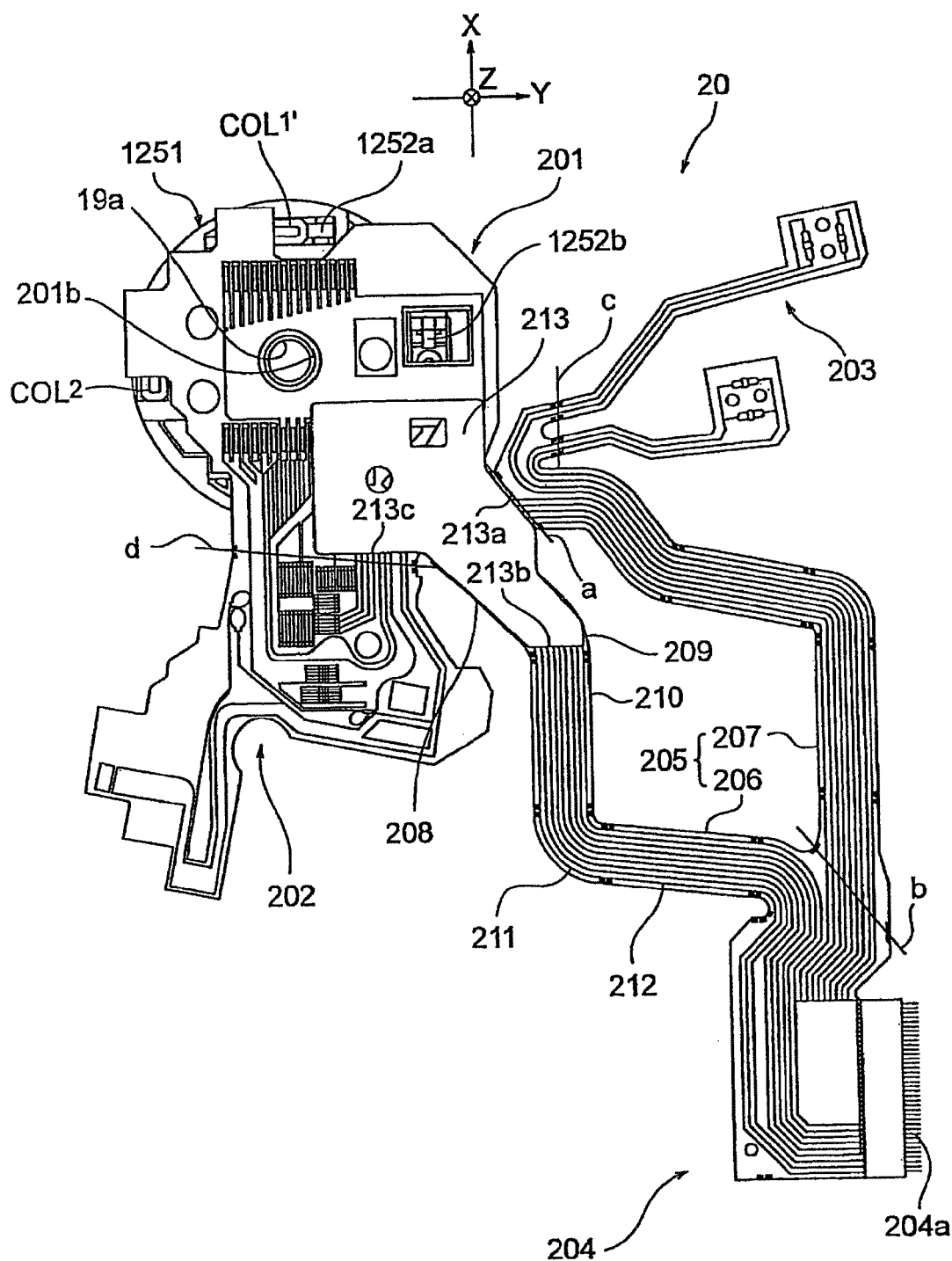
FIG. 27 is a view showing a state where the flexible printed board before being folded is attached onto the CCD stage.

The flexible printed board 20 (hereinafter also referred to as the printed board 20) includes a CCD connection part 201, a coil connection part 202, a position detection element connection part 203, a block circuit connection part 204 and a connection extension part 205. FIG. 26 is a development view of the printed board 20 viewed from the front side of the CCD connection part 201. FIG. 27 is a development view of the printed board 20 viewed from the back side of the CCD connection part 201, showing a state where the printed board 20 is attached onto the CCD stage 1251.

As shown in FIG. 26, the CCD connection part 201 has a connection pattern portion 201a corresponding to a connection pin of the CCD 101 and a through-hole 201b corresponding to the recess 19a of the protection plate 19. Moreover, although not shown in FIG. 26, the coil connection part 202 has a connection pattern portion provided therein, which can be electrically connected to each of the coil bodies COL1, COL1', COL2 and COL2' (hereinafter also referred to as each of the coiled bodies COL). Furthermore, the position detection element connection part 203 has a connection pattern portion provided therein, which can be electrically connected to the position detection element 1252. The block circuit connection part 204 has a connection pattern portion 204a which is electrically connected to the system block circuits such as the F/E-IC 102, the operational amplifier 1253 and the coil driver 1254. Thus, the system block circuits are electrically connected to the CCD connection part 201, the coil connection part 202 and the position detection element connection part 203 through the connection extension part 205.

In this embodiment, the connection extension part 205 is configured to branch into a first connection extension part 206 and a second connection extension part 207. The second connection extension part 207 is formed to overlap with the first connection extension part 206 when the connection extension part 205 is folded along the straight lines a and b. The second connection extension part 207 has the same structure as that of the first connection extension part 206 when front and back sides of the second connection extension part 207 are reversed. Thus, detailed description thereof will be omitted.

The first connection extension part 206 has a first straight portion 208, a first curved portion 209, a second straight portion 210, a second curved portion 211 and a third straight portion 212. The first straight portion 208 is extended from the CCD connection part 201, which is disposed on the back surface of the CCD 101 in assembly, in a direction (a direction toward the corner portion 10b) inclined at about 45 degrees with respect to the Y axis direction and the X axis direction (see FIG. 27). The first curved portion 209 has a fan shape as a whole and has an apex angle of about 45 degrees. Moreover, the first curved portion 209 connects the first straight portion 208 and the second straight portion 210 without changing their width dimensions. The second straight portion 210 is extended along the X axis direction. The second curved portion 211 has a fan shape as a whole and has an apex angle of about 90 degrees. Moreover, the second curved portion 211 connects the second straight portion 210 and the third straight portion 212 without changing their width dimensions. The third straight portion 212 is formed to have the same length as that of the second straight portion 210, and is extended along a direction perpendicular to the second straight portion 210, in other words, the Y axis direction.

Next, description will be given of how to attach the printed board 20.

As shown in FIG. 27, the printed board 20 is attached to the CCD stage 1251 from the protection plate 19 side in a state where the connection pattern portion 201a of the CCD connection part 201 conforms to the connection pin of the CCD 101 and the through-hole 201b conforms to the recess 19a.

An FPC auxiliary plate 213 is attached onto the printed board 20. The FPC auxiliary plate 213 is a plate member and its shape matches a part of the CCD connection part 201 and the shapes of the first straight portion 208 and the first curved portion 209 of the first connection extension part 206. In the FPC auxiliary plate 213, a first side portion 213a along the straight line a, a second side portion 213b along a border line between the first curved portion 209 and the second straight portion 210 and a third side portion 213c along a line d to be described later are provided for supporting the folding of the printed board 20.

Figure 28:
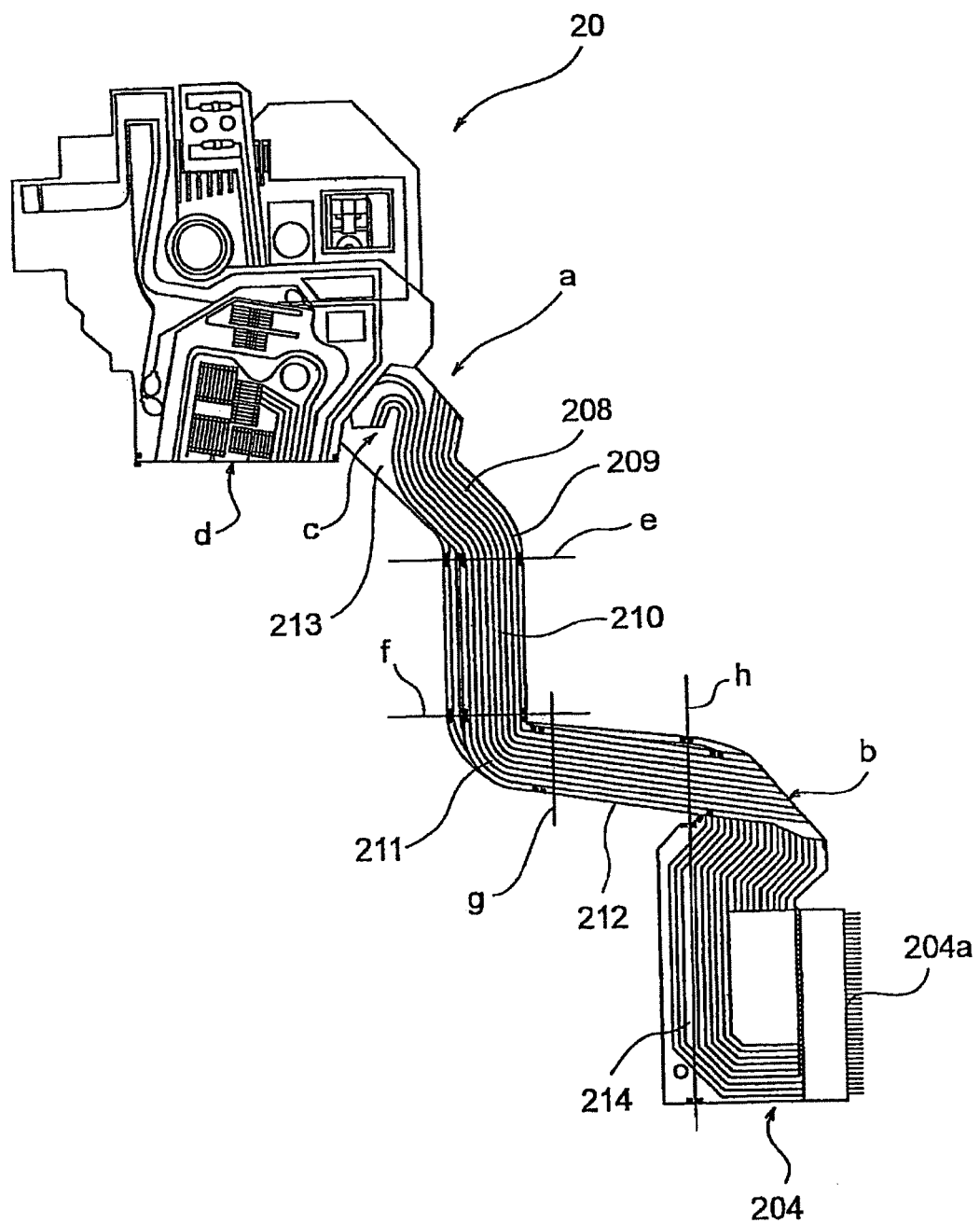
FIG. 28 is a view showing an overlapping state of connection extension parts in the printed board.
Figure 29A:
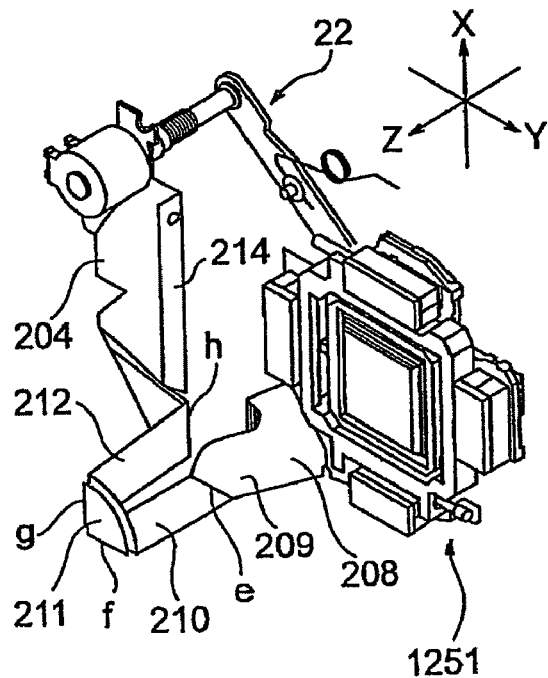
FIG. 29A is a perspective view schematically showing an arrangement relationship between the CCD stage and the flexible printed board.
Figure 29B:
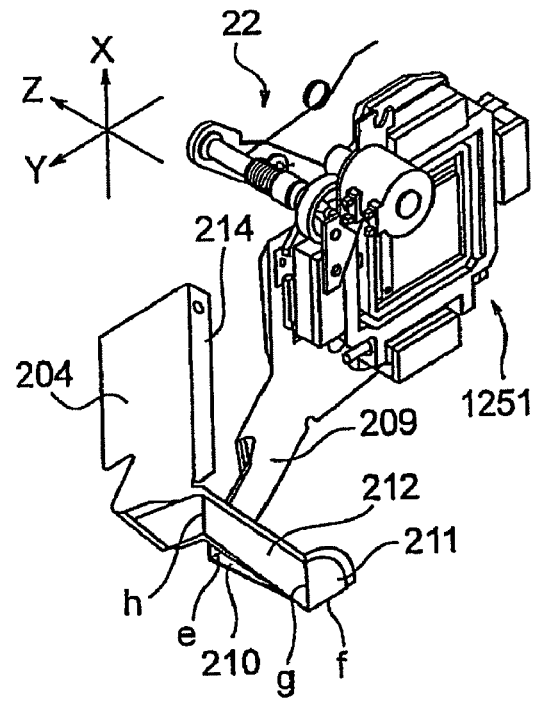
FIG. 29B is a perspective view, when seen from a direction different from that in FIG. 29A, schematically showing the arrangement relationship between the CCD stage and the flexible printed board.
Figure 29C:
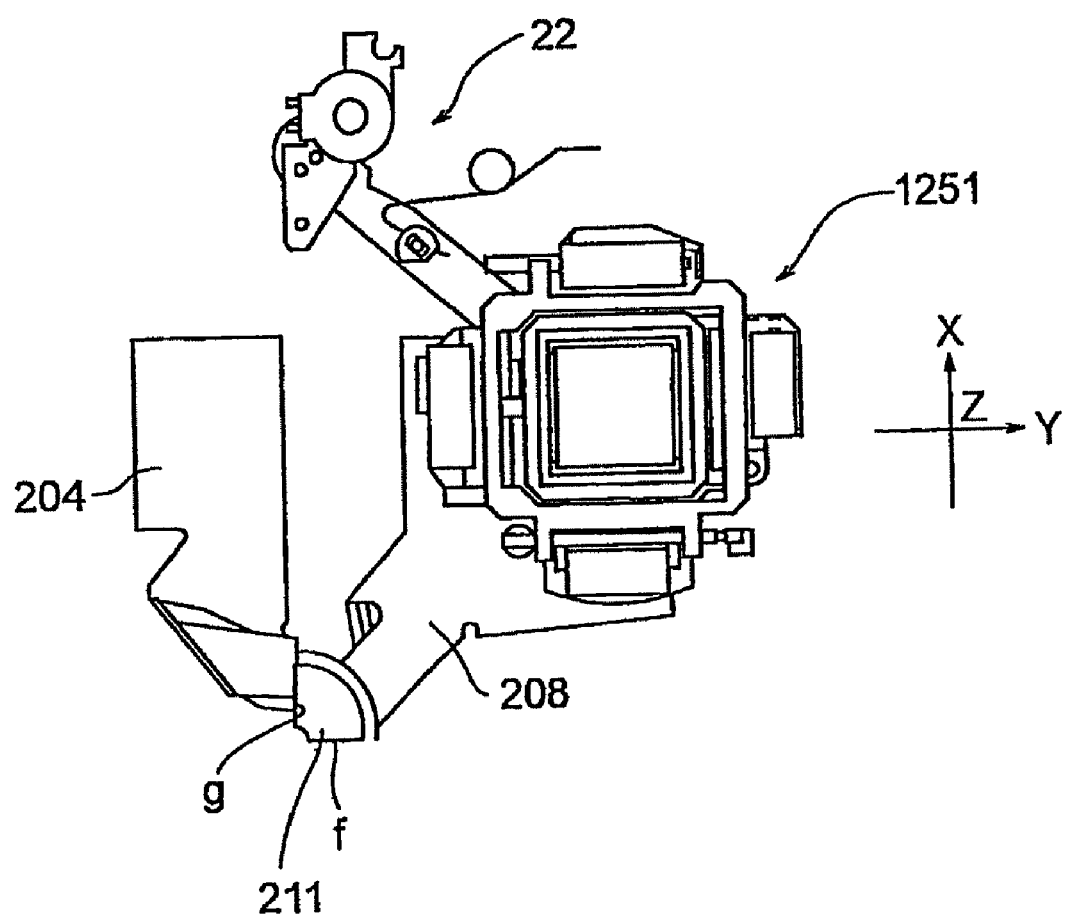
FIG. 29C is a perspective view, when seen from a direction different from those in FIGS. 29A and 29B, schematically showing the arrangement relationship between the CCD stage and the flexible printed board.

The printed board 20 is folded with the straight lines a and b as fold lines so that the second connection extension part 207 overlaps with the first connection extension part 206 to sandwich the FPC auxiliary plate 213 therebetween (see FIG. 28).

The printed board 20 is folded with the straight line c as the fold line so that the position detection element connection part 203 overlaps with the CCD connection part 201 to electrically connect the position detection element connection part 203 to the position detection element 1252 (see FIG. 28).

The printed board 20 is folded with the straight line d as the fold line so that the coil connection part 202 overlaps with the CCD connection part 201 to electrically connect the coil connection part 202 to each of the coiled bodies COL (see FIG. 28). According to the steps described above, the printed board 20 is attached to the CCD stage 1251 so as to be positioned within the X-Y plane on the base member 11 as shown in FIG. 28.

Next, as shown in FIGS. 21B, 22, 29A and 29B, the connection extension part 205 of the printed board 20 is folded roughly at a right angle along the straight line e so that the second straight portion 210 is extended along the Y-Z plane at the corner portion 10b of the fixation tube 10.

Moreover, the connection extension part 205 of the printed board 20 is folded roughly at a right angle along the straight line f so that the second curved portion 211 is extended within the X-Y plane displaced from the base member 11 to the lens barrel side in the Z axis direction and is also extended toward the fixation tube 10 as compared with the second straight portion 210.

Next, the connection extension part 205 of the printed board 20 is folded roughly at a right angle along the straight line g so that the third straight portion 212 is extended along the X-Z plane at the corner portion 10b of the fixation tube 10.

The connection extension part 205 of the printed board 20 is folded roughly at a right angle along the straight line h so that the block circuit connection part 204 is extended along the X-Y plane on the outside of the fixation tube 10. By the folding along the straight line h, a folding portion 214 is formed, which is extended along the X-Z plane. The block circuit connection part 204 is attached to the base member 11 through the folding portion 214 (see FIGS. 19 and 21B).

When the camera shake correction is performed, the mounting stage 15 is moved within the X-Y plane on the base member 11. Thus, a relative distance between the mounting stage connection side fixed to the mounting stage 15 and the block circuit connection side fixed to the base member 11 is changed in the printed board 20. In order to prevent force caused by the change in the relative distance therebetween from disturbing the movement of the mounting stage 15, the printed board 20 has the second straight portion 210 existing within the Y-Z plane and the third straight portion 212 existing within the X-Z plane. The second and third straight portions 210 and 212 are located perpendicular to each other. Since the printed board 20 is easily deformed in its thickness direction, the force in the X axis direction is absorbed by bending deformation of the second straight portion 210. Moreover, the force in the Y axis direction is absorbed by bending deformation of the third straight portion 212. As a result, the force caused by the change in the distance within the X-Y plane can be absorbed.

Moreover, the printed board 20 has the second curved portion 211 existing within the X-Y plane surrounded by the second straight portion 210, the third straight portion 212 and the fixation tube 10. Therefore, in the printed board 20, when force is applied to the folding portion (straight line e) between the mounting stage connection side and the second straight portion 210 by the movement of the mounting stage 15, the second straight portion 210 is bent into a C-shape expanded only in one direction. As a result, distortion stress can be reduced. Thus, in the printed board 20, repulsive force can be reduced and the force caused by the movement of the mounting stage 15 can be effectively absorbed. On the other hand, if the second curved portion 211 exists within the X-Y plane on the outside of the space surrounded by the second straight portion 210, the third straight portion 212 and the fixation tube 10, the second straight portion 210 is bent into an S-shape expanded in two opposite directions by the force applied to the folding portion (straight line e). As a result, the distortion stress is relatively increased. Therefore, the repulsive force is increased, and the absorbed amount of the force caused by the movement of the mounting stage 15 is reduced. The same goes for the third straight portion 212 which absorbs the force in the Y axial direction. Accordingly, the printed board 20 never disturbs the movement of the mounting stage 15 within the X-Y plane when the camera shake correction is performed.

The printed board 20 has its folding portion formed along the Z axial direction at the corner portion 10b of the fixation tube 10. Thus, the space around the lens barrel generally formed to have a circular shape, in other words, the corner portion 10b of the fixation tube 10 can be effectively used. Consequently, it is possible to prevent an increase in size of the camera caused by providing the folding portion.

The printed board 20 has the connection extension part 205 branched into the first connection extension part 206 and the second connection extension part 207 which can overlap with each other. Thus, it is possible to increase the number of power transmission paths without increasing the width of the connection extension part 205. Moreover, it is possible to provide the folding portions within the limited space of the corner portion 10b of the fixation tube 10. Therefore, it is not necessary to provide the second connection extension part 207 if not many power transmission paths are provided.

The printed board 20 has the FPC auxiliary plate 213 attached thereto. Thus, the printed board 20 is not bent in a portion from the CCD connection part 201 of the printed board 20 to the first curved portion 209 via the first straight portion 208. Moreover, the force caused by the movement of the mounting stage 15 can be applied to the third straight portion 212. As a result, the force can be surely absorbed in the folding portions.

(Retention Control Circuit of Camera Shake Correction Mechanism)

Figure 30:
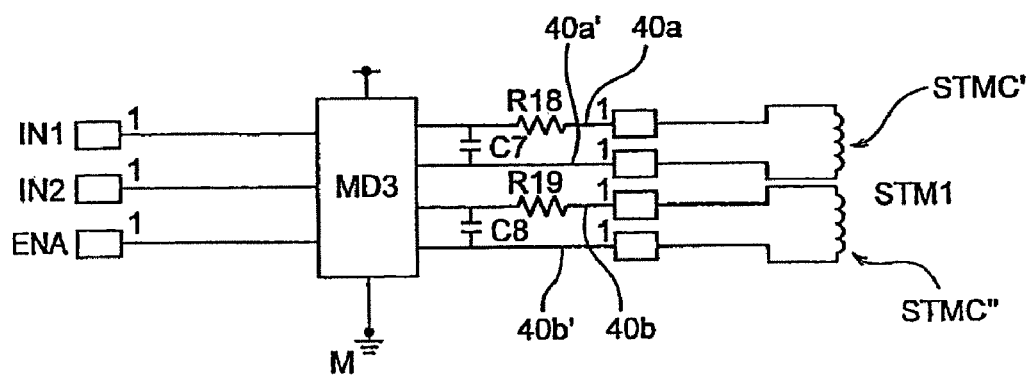
FIG. 30 is a circuit block diagram of an origin position forced retention control circuit according to an embodiment of the present invention.

The stepping motor STM1 is controlled by a retention control circuit shown in FIG. 30. The stepping motor STM1 has a two-phase control structure and includes a first coil STMC' having terminals connected to the motor driver MD3 through output lines 40a and 40a' and a second coil STMC" having terminals connected to the motor driver MD3 through output lines 40b and 40b'. The output line 40a has a resistance R18 for limiting current provided therein, and the output line 40b has a resistance R19 for limiting current provided therein. A capacitor C7 is interposed between the output lines 40a and 40a', and a capacitor C8 is interposed between the output lines 40b and 40b'.

Retention control signals are inputted to the motor driver MD3 from ports IN1 and IN2 of the processor 104. In addition, an enable signal is inputted to a port ENA of the processor 104. The motor driver MD3 controls power distribution to the stepping motor STM1 on the basis of the retention control signals and the enable signal.

Figure 31:
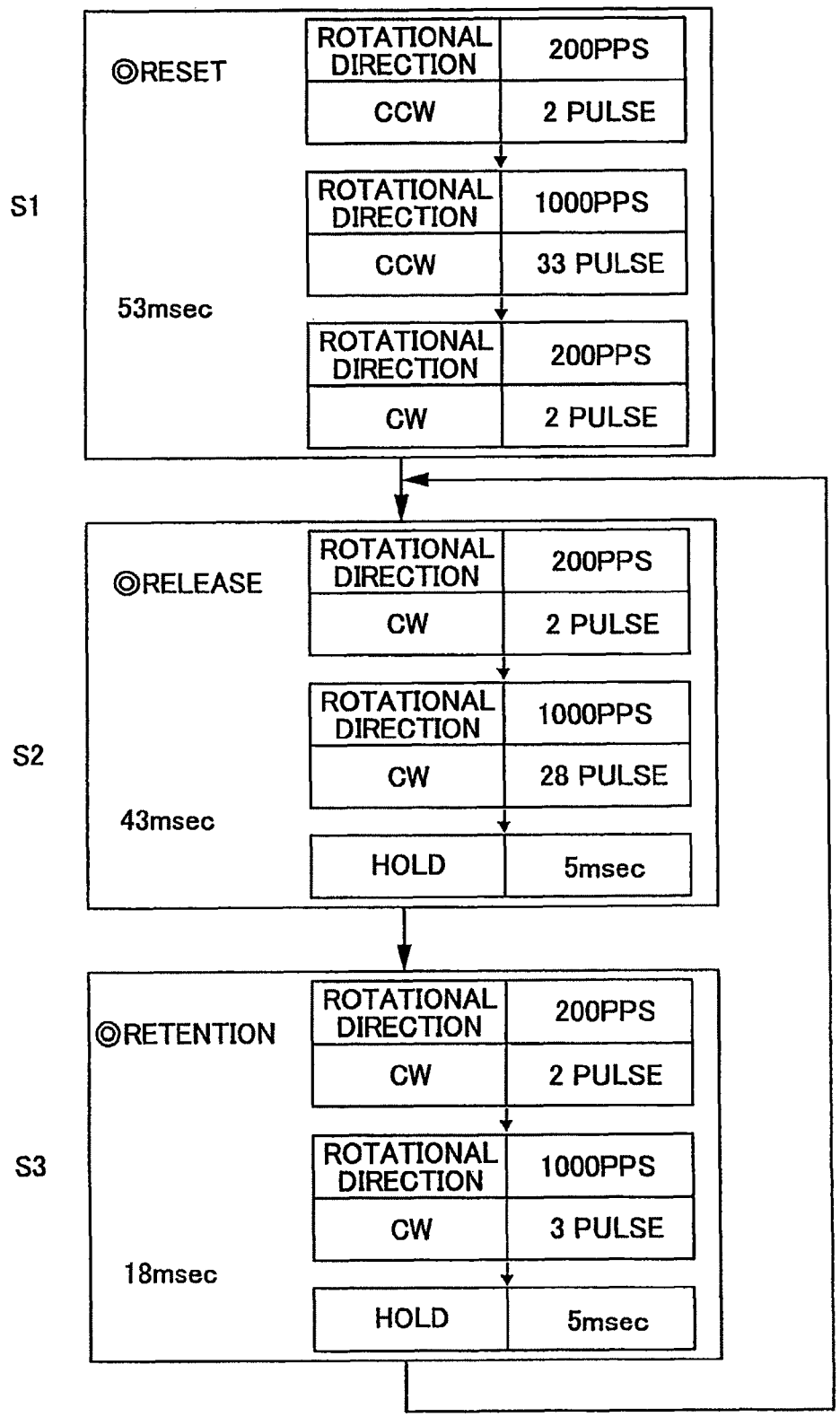
FIG. 31 is a flowchart showing an example of control processing of the origin position forced retention mechanism in the camera shake correction mechanism according to the embodiment of the present invention.

FIG. 31 is a flowchart for explaining operations of the retention control circuit shown in FIG. 30. The operations include three steps such as a reset process, a release process and a retention process.

When the power switch SW13 of the digital camera is turned on, the reset process is first executed according to the control of the processor 104 (S.1). In this reset process, the stepping motor STM1 is rotationally driven for 2 pulses in the counter-clockwise direction at a slow rate of 200 pps (pulse per second) by the control of the processor 104. Next, the stepping motor STM1 is rotationally driven for 33 pulses in the counter-clockwise direction at a fast rate of 1000 pps (pulse per second). Finally, the stepping motor STM1 is rotationally driven for 2 pulses in the clockwise direction at a slow rate of 200 pps (pulse per second).

Wherever the cam pin 32 is in the rotation direction of the cam groove 31, the cam pin 32 physically comes into contact with the steep cliff 31d of the cam groove 31 by rotating the stepping motor STM1 for about 35 pulses in the counter-clockwise direction.

Figure 24A:
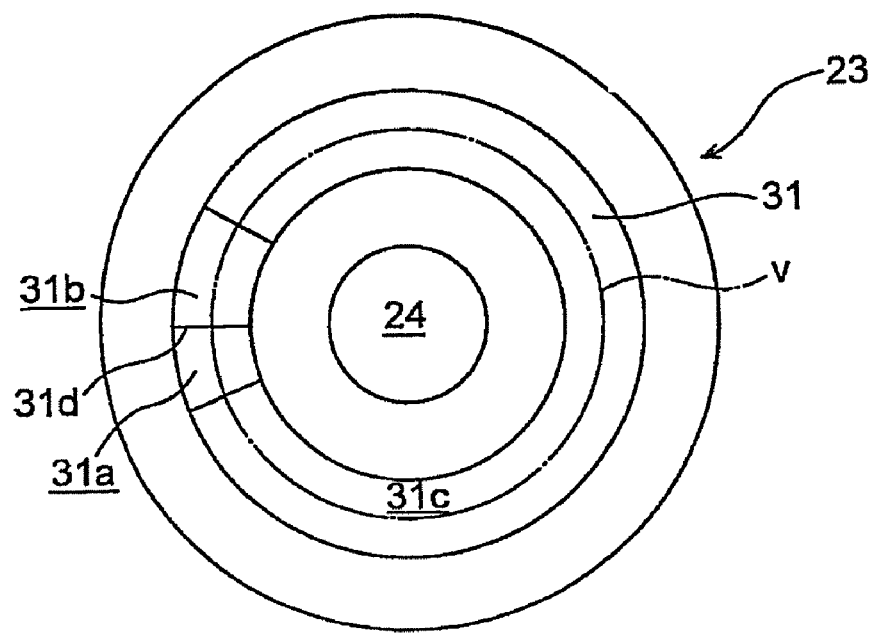
FIG. 24A is a schematic view showing a cam groove of a rotation transferring gear and is also a bottom view of the rotation transferring gear.
Figure 24B:
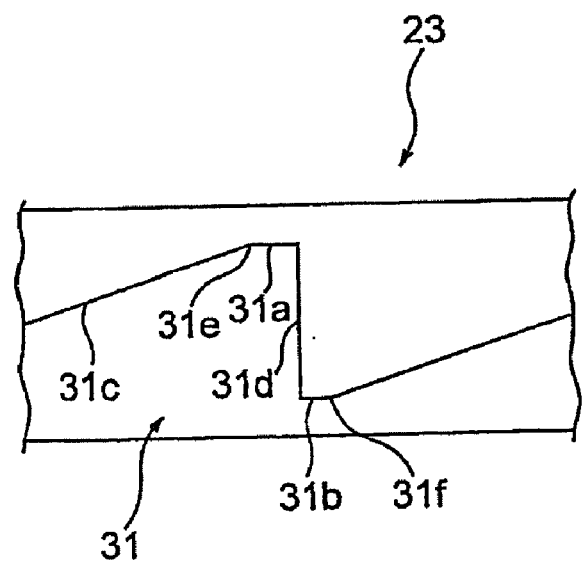
FIG. 24B is a schematic view showing the cam groove of the rotation transferring gear and also showing a cross-section obtained along the ring-shaped dashed line V shown in FIG. 24A.
Figure 24C:
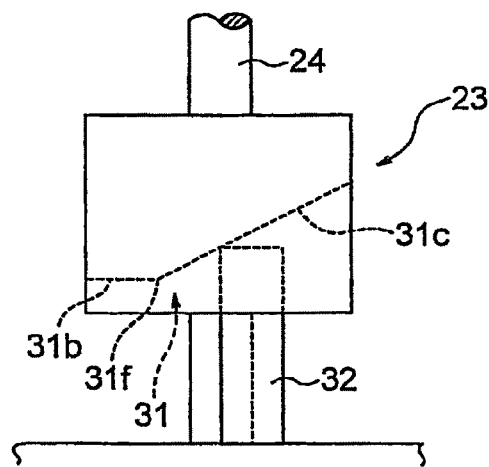
FIG. 24C is a schematic view showing the cam groove of the rotation transferring gear and also showing a state where a cam pin slides on an inclined surface portion of the cam groove and the rotation transferring gear is pushed up toward a base member.
Figure 24D:
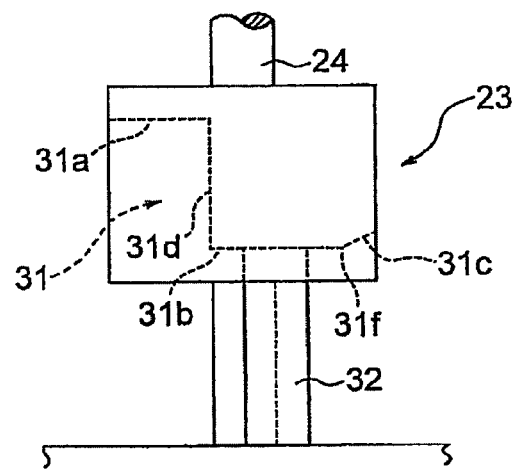
FIG. 24D is a schematic view showing the cam groove of the rotation transferring gear and also showing a state where the cam pin comes into contact with a flat peak portion of the cam groove and the rotation transferring gear is pushed all the way up.
Figure 24E:
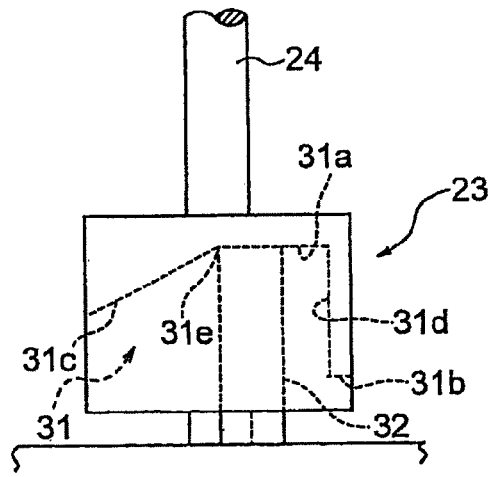
FIG. 24E is a schematic view showing the cam groove of the rotation transferring gear and also showing a state where the cam pin comes into contact with a flat valley floor portion after passing through a steep cliff and the rotation transferring gear is pushed all the way down.

When the stepping motor STM1 is driven for 2 pulses in the clockwise direction from the contact position with the steep cliff 31d of the cam pin 32, the cam pin 32 is set in the inclination start position 31e of the cam groove 31 (see FIG. 24E). The state where the cam pin 32 is set in the inclination start position 31e of the cam groove 31 is a reset position of the cam pin 32, which corresponds to the state where the CCD 101 is forcibly retained in the origin position O. The origin position O is also the center position within a range in which the mounting stage 15 can be moved. The time required from the power on to completion of reset is about 53 msec (millisecond).

In this camera shake correction mechanism, the camera shake correction is carried out by tuning on the camera shake correction switch SW14, and the camera shake correction is released when the camera shake correction switch SW14 is turned off or the photographing is completed.

If the camera shake correction switch SW14 is turned on, the release process is executed by controlling the processor 104 (S.2). In this release process, first, the stepping motor STM1 is rotationally driven for 2 pulses in the clockwise direction at a slow rate of 200 pps (pulse per second). Next, the stepping motor STM1 is rotationally driven for 28 pulses in the clockwise direction at a fast rate of 1000 pps (pulse per second). Thereafter, the power distribution to the stepping motor STM1 is maintained for 5 msec (millisecond). Next, the power distribution to the stepping motor STM1 is stopped by the motor driver MD1.

By the above release process, the cam pin 32 is positioned in the inclination end position 31f of the cam groove 31 (see FIG. 24D). The time required from the inclination start position 31e to the inclination end position 31f is about 43 msec (millisecond). More specifically, the time required for the cam pin 32 to move from the hold standby position to the release standby position is about 43 msec (millisecond). The camera shake correction control is performed in this release standby position.

Next, when the camera shake correction switch SW14 is turned off or the photographing is performed, the processor 104 carries out the retention process (S.3). In this retention process, the stepping motor STM1 is rotationally driven for 2 pulses in the clockwise direction at a slow rate of 200 pps (pulse per second) by the control of the processor 104. Thereafter, the stepping motor STM1 is rotationally driven for 3 pulses in the clockwise direction at a fast rate of 1000 pps (pulse per second). Thus, the cam pin 32 comes down to the flat valley floor portion 31a by passing through the flat peak portion 31b of the cam groove 31 to come into contact with the flat valley floor portion 31a. Subsequently, the power distribution to the stepping motor STM1 is maintained for 5 msec (millisecond).

Next, the motor drive MD1 stops the power distribution to the stepping motor STM1. Thus, the cam pin 32 is set in the inclination start position 31e of the cam groove 31, and the CCD 101 is retained at the center position. While the power is supplied, if once the reset process is performed, these release process and retention standby process are carried out. Note that the time required for movement from the release standby position to the retention standby position is about 18 msec (millisecond).

The camera shake correction mechanism has the configuration in which the mounting stage 15 of the CCD 101 is forcibly retained in the center position by the retention pin 33 formed in the forced retainer plate 26. Thus, it is not necessary to control the power distribution for keeping the retention of the mounting stage 15 in the origin position O. As a result, power consumption can be reduced even when the camera shake correction mechanism is operated.

(Circuit Configuration of Camera Shake Detection Circuit)

Figure 32:
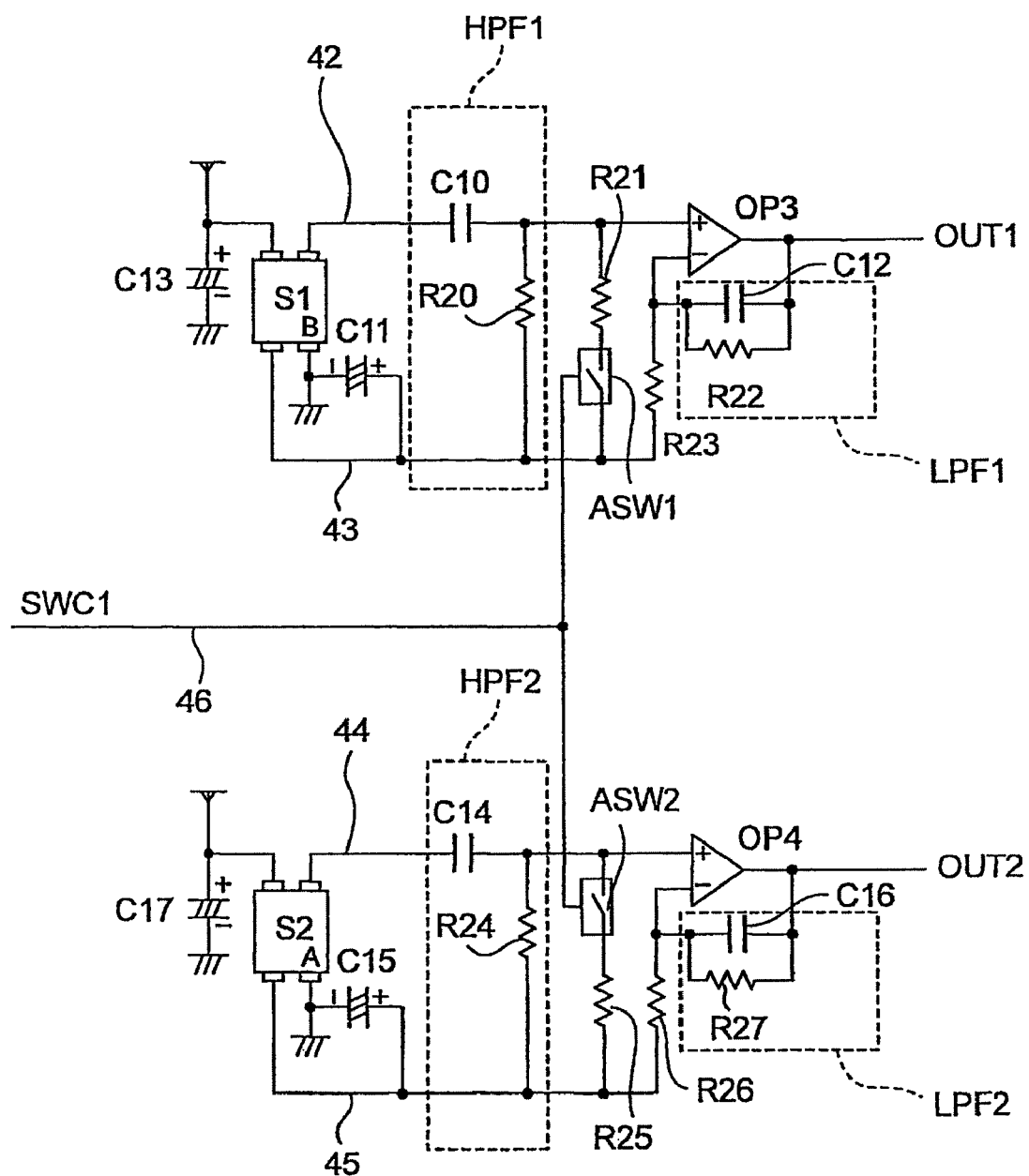
FIG. 32 is a circuit diagram showing an example of a camera shake detection circuit according to the embodiment of the present invention.

FIG. 32 is a view showing a circuit configuration of a camera shake detection circuit. The camera shake detection circuit includes an X direction rotation detection part, which detects rotation in the X direction, and a Y direction rotation detection part, which detects rotation in the Y direction.

The X direction rotation detection part has, for example, a piezoelectric vibration gyro sensor S1B. The piezoelectric vibration gyro sensor S1B has: a first terminal grounded via a capacitor C13; a second terminal connected to a positive terminal of an operational amplifier OP3 via a capacitor C10 provided in the middle of a connection line 42; and a third terminal connected to a negative terminal of the operational amplifier OP3 via a resistance R23 provided in the middle of a connection line 43.

Moreover, a fourth terminal of the piezoelectric vibration gyro sensor S1B is grounded and also connected to the connection line 43 via a capacitor C11. The operational amplifier OP3 has the positive terminal connected to the connection line 43 via a resistance R20. A serial body including a resistance R21 and a switching switch ASW1 is connected between the connection lines 42 and 43 in parallel with the resistance R20.

The operational amplifier OP3 has an output terminal connected to the negative terminal of the operational amplifier OP3 via a capacitor C12. A resistance R22 is connected to the capacitor C12 in parallel therewith. The capacitor C10 and the resistance R20 make up a high-pass filter HPF1, and the capacitor C12 and the resistance R22 make up a low-pass filter LPF1. The operational amplifier OP3 amplifies the output of the piezoelectric vibration gyro sensor S1B and outputs an X direction detection signal OUT1 from the output terminal of the operational amplifier OP3.

The Y direction rotation detection part has a piezoelectric vibration gyro sensor S2A. The piezoelectric vibration gyro sensor S2A has: a first terminal grounded via a capacitor C17; a second terminal connected to a positive terminal of an operational amplifier OP4 via a capacitor C14 provided in the middle of a connection line 44; a third terminal connected to a negative terminal of the operational amplifier OP4 via a resistance R26 provided in the middle of a connection line 45; and a fourth terminal grounded and also connected to the connection line 45 via a capacitor C15.

The operational amplifier OP4 has the positive terminal connected to the connection line 45 via a resistance R24. A series body including a resistance R25 and a switching switch ASW2 is connected between the connection lines 44 and 45 in parallel with the resistance R24. The operational amplifier OP4 has an output terminal connected to the negative terminal of the operational amplifier OP4 via a capacitor C16. A resistance R27 is connected to the capacitor C16 in parallel therewith. The capacitor C14 and the resistance R24 make up a high-pass filter HPF2, and the capacitor C16 and the resistance R27 make up a low-pass filter LPF2. The operational amplifier OP4 amplifies the output of the piezoelectric vibration gyro sensor S2A and outputs an X direction detection signal OUT2 from the output terminal of the operational amplifier OP4.

A switching control signal SWC1 is inputted to the switching switches ASW1 and ASW2 via a signal line 46. Each of the switching switches ASW1 and ASW2 has a function for accelerating charge of each of the capacitors C11 and C15 so as to increase a response speed of each of the high-pass filters HPF1 and HPF2. The processor 104 outputs the switching control signal SWC1 to the switching switches ASW1 and ASW2 for a predetermined time after turning on the power. Thus, the switching switches ASW1 and ASW2 are turned on for a predetermined time. The detection outputs OUT1 and OUT2 of the gyro sensors S1B and S2A are read into the A/D converter 10411 every T seconds. Where ω yaw (t) ... instant angular velocity in YAW direction
ω pitch (t) ... instant angular velocity in PITCH direction
θ yaw (t) ... angular variation in YAW direction
θ pitch (t) ... angular variation in PITCH direction
D yaw (t) ... movement amount of image in X direction corresponding to rotation in YAW direction.
D pitch (t) ... movement amount of image in Y direction corresponding to rotation in PITCH direction,
θ yaw (t) and θ pitch (t) are obtained by the following relational expressions. θ yaw (t)=Σωyaw (i)·T
θ pitch (t)=Σωpitch (i)·T Moreover, a focal length f is determined from a zoom point zp and a focal point fp. The following equations are established among Dyaw (t), the movement amount of image corresponding to rotation in the YAW direction, D pitch (t), the movement amount of image corresponding to rotation in the PITCH direction, θ yaw (t), the angular variation in the YAW direction, and θ pitch (t), the angular variation in the PITCH direction.

$$D\text{yaw}(t) = f * \tan(\theta\text{yaw}(t)) \quad \text{(i)}$$

$$D\text{pitch}(t) = f * \tan(\theta\text{pitch}(t)) \quad \text{(ii)}$$

Specifically, Dyaw (t), the movement amount of image in the X direction corresponding to rotation in the YAW direction and Dpitch (t), the movement amount of image in the Y direction corresponding to rotation in the PITCH direction correspond to an amount for which the CCD 101 should be moved in the X-Y direction.

If rotational displacements in the YAW direction and in the PITCH direction are caused by the camera shake, a target position of the CCD is calculated by the above equations (i) and (ii). Moreover, the mounting stage 15 is driven so as to eliminate a difference between the target value and an actual position of the CCD 101 in the X-Y direction detected by the position detection element 1252. This control is performed every T seconds.

Note that, when the detection outputs of the gyro sensors S1B and S2A are "0", the mounting stage 15 is controlled such that the CCD 101 is translationally displaced by following translational movement displacement Xd of the camera main body.

(Camera Shake Correction Control Circuit)

FIG. 33 is a block diagram showing one example of a camera shake correction control circuit. The camera shake correction control circuit roughly consists of a feedback circuit 50 and a position correspondence voltage setting circuit 51.

The hall elements H1 and H2 (the hall elements 1252a and 1252b shown in FIG. 1) constitute a part of the position correspondence voltage setting circuit 51. A predetermined voltage Vh1− is applied to the hall element (1252a) H1. The hall element H1 has one terminal connected to a negative terminal of an operational amplifier OP1 via a resistance R2 and the other terminal connected to a positive terminal of the operational amplifier OP1 via a resistance R3.

The operational amplifier OP1 has an output terminal connected to an input port L1 of the processor 104 via a resistance R5 and also connected to the negative terminal of the operation amplifier OP1 via the resistance R1. In addition, the connection point between the resistance R5 and the input port L1 is grounded via a capacitor C1.

A predetermined voltage Vh2− is applied to the hall element (1252b) H2. The hall element H2 has one terminal connected to a negative terminal of an operational amplifier OP2 via a resistance R7 and the other terminal connected to a positive terminal of the operational amplifier OP2 via a resistance R8.

The operational amplifier OP2 has an output terminal connected to an input port L2 of the processor 104 via a resistance R9 and also connected to the negative terminal of the operational amplifier OP2 via a resistance R6. In addition, the connection point between the resistance R9 and the input port L2 is grounded via a capacitor C2.

The processor 104 has: an output port L3 connected to a D/A conversion circuit IC2 constituting a part of the position correspondence voltage setting circuit 51; output ports L4 and L6 connected to the D/A conversion circuit IC2 and a D/A conversion circuit IC1; and an output port L5 connected to the D/A conversion circuit IC1.

Two output lines 61 and 62 are connected to the D/A conversion circuit IC2. One of the output lines 61 is inputted to the positive terminal of the operational amplifier OP1 via a resistance R4 and the other output line 62 is inputted to the positive terminal of the operational amplifier OP2 via a resistance R10.

A chip selector signal DI from the output port L3, a clock signal SCLK from the output port L4, and correction digital data DIN from the output port L6 are inputted to the D/A conversion circuit IC2. The D/A conversion circuit IC2 has a function of performing digital/analog conversion of the correction digital data.

The D/A conversion circuit IC1 constitutes a part of the feedback circuit 50. A common line 63 and two Output lines 64 and 65 are connected to the D/A conversion circuit IC1. The common line 63 is connected to coil drive circuits MD1 and MD2. The output line 64 is connected to an input terminal L7 of the coil drive circuit MD1 via a resistance R14. The output line 65 is connected to an input terminal L8 of the coil drive circuit MD2 via a resistance R15.

The connection point between the resistance R14 and the input terminal L7 is connected to an earth terminal ER1 of the coil drive circuit MD1 via a capacitor C3. The connection point between the resistance R15 and the input terminal L8 is connected to an earth terminal ER2 of the coil drive circuit MD2 via a capacitor C4. The common line 63 is connected to a power source Vcc via resistances R12 and R11. The connection point therebetween is grounded via a resistance R13.

A control signal CONT1 from the processor 104 is inputted to both of the coil drive circuits MD1 and MD2. The coil drive circuit MD1 has an output terminal connected to a coil COL1" (a serial connection body of the coiled bodies COL1 and COL1') via a resistance R16. A capacitor C5 is connected in parallel with a serial body of the resistance R16 and the coil COL1". The coil drive circuit MD2 has an output terminal connected to a coil COL2" (a serial connection body of the coiled bodies COL2 and COL2') via a resistance R17. A capacitor C6 is connected in parallel with a serial body of the resistance R17 and the coil COL2". The coil COL1" is used to drive the mounting stage 15 in the X direction, and the coil COL2" is used to drive the mounting stage 15 in the Y direction.

Here, in a state where the predetermined voltage Vh1− is applied to the hall element H1 and the predetermined voltage Vh2− is applied to the hall element H2, detection output voltage values of the hall elements H1 and H2 are set to be Vh1 and Vh2 when the detection outputs of the gyro sensors S1B and S2A (see FIG. 32) are 0 and also the CCD 101 exists in the center position (origin O) of the movable area. In this case, analog output voltage values of the respective input ports L1 and L2 of the processor 104 are set to be V1ADin and V2ADin. These output voltage values V1ADin and V2ADin are actually measured.

The output voltage values (actual measurement values) V1ADin and V2ADin vary based on an assembly error factor regarding the mechanical positional relationship between the magnets (permanent magnets) 16a to 16d and the hall elements H1 and H2, an assembly error factor between the attachment positions of the hall elements H1 and H2 and the attachment positions of the coils COL1" and COL2" with respect to the mounting stage 15, and the like. Moreover, the output voltage values (actual measurement values) V1ADin and V2ADin also vary according to characteristics of the hall elements H1 and H2.

Therefore, if no correction is performed, the detection values of the hall elements H1 and H2 corresponding to the origin position O vary or each of cameras. Thus, accurate camera shake correction cannot be performed.

To deal with this problem, correction voltages Vr1' and Vr2', which are inputted to the respective operational amplifiers OP1 and OP2 from the analog/digital converter IC2, are set such that the output voltage values V1ADin and V2ADin before correction are set to constant voltage values (setting reference voltage values). More particularly, the correction voltages Vr1' and Vr2' are set so as to correct the variations in the output voltage values (detection values) V1ADin and V2ADin when the CCD 101 exists in the origin position O and the CCD 101 is not controlled (when the power is not supplied to the coils COL1" and COL2").

Here, in order to set the correction voltages Vr1' and Vr2' to the setting reference voltage value, for example, 1.7 volts which is substantially a central value of a movable range voltage of the operational amplifiers OP1 and OP2, the processor 104 performs the following calculation.

Here, for convenience of description, the resistances are set to R2=R3=R7=R8 and R1=R4=R10=R6. However, the present invention is not limited thereto.

Under the conditions of R2=R3=R7=R8 and R1=R4=R10=R6, the following relational expressions are established.

$$V1ADin=R1/R2*((Vh1+)-(Vh1-))+Vr1'$$

$$V2ADin=R1/R2*((Vh2+)-(Vh2-))+Vr2'$$

The processor 104 is configured to acquire the correction voltages Vr1' and Vr2' through calculation depending on the above relational expressions. As a result, even if the detection values of hall elements H1, H2 in the reference position or original position O of the CCD 101 vary based on the assembling error factor regarding the mechanical positional relationship between the magnets (permanent magnets) 16a-16d and the hall elements H1, H2, the assembling error factor between the mounting positions of the hall elements H1, H2 and the mounting positions of the coils COL1", COL2" with respect to the mounting stage 15, or the like, the CCD 101 can be moved in accordance with the correction amount detected by the gyro sensors.

The processor 104 includes, together with the D/A conversion circuit IC2, a part of a variation correction circuit which outputs correction values for setting the detection values to the setting reference voltage values regardless of the variations in the detection values of the hall elements H1 and H2. Furthermore, the processor 104 also functions as correction value calculation means for obtaining the setting reference voltage values by calculation.

This initial setting is set before shipment which is a final inspection in a factory for assembling a camera, as shown in the flowchart of FIG. 34 (see S.1 to S.3).

Figure 35:
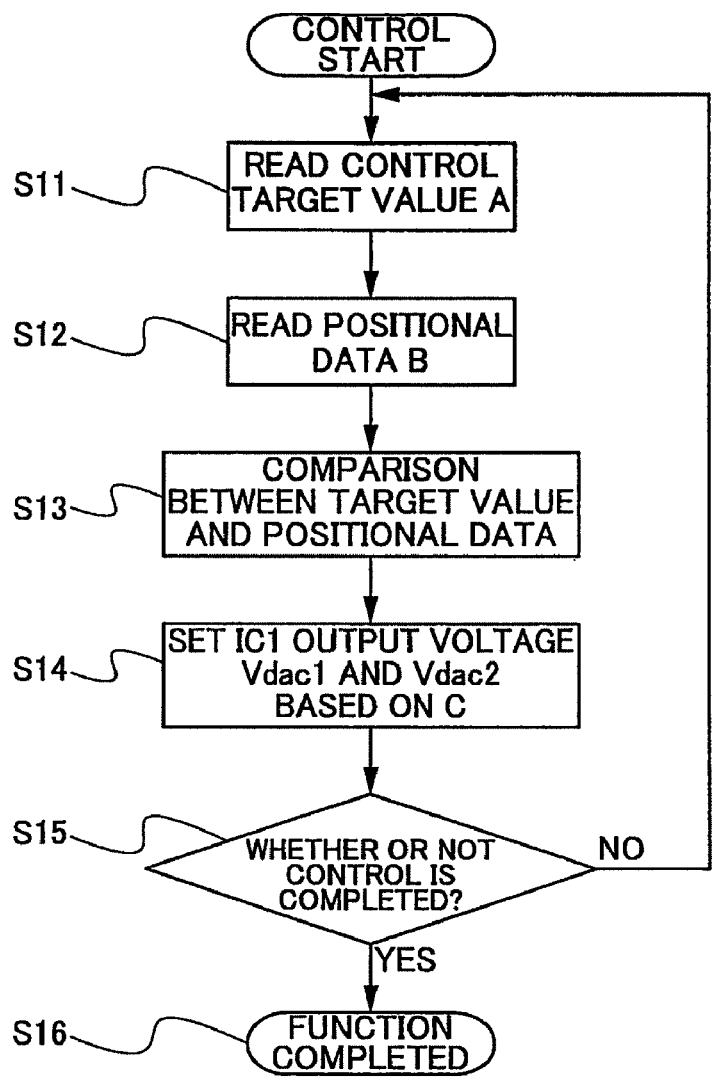
FIG. 35 is a flowchart showing an example of processing of the camera shake correction control circuit according to the embodiment of the present invention.

As shown in the flowchart of FIG. 35, in the actual control, the processor 104 first reads control target values obtained by the calculations on the basis of the detection outputs OUT1 and OUT2 of the camera shake detection circuit (S.11). Next, the processor 104 reads the actual position correspondence voltage values V1ADin and V2ADin obtained by the hall elements H1 and H2 (S.12). Thus, the processor 104 calculates a difference between the control target values and the position correspondence voltage values V1ADin and V2ADin (S.13).

The processor 104 outputs control data to the digital/analog conversion circuit IC1 on the basis of the output of the difference. The digital/analog conversion circuit IC1 outputs control voltages Vdac1 and Vdac2 corresponding to the control data (S.14). The control voltages Vdac1 and Vdac2 are inputted to the coil drive circuits MD1 and MD2. The coil drive circuits MD1 and MD2 output drive voltages Vout1 and Vout2 to the respective coils COL1" and COL2".

Assuming that Vr is a division voltage, the drive voltages Vout1 and Vout2 are set according to the following equations.

$$Vout1=(Vdac1-Vr)*K$$

$$Vout2=(Vdac2-Vr)*K$$

Here, reference numeral K is a proportional constant based on the division voltage Vr.

The CCD 101 is attracted and repelled by a magnetic field of the magnets 16a to 16d and the coils COL1" and COL2" to move in a direction controlled by whether each of the drive voltages Vout1 and Vout2 is a "positive voltage" or a "negative voltage". Thus, the detection values of the hall elements H1 and H2 are changed. The position correspondence voltage values V1ADin and V2ADin are changed corresponding to the change in the detection values. The position correspondence voltage values are fed back to the processor 104. Thus, the CCD 101 can be allowed to smoothly follow the target position even if the control target values are changed by the detection output values of the camera shake detection circuit (S.15). When the photographing is completed, the control is terminated (S.16).

Modified Example

Figure 36:
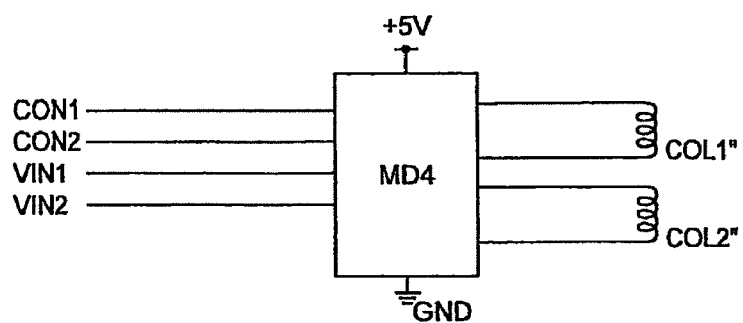
FIG. 36 is a circuit block diagram showing a modified example of a feedback circuit shown in FIG. 31.

FIG. 36 is a circuit diagram showing a modified example of the feedback circuit 50. Here, the processor 104 controls driving of a coil driver MD4 by means of PWM control so as to control the power distribution to the coils COL1" and COL2".

More particularly, a normal direction signal CON1 and a reverse direction signal CON2 are inputted to the coil driver MD4, and pulse voltages Vin1 and Vin2 are also inputted thereto. The power distribution voltages to the coils COL1" and COL2" are increased as the duration of a high level of the pulse signal gets longer.

(Details of Photographing by Turning on Camera Shake Correction Mechanism)

Figure 37:
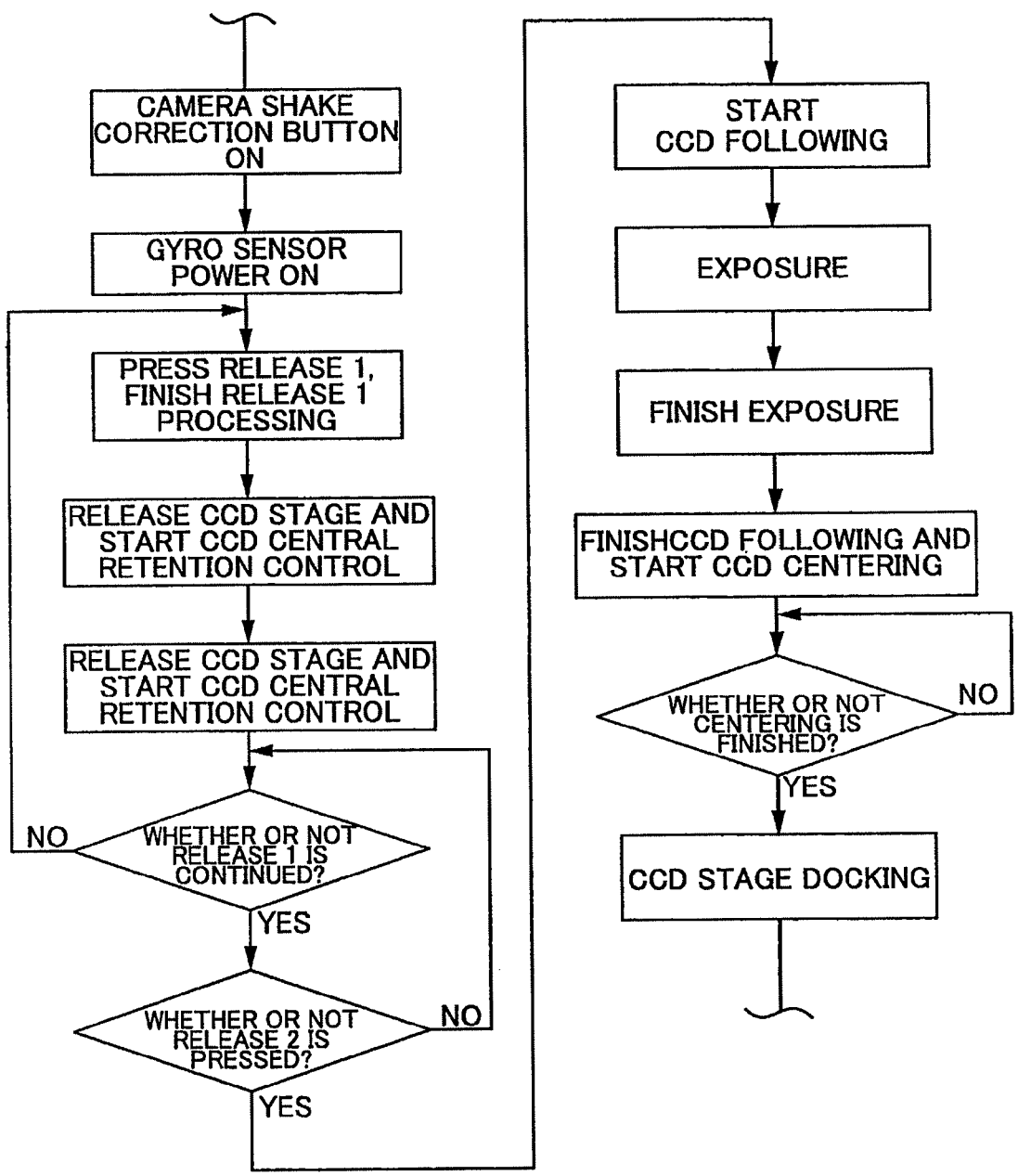
FIG. 37 is a flowchart showing a series of steps of camera shake correction processing in the imaging apparatus according to the embodiment of the present invention.

As shown in FIG. 37, when the camera shake correction switch SW14 is turned on (S.1), the gyro sensors S1B and S2A are powered on (S.2). When the release switch SW1 is pressed to complete half-pressing (S.3), an autofocus operation (focusing operation) is started (S.4). At the same time as the start of the autofocus operation, the mechanical forced fixation of the mounting stage 15 is released, and CCD central retention control is started by the power distribution to the coils COL1" and COL2" (S.4).

Next, a monitoring process by camera shake is started (S.5). The processor 104 determines whether or not the half-pressing of the release switch SW1 is continued (S.6). If the half-pressing of the release switch SW1 is released, the flow returns to Step S.3. Meanwhile, if the half-pressing of the release switch SW1 is continued, the processor 104 determines whether or not full-pressing of the release switch SW1 is performed (S.7). If the full-pressing of the release switch SW1 is not performed, the flow returns to Step S.6.

If the full-pressing of the release switch SW1 is completed, following of the CCD 101 is started in an image movement direction (S.8). Next, exposure is performed (S.9). When the exposure is completed (S.10), the following of the CCD 101 is stopped (S.11). Accordingly, the mounting stage 15 is returned to the origin position O by the processor 104 controlling the power distribution to the coils COL1" and COL2" (S.11). The processor 104 determines whether or not the mounting stage 15 is returned to the origin position O (S.12). If the mounting stage 15 is returned, the processor 104 forcibly fixes the mounting stage 15 (the CCD 101) to the origin position O in a mechanical manner (mechanical forced retention in the origin position O by the origin position forced retention mechanism 1263) (S.13).

There are two modes conceivable for the operation timing of the release switch SW1.

Figure 38:
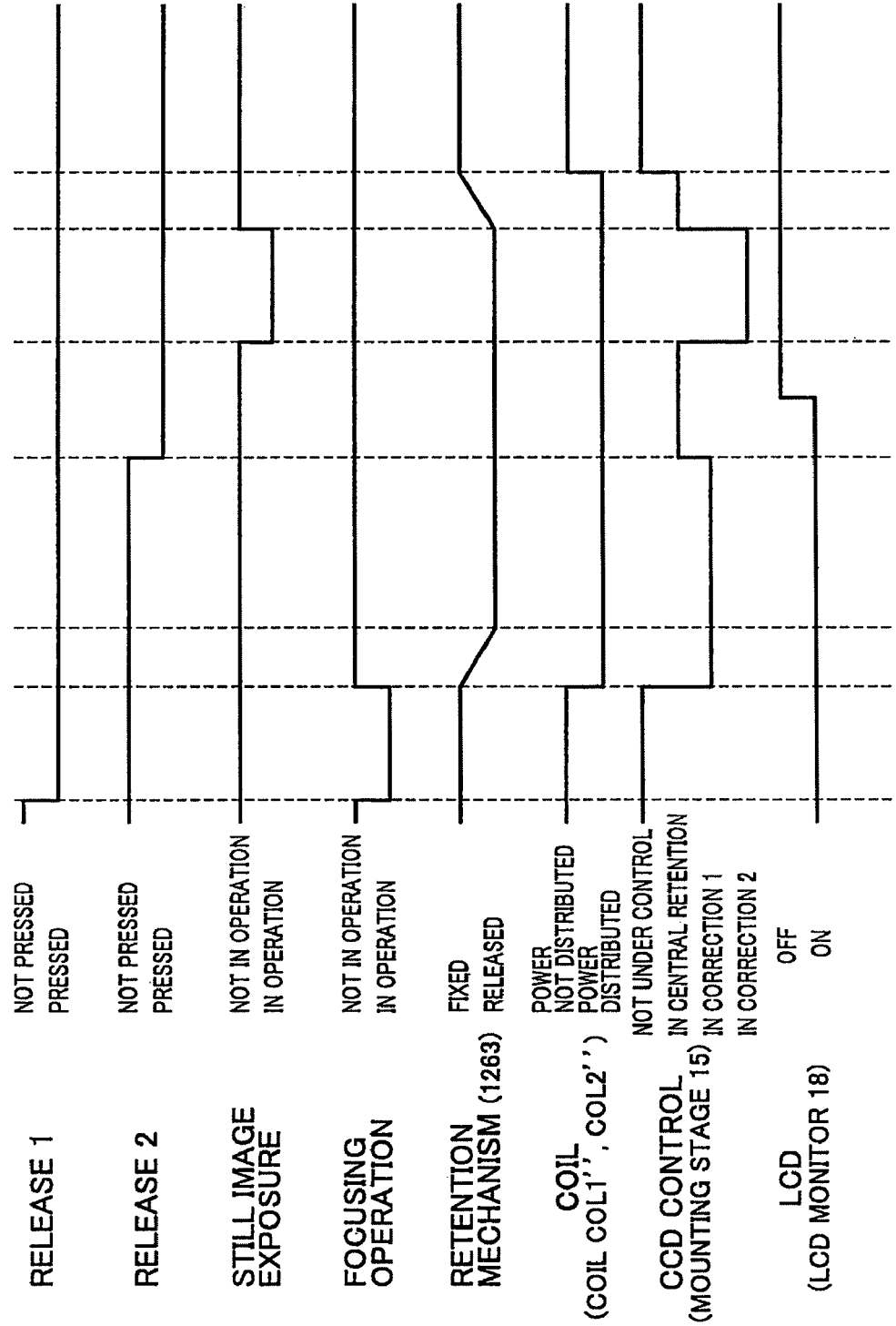
FIG. 38 is a timing chart showing one example of the camera shake correction processing in the case of full-pressing in the imaging apparatus according to the embodiment of the present invention.

FIG. 38 is a timing chart of the camera shake correction processing in the case of the full-pressing of the release switch SW1. Here, the full-pressing means a release operation having discontinuity from the half-pressing operation of the release switch SW 1 to the full-pressing operation of the release switch SW1. For example, the full-pressing means a photographing operation performed by a user who carries out the half-pressing operation of the release switch SW1 and then makes a shift to an exposure start operation by carrying out the full-pressing of the release switch SW1 at the right moment.

If the release switch SW1 is half-pressed, the focusing operation of the digital camera is started. In this state, the origin position forced retention mechanism 1263 has not yet released the forced retention of the mounting stage 15. The power is not supplied to the coils COL1" and COL2". Moreover, the mounting stage 15 is mechanically fixed to the center position, and the subject image is displayed on the LCD monitor 18.

When the focusing operation is completed, the processor 104 starts the power distribution to the stepping motor STM1 of the origin position forced retention mechanism 1263. Thus, the mechanical forced retention of the mounting stage 15 is released. At the same time as the release of the forced retention, the power distribution to the coils COL1" and COL2" is started by the processor 104. By the above control of the power distribution to the coils COL1" and COL2", the camera shake correction process during the half-pressing operation (release 1) of the release switch SW1 is conducted. When the release switch SW1 is fully pressed (release 2), the mounting stage 15 is once returned to the center position by the control of the power distribution to the coils COL1" and COL2". Thereafter, the LCD monitor 18 is turned off after some time and is set in a state of not displaying the subject image.

Next, when still image exposure is started, the mounting stage 15 is controlled to follow the image movement based on the camera shake. When the still image exposure is completed, the mounting stage 15 is returned to the center position based on the control of the power distribution to the coils COL1" and COL2". Next, the processor 104 starts the power distribution to the stepping motor STM1 of the origin position forced retention mechanism 1263. Thus, the mechanical forced fixation of the mounting stage 15 is performed. Subsequently, the power distribution to the coils COL1" and COL2" is stopped.

As described above, even if the camera is shaken, the user can visually recognize the LCD monitor 18 to monitor the subject image without having the camera shake during the release 1.

Moreover, when the mounting stage 15 is once returned to the center position during the release 2, the composition during the release 2 is displaced with respect to the composition of the subject image during the release 1. However, according to the embodiment of the present invention, since the subject image right before photographing is displayed on the LCD monitor 18 in a state where the mounting stage 15 is once returned to the center position, the user can confirm the composition of the subject image right before photographing (right before exposure).

Figure 39:
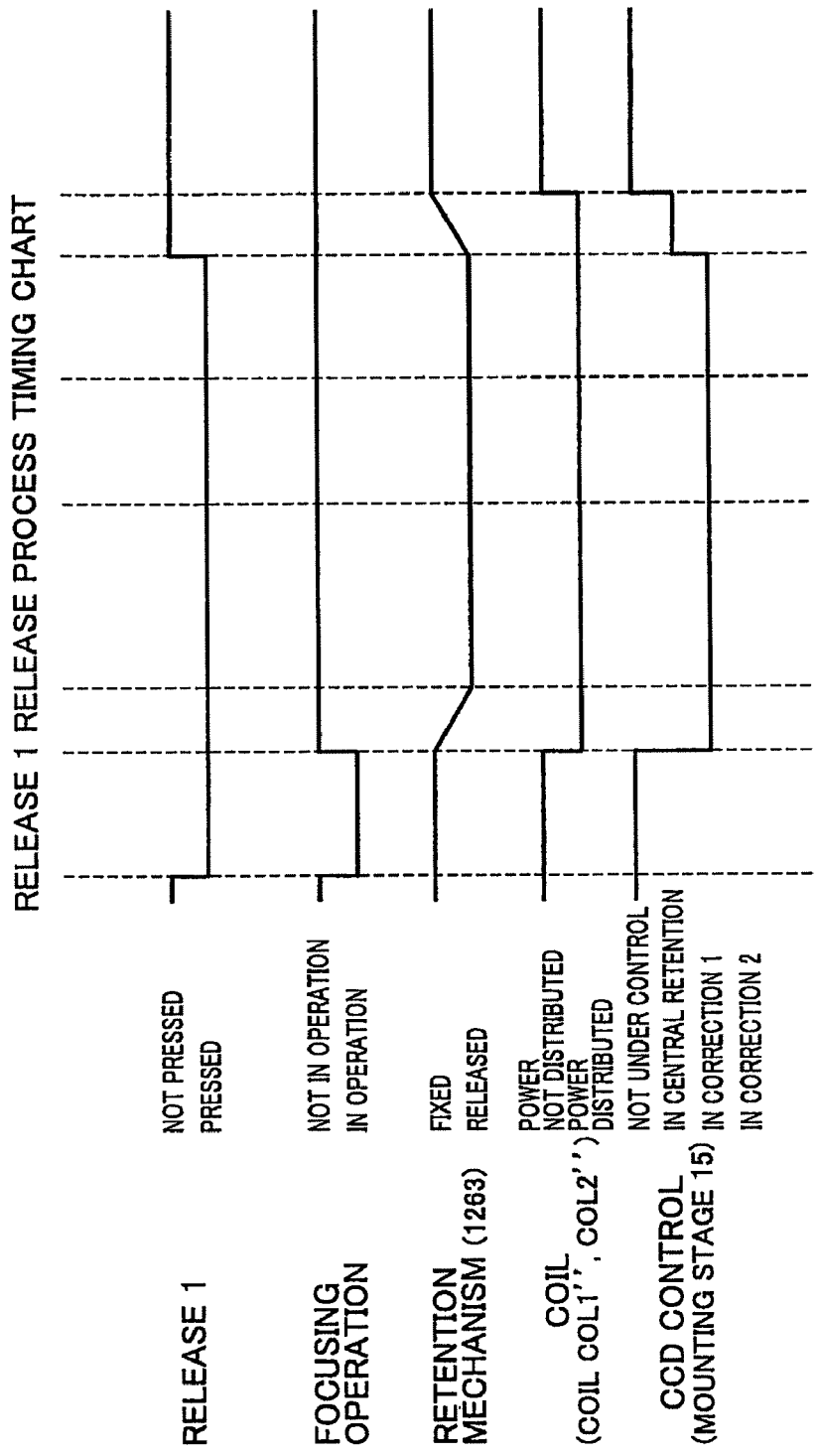
FIG. 39 is a timing chart showing one example of release processing of the camera shake correction processing of the imaging apparatus according to the embodiment of the present invention.

FIG. 39 shows a timing chart of the camera shake correction processing in the case where the release switch SW1 is half-pressed and then the half-pressing of the release switch SW1 is released without performing the full-pressing operation.

The focusing operation is started at the same time as the half-pressing of the release switch SW1. When the focusing operation is completed, the processor 104 starts the power distribution to the stepping motor STM1 of the origin position forced retention mechanism 1263. Thus, the mechanical forced retention of the mounting stage 15 is released. At the same time as the release of the forced retention, the power distribution to the coils COL1" and COL2" is started. By the control of the power distribution to the coils COL1" and COL2", the camera shake correction process during the half-pressing operation (release 1) of the release switch SW1 is performed.

If the half-pressing operation of the release switch SW1 is released during the half-pressing operation of the release switch SW1, the mounting stage 15 is retuned to the center position based on the control of the power distribution to the coils COL1" and COL2". Next, the processor 104 starts the power distribution to the stepping motor STM1 of the origin position forced retention mechanism 1263. Thus, the mechanical fixation and retention of the mounting stage 15 is performed. Next, the power distribution to the coils COL1" and COL2" is stopped.

Figure 40:
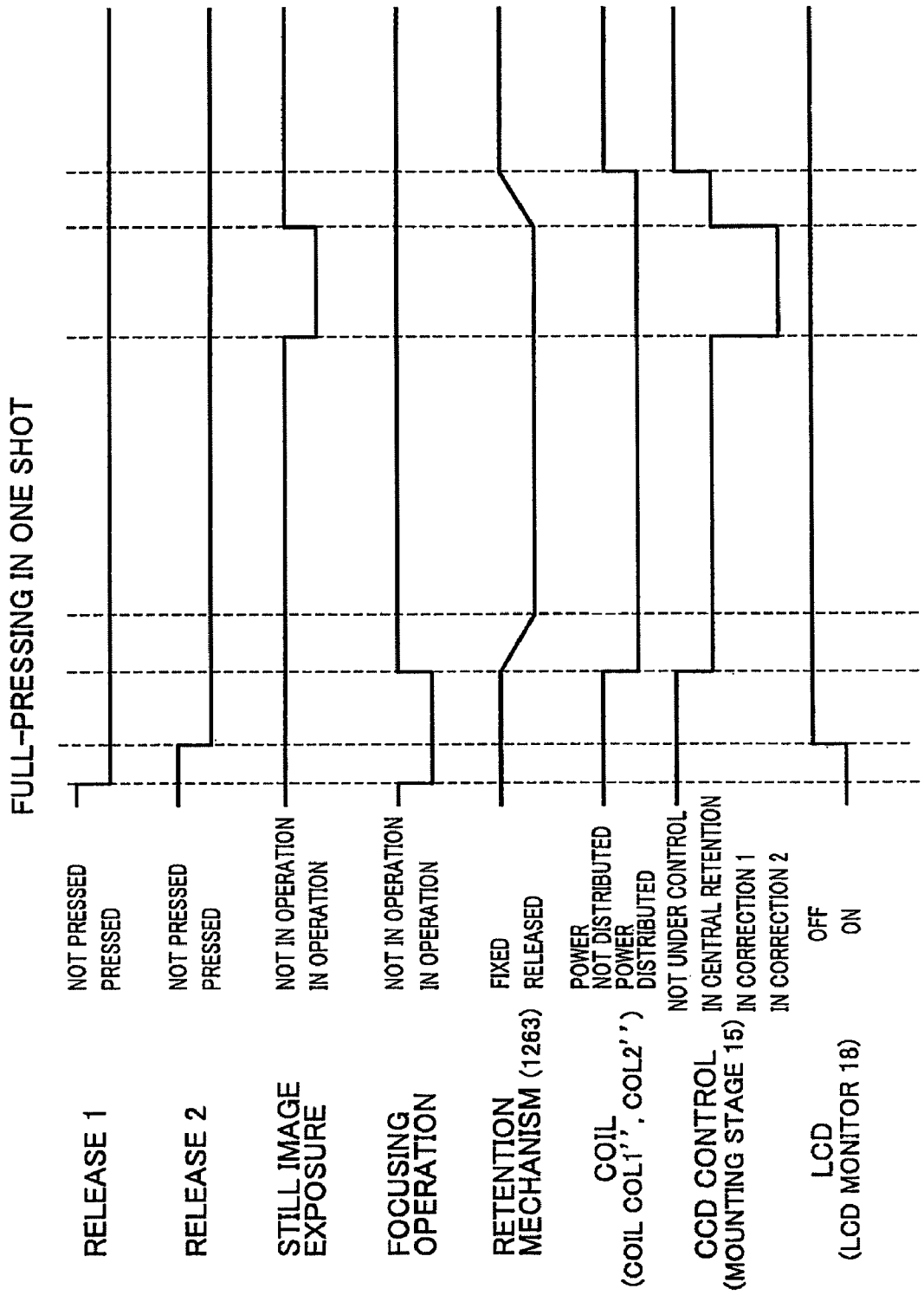
FIG. 40 is a timing chart showing one example of the camera shake correction processing in the case of full-pressing in one shot in the imaging apparatus according to the embodiment of the present invention.

FIG. 40 is a timing chart of the camera shake correction process when the release switch SW1 is fully pressed in one shot. Here, the full-pressing in one shot means a release operation having continuity from the half-pressing operation (release 1) of the release switch SW1 to the full-pressing operation (release 2) thereof. For example, the full-pressing in one shot means a photographing operation performed by the user who carries out the half-pressing operation of the release switch SW1 and then immediately makes a shift to the exposure start operation by carrying out the full-pressing of the release switch SW1.

If the release switch SW1 is half-pressed, the focusing operation of the digital camera is started. The subject image is displayed on the LCD monitor 18. Moreover, the full-pressing operation of the release switch SW1 is performed immediately after the half-pressing operation of the release switch SW1. At the same time, the LCD monitor 18 is turned off and set in a state of not displaying the subject image.

When the focusing operation is completed, the processor 104 starts the power distribution to the stepping motor STM1 of the origin position forced retention mechanism 1263. Thus, the mechanical retention of the mounting stage 15 is released. At the same time as the release of the retention, the power distribution to the coils COL1" and COL2" is started. By the control of the power distribution to the coils COL1" and COL2", the mounting stage 15 is retained in the center position. Thus, the camera shake correction process is performed.

The mounting stage 15 is retained in the center position by the power distribution to the coils COL1" and COL2". Thus, the still image exposure is started and the mounting stage 15 is controlled to follow the image movement based on the camera shake. When the still image exposure is completed, the mounting stage 15 is returned to the center position based on the control of the power distribution to the coils COL1" and COL2". Next, the processor 104 starts the power distribution to the stepping motor STM1 of the origin position forced retention mechanism 1263. Thus, the mechanical fixation and retention of the mounting stage 15 is performed. Next, the power-distribution to the coils COL1" and COL2" is stopped.

In the case of such full-pressing in one shot, it is considered that confirmation of the composition by the user is completed during the operation of release 1 and confirmation of the composition during the release 2 is not necessary. Accordingly, it is considered that, in the case of the full-pressing in one shot, reconfirmation of the composition is not necessary even if the mounting stage 15 is once returned to the center position during the release 2. Thus, since it is not required to display the composition during the release 2 on the LCD monitor 18, the camera shake correction control process can be simplified.

Moreover, since the LCD monitor 18 is turned off during the focusing operation, unnecessary battery drain can be avoided.

Furthermore, when the mounting stage 15 is forcibly retained in the origin position O in a mechanical manner, the peripheral wall 33a of the retention pin 33 presses the recess peripheral wall 19b of the protection plate 19. Accordingly, the mounting stage 15 that is the Y movable frame is pressed toward the subject in the Z axis direction. Thus, loose-fitting of the mounting stage 15 in the Z axis direction is suppressed. Moreover, when the mounting stage 15 is not forcibly retained in the origin position O in a mechanical manner, the mounting stage 15 that is the Y movable frame is pressed toward the subject in the Z axis direction by attractive force between the urging magnets 15e and 15f and the extended portions 16e2 and 16f2 of the yokes 16e and 16f. Thus, the loose-fitting of the mounting stage 15 in the Z axis direction is suppressed. As described above, by setting the pressing direction of the retention pin 33 to be the same as the direction in which the mounting stage 15 is pressed by the attractive force between the urging magnets 15e and 15f and the extended portions 16e2 and 16f2 of the yokes 16e and 16f, the CCD 101 is not moved in the optical axis direction (the Z axis direction) between the time when the camera shake correction operation is performed and the time when the forced retention is executed and the camera shake correction operation is not performed. Thus, the focal position is kept constant.

In the camera shake correction device as the embodiment of the present invention, the urging magnets 15e and 15f are attracted to the extended portions 16e2 and 16f2 of the yokes 16e and 16f corresponding thereto in the Z axis direction. Thus, in the camera shake correction device, the mounting stage 15 can be attracted to the guide stage consisting of the Y direction stage 14 and the X direction stage 13, in other words, can be attracted to the X direction stage 13. Accordingly, the position of the mounting stage 15 when viewed from the Z axis direction can be set to the position coming into contact with the guide stage (position coming into contact with the X direction stage 13 with the Y direction stage 14 interposed therebetween). Thus, in the camera shake correction device, loose-fitting of the CCD 101 (the imaging element), which is mounted on the mounting stage 15, in the Z axis direction (the photographing optical axis direction) can be prevented. Moreover, the CCD 101 can receive light at a proper focal distance. Note that the extended portions 16e2 and 16f2 are provided at least in the region in which the urging magnets 15e and 15f are moved. Thus, even if the urging magnets 15e and 15f are moved in the Y direction along with the movement of the Y direction stage 14 for image blur correction, the attractive force can be allowed to act between the urging magnets 15e and 15f and the extended portions 16e2 and 16f2.

In the camera shake correction device as the embodiment described above, the respective coiled bodies COL1, COL1', COL2 and COL2' are provided in the mounting stage 15, and the respective permanent magnets 16a to 16d are provided in the X direction stage 13 included in the guide stage. However, the present invention is not limited to the embodiment described above but may be applied to the case where the respective permanent magnets 16a to 16d are provided in the mounting stage 15 and the respective coiled bodies COL1, COL1', COL2 and COL2' are provided in the X direction stage 13.

In the camera shake correction device as the embodiment described above, the rotations in the X and Y directions are detected by the gyro sensor 1241 to detect the camera shake caused in the camera main body (main body case). However, the present invention is not limited to the embodiment described above but may be applied to the case where, for example, a monitoring image is processed to detect the camera shake.

In the camera shake correction device as the embodiment described above, the guide stage consists of the Y direction stage 14 which supports the mounting stage 15 so as to be movable in the Y axis direction and the X direction stage 13 which supports the Y direction stage 14 so as to be movable in the X axis direction. However, the present invention is not limited to the embodiment described above as long as the mounting stage 15 is held movable along the X-Y plane and is fixed to the photographing optical axis in the main body case.

Note that, in the embodiment described above, the description was given of the example where the image blur correction device which corrects image blur by moving the CCD 101 that is the imaging element with respect to the inclination (shake) of the camera is adopted in the camera. However, the present invention is also applicable to an image blur correction device which has a lens mounted therein instead of the CCD 101 and corrects image blur by moving the lens with respect to the inclination (shake) of the camera. In such a case, the image blur correction device of the present invention may be configured by using an appropriate lens frame in a lens barrel as a movable frame.

Figure 41:
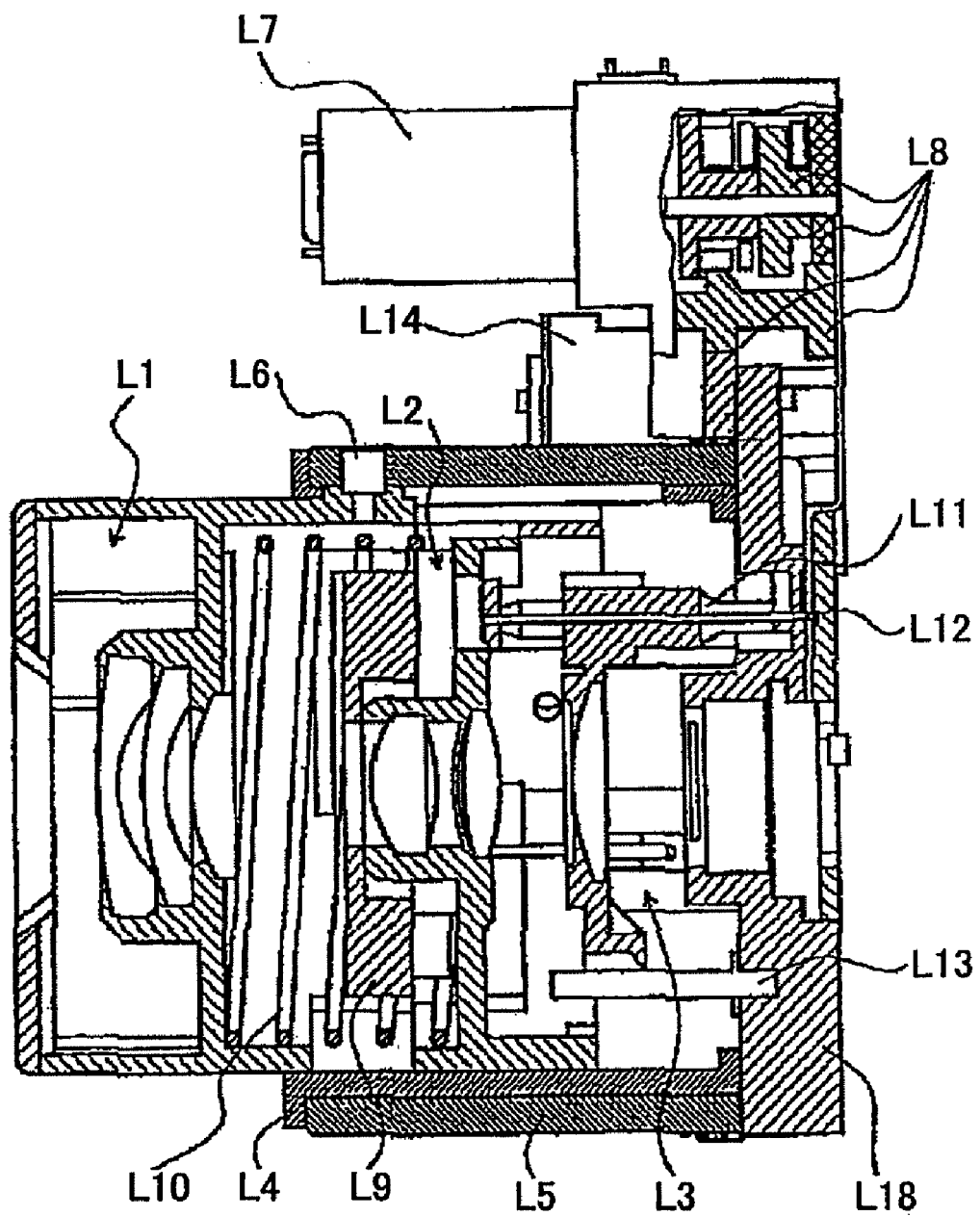
FIG. 41 is a vertical cross-sectional view schematically showing a main structure of a lens barrel in the image blur correction device according to the embodiment of the present invention.
Figure 42:
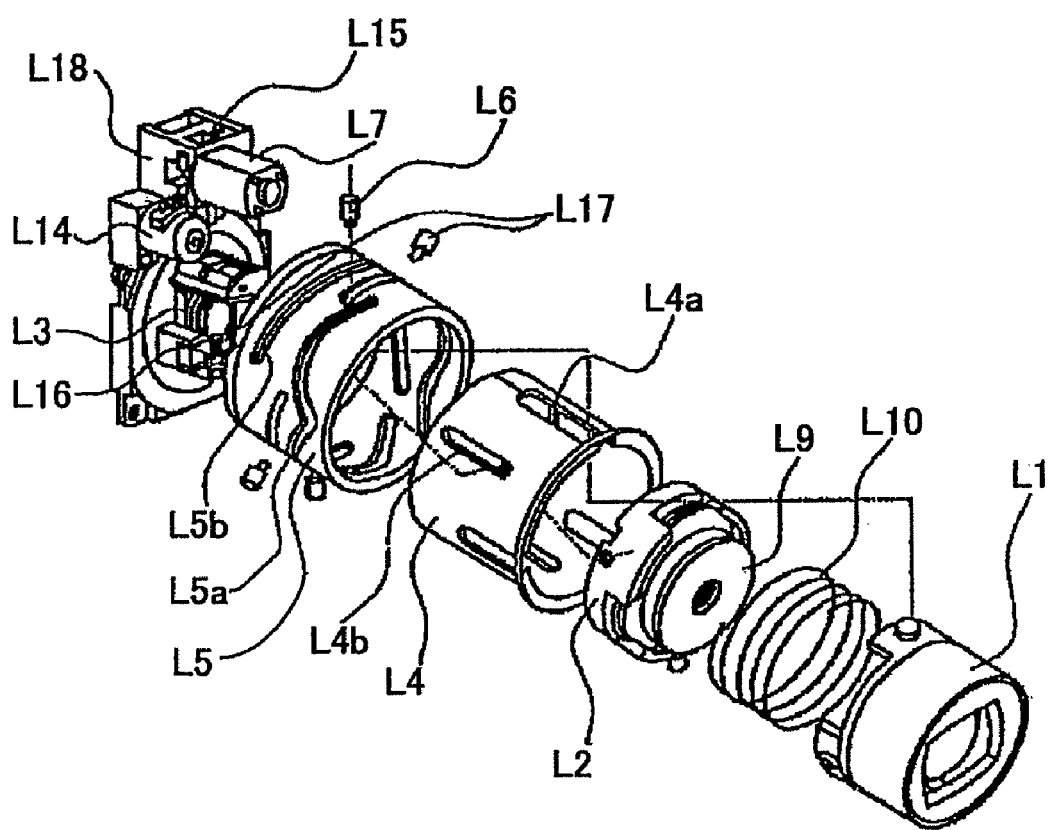
FIG. 42 is an exploded perspective view schematically showing a detailed structure of the lens barrel in the image blur correction device according to the embodiment of the present invention.

For example, FIGS. 41 and 42 show a configuration of a lens barrel to which the image blur correction device having the configuration described in the above embodiment can be applied. FIG. 41 is a vertical cross-sectional view schematically showing a main structure of the lens barrel. FIG. 42 is an exploded perspective view schematically showing a detailed structure of the lens barrel.

The lens barrel shown in FIGS. 41 and 42 includes a first group optical system L1, a second group optical system L2, a third group optical system L3, a fixation tube L4, a cam tube L5, a first group drive pin L6, a DC motor L7, a gear array L8, an aperture stop L9, a spring L10, a lead screw L11, a main shaft L12, a countershaft L13, a pulse motor L14, photointerruptors L15 and L16, a second group drive pin L17 and a base L18.

In the above lens barrel, the image blur correction device of the present invention having a lens mounted thereon may be disposed, for example, as the third group optical system L3 for focusing which can be moved in X and Y directions.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:
1. An image blur correction device, comprising:
a first movable frame which is equipped with a lens or an imaging element and has guides;
a second movable frame having guide shafts which movably support the first movable frame by coming into contact with the guides;

a fixed frame which movably supports the second movable frame; and a drive mechanism which drives the first and second movable frames for correcting image blur by moving the first and second movable frames relative to the fixed frame, wherein the guide shafts are made of a magnetic material, and wherein permanent magnets are provided on the guides in the first movable frame, the permanent magnets using attractive force between the magnets and the guide shafts, so as to urge the first movable frame in a direction in which the guides and the guide shafts come into contact with each other.

2. An image blur correction device, comprising:

a first movable frame which is equipped with any one of a lens and an imaging element and has first-direction guides;

a second movable frame having second-direction guides and first-direction guide shafts which movably support the first movable frame by coming into contact with the first-direction guides;

a fixed frame having second-direction guide shafts which movably support the second movable frame by coming into contact with the second-direction guides; and a drive mechanism which drives the first and second movable frames for correcting image blur by moving at least one of the first and second movable frames relative to the fixed frame, and wherein the first-direction guide shafts are made of a magnetic material, and wherein the first movable frame has first permanent magnets on the first-direction guides in the first movable frame, the first permanent magnets using attractive force between the first magnets and the first-direction guide shafts, so as to urge the first movable frame in a direction in which the first-direction guides and the first-direction guide shafts come into contact with each other.

3. The image blur correction device according to claim 2, wherein the second-direction guide shafts are made of a magnetic material, and wherein the second movable frame has second permanent magnets on the second-direction guides in the second movable frame, the second permanent magnets using attractive force between the second magnets and the second-direction guide shafts, so as to urge the second movable frame in a direction in which the second-direction guides and the second-direction guide shafts come into contact with each other.

4. An imaging apparatus, comprising the image blur correction device according to claim 1.

5. An imaging apparatus, comprising the image blur correction device according to claim 2.

* * * * *